US010850935B2

(12) United States Patent
Noda

(10) Patent No.: US 10,850,935 B2
(45) Date of Patent: Dec. 1, 2020

(54) DOCUMENT FEEDER ASSISTING DEVICE AND IMAGE FORMING APPARATUS INCORPORATING AUTOMATIC DOCUMENT FEEDER INCLUDING THE DOCUMENT FEEDER ASSISTING DEVICE

(71) Applicant: Makoto Noda, Tokyo (JP)

(72) Inventor: Makoto Noda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/353,281

(22) Filed: Mar. 14, 2019

(65) Prior Publication Data

US 2019/0283991 A1 Sep. 19, 2019

(30) Foreign Application Priority Data

Mar. 19, 2018 (JP) ................................ 2018-051700
Mar. 19, 2018 (JP) ................................ 2018-051707
Mar. 19, 2018 (JP) ................................ 2018-051721

(51) Int. Cl.
*B65H 5/00* (2006.01)
*B65H 29/12* (2006.01)
*B65G 29/00* (2006.01)
*G03G 15/00* (2006.01)

(52) U.S. Cl.
CPC .......... *B65H 5/006* (2013.01); *G03G 15/602* (2013.01); *B65H 2301/422* (2013.01)

(58) Field of Classification Search
None
See application file for complete search history.

(56) References Cited

U.S. PATENT DOCUMENTS 4,921,239 A * 5/1990 Okui .................. G03B 27/6257 271/186
6,042,109 A * 3/2000 Klausbruckner ........ B41J 11/54 271/184
6,254,087 B1 * 7/2001 Johdai .................... B65H 15/00 271/184
9,085,425 B2 * 7/2015 Osakabe .............. H04N 1/0062
9,561,927 B2 * 2/2017 Hoshino ................ B65H 31/26
9,709,943 B2 * 7/2017 Sato ......................... B65H 1/04
10,239,715 B2 * 3/2019 Suzuki ..................... B65H 5/06

FOREIGN PATENT DOCUMENTS

JP 2001-203839 7/2001
JP 2002-087684 3/2002
JP 2006-086698 3/2006
JP 2009-035395 2/2009
JP 2012-230485 11/2012
JP 2014-043284 3/2014

* cited by examiner

*Primary Examiner* — Kavel Singh
(74) *Attorney, Agent, or Firm* — Harness, Dickey & Pierce, P.L.C.

(57) ABSTRACT

A document feeder assisting device includes a document stacker to stack a document to be conveyed toward a feed port of an automatic document feeder, a pressing device to press the document toward a document placement surface of the document stacker, and a conveyance device to convey the document. The document is stacked on the document placement surface exposed above with the pressing device moved.

21 Claims, 65 Drawing Sheets

FIG. 53

| EVALUATION ITEM | (1) DOUBLE FEEDING (1000 TIMES OF SHEET CONVEYANCE) | (2) CONVEYANCE FAILURE OF SHEET (1000 TIMES OF PAPER CONVEYANCE) | (3) SKEW AMOUNT (STANDARD VALUE: ±1.93% FOR BOTH MAIN AND SUB) | (4) EASE OF PLACING AND TAKING OUT CARDS (SENSORY EVALUATION) | (5) RESISTANCE FORCE AGAINST CONVEYANCE (TARGET VALUE: 6 N OR LESS) |
|---|---|---|---|---|---|
| EVALUATION RESULT | GOOD (NO DOUBLE FEEDING) | FAIR (FAILED 8 TIMES, LEVER NOT RETURNING TO INITIAL POSITION) | GOOD (STANDARD VALUE ACHIEVED WITH MAIN: −0.46% AND SUB: −0.75%) | GOOD | FAIR (7.2 N, LEVER SLIGHTLY NOT SMOOTH) |

AFTER DOCUMENT IS CONVEYED (GATE CLOSED)

DURING DOCUMENT CONVEYANCE (GATE OPEN)

WHEN GATE IS CLOSED
(= WHEN ENERGIZING MEMBER IS
MOST COMPRESSED)

WHEN GATE IS CLOSED
(= WHEN ENERGIZING MEMBER
IS MOST COMPRESSED)

DOCUMENT FEEDER ASSISTING DEVICE AND IMAGE FORMING APPARATUS INCORPORATING AUTOMATIC DOCUMENT FEEDER INCLUDING THE DOCUMENT FEEDER ASSISTING DEVICE

CROSS-REFERENCE TO RELATED APPLICATIONS

This patent application is based on and claims priority pursuant to 35 U.S.C. § 119(a) to Japanese Patent Application Nos. 2018-051700, filed on Mar. 19, 2018, 2018-051707, filed on Mar. 19, 2018, and 2018-051721, filed on Mar. 19, 2018, in the Japan Patent Office, the entire disclosure of which is incorporated by reference herein.

BACKGROUND

Technical Field

This disclosure relates to a document feeder assisting device, and an image forming apparatus incorporating an automatic document feeder including the document feeder assisting device.

Discussion of the Background Art

Various types of document feeder assisting devices are known to assist document conveyance performed by an automatic document feeder (ADF). The document feeder assisting devices include a document stacker in which documents to be conveyed toward a feed port of the ADF are stacked, a pressing mechanism to press the document toward a document placement surface of the document stacker, and a conveyance device to convey the document.

For example, a known conveying and stacking device (e.g., a card processing device) that is capable of conveying a document that is difficult to fold such as a card and applied to a document feeder assisting device as follows.

The conveying and stacking device includes a feeding and ejecting port (e.g., a card inserting and ejecting port) that serves as both a feed port to stack (accommodate) a document (e.g., a card) on a document stacker (e.g., a card stacker) and an ejection port to eject the document to the outside. The document is stacked on the document stacker in such a manner as to overlay in the thickness direction of the document from the document conveyance surface.

Further, as a conveying member that conveys a document between the feeding and ejecting port and the document stacker, a first conveyance roller at a position close to the feeding and ejecting port, a second conveyance roller opposed to the document stacker, and a document trailing end extruder to separate and extrude a document on the document conveyance surface on the document stacker.

The conveying and stacking device also includes a document push-up unit movable in a contacting and separating direction with respect to the document conveyance surface, an energizing member to energize the document push-up unit toward the document conveyance surface, and a push-down member movable to a push-down position of a document that is extruded at least by the thickness of one document from the document conveyance surface toward the document push-up member.

When the push-down member is extruded, a gap is formed between the stacked documents and the document conveyance surface to feed a document from the feeding and ejecting port side.

This arrangement allows a mechanism to retract the stacked documents in a direction away from the document conveyance surface to be formed by a small number of parts with a reduced installation space, which is extremely advantageous for downsizing the conveying and stacking device.

However, known document feeder assisting devices including such the conveying and stacking device provide the poor work efficiency for stacking documents on a document stacker.

Furthermore, when multiple documents (i.e., a bundle of documents) are stacked on the sheet stacker, to be conveyed toward a feed port (a sheet feed port) of an automatic document feeder, a known document feeder assisting device feeds and separates one document from the other documents of the multiple documents.

The known document feeder assisting device includes a rotary rib to rotate while contacting an uppermost document from above, a document stacker on which multiple documents can be stacked, and a document table that forms about half of the sheet feed port side of the document stacker and that can rotate on the sheet feed port side so as to retain (keep) the uppermost document at a conveyance (sheet feeding) appropriate position. The known document feeder assisting device further includes a fixing regulation member to contact the rotary rib to regulate rotation of the rotary rib that has been pushed up contacts the uppermost document when the uppermost document reaches the conveyance appropriate position, and a drive motor (a bottom plate lifting motor) that functions as a drive source to rotate the document table. According to this arrangement, the drive motor is controlled to keep the uppermost document at the conveyance appropriate position.

SUMMARY

At least one aspect of this disclosure provides a document feeder assisting device including a document stacker, a pressing device, and a conveyance device. The document stacker stacks a document to be conveyed toward a feed port of an automatic document feeder. The pressing device presses the document toward a document placement surface of the document stacker. The conveyance device conveys the document. The document is stacked on the document placement surface exposed above with the pressing device moved.

Further, at least one aspect of this disclosure provides an image forming apparatus including an automatic document feeder including the above-described document feeder assisting device to convey a document toward a feed port included in the vicinity of an intermediate portion of a conveyance passage.

Further, at least one aspect of this disclosure provides a document feeder assisting device including an ejection port, a conveyance device, a document stacker, and an opening and closing member. The ejection port ejects a target document to be delivered to a feed port in an automatic document feeder. The conveyance device conveys the target document toward the feed port. The document stacker unit places the target document. The opening and closing member opens and closes the ejection port in response to the delivery of the document. The conveyance device includes a document end extruder to extrude to convey the document and to deliver the document to the feed port. The opening and closing member contacts the document stacker unit to close the ejection port. The document end extruder is formed with a curved surface to extrude a trailing end of a document which is a trailing end of the document in a document conveyance direction.

Further, at least one aspect of this disclosure provides a document feeder assisting device including a conveyance device and an opening and closing member. The conveyance device conveys a document stacked on a document placement surface of the document stacker toward a feed port in an automatic document feeder to restrict a plurality of documents stacked on a document stacker and feed one document of the plurality of documents. The feed port is disposed in the vicinity of an intermediate portion of a conveyance passage in the automatic document feeder. The opening and closing member is energized in a direction toward the document placement surface by an energizing member and is displaced in the energizing direction to open and close an ejection port. The opening and closing member includes a first surface to contact the document placement surface when closed and a second surface to receive force displacing the opening and closing member in a direction opposite to the energizing direction when the opening and closing member opens with the document contacting during document conveyance.

BRIEF DESCRIPTION OF THE DRAWINGS

The aforementioned and other aspects, features, and advantages of this disclosure would be better understood by reference to the following detailed description when considered in connection with the accompanying drawings, wherein:

FIG. 53 is a table illustrating an evaluation result of a prototype of a document feeder assisting device to which the structure of Embodiment 1 of this disclosure is applied;

Figure 1:
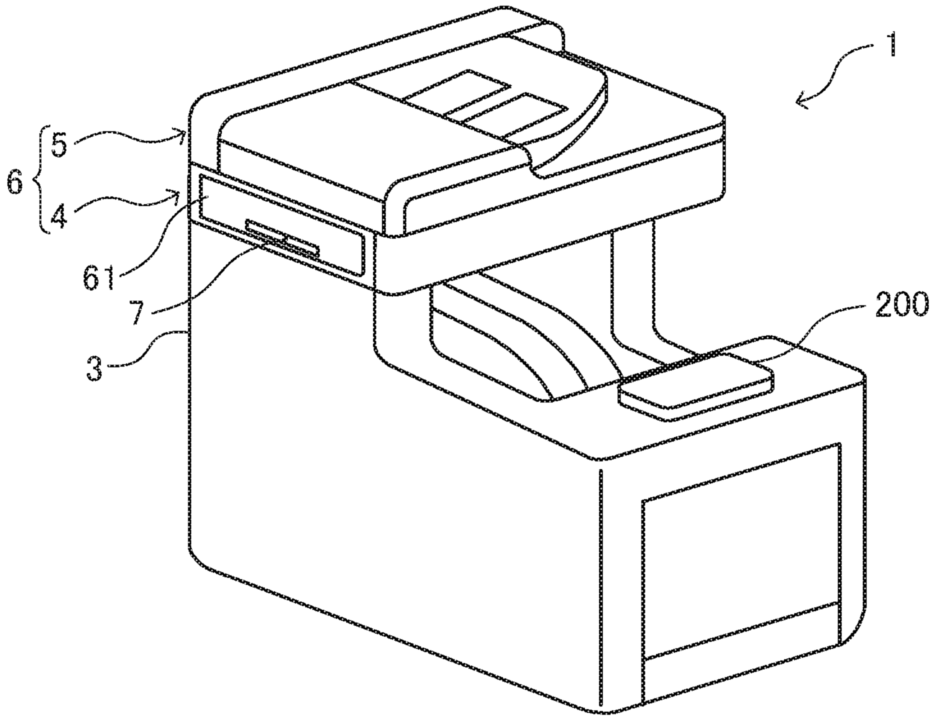
FIG. 1 is a schematic structural view of an image forming apparatus according to an embodiment of this disclosure.

The accompanying drawings are intended to depict embodiments of this disclosure and should not be interpreted to limit the scope thereof. The accompanying drawings are not to be considered as drawn to scale unless explicitly noted.

DETAILED DESCRIPTION

It will be understood that if an element or layer is referred to as being “on”, “against”, “connected to” or “coupled to” another element or layer, then it can be directly on, against, connected or coupled to the other element or layer, or intervening elements or layers may be present. In contrast, if an element is referred to as being “directly on”, “directly connected to” or “directly coupled to” another element or layer, then there are no intervening elements or layers present. Like numbers referred to like elements throughout. As used herein, the term “and/or” includes any and all combinations of one or more of the associated listed items.

Spatially relative terms, such as “beneath”, “below”, “lower”, “above”, “upper” and the like may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as “below” or “beneath” other elements or features would then be oriented “above” the other elements or features. Thus, term such as “below” can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus and is implemented in the most effective manner in an electrophotographic image forming apparatus.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of this disclosure are described below. In the drawings for explaining the following embodiments, the same reference codes are allocated to elements (members or components) having the same function or shape and redundant descriptions thereof are omitted below.

Hereinafter, as an image forming apparatus including an automatic document feeder (ADF) to which a document feeder assisting device 100, which embodies the present embodiment, is attached, an embodiment of an electrophotographic image forming apparatus (hereinafter referred to as an image forming apparatus 1) will be described.

It is to be noted that elements (for example, mechanical parts and components) having the same functions and shapes are denoted by the same reference numerals throughout the specification and redundant descriptions are omitted.

FIG. 1 is a schematic structural view of the image forming apparatus 1 according to the present embodiment of this disclosure.

It is to be noted in the following examples that the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium, and the term "sheet" is not limited to indicate a paper material but also includes the above-described plastic material (e.g., an OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveyance passage to a downstream side thereof; the term "width direction" indicates a direction basically perpendicular to the sheet conveying direction.

The image forming apparatus 1 of the present embodiment mainly includes an image former 3, an image reader 4, and an automatic document feeder 5 (hereinafter, referred to as an "ADF 5"). The reading device 6 of the present embodiment mainly includes the image reader 4 and the ADF 5.

The image former 3 of the present embodiment is an electrophotographic image forming apparatus including, for example, an exposure unit as a latent image forming unit, a plurality of photoconductor drums as latent image bearers, a developing device that uses toner of four colors of cyan (C), magenta (M), yellow (Y), and black (K), an intermediate transfer unit, a secondary transfer unit, a fixing device, and so on. Note that another type of image forming apparatus such as an inkjet type may be used.

The image former 3, for example, exposes the photoconductor drums of the respective colors by the exposure unit to form an electrostatic latent image on each of the photoconductor drums, on the basis of image data obtained by reading an image by the reading device 6 or image data transmitted from an external device such as a personal computer, and supplies toners to the latent images on the respective photoconductor drums by developing devices of the respective colors to develop. The image former 3 then performs primary transfer of the toner images on the photoconductor drums of the respective colors onto an intermediate transfer belt of the intermediate transfer unit such that the toner images are superimposed on each other, then at a secondary transfer unit, performs secondary transfer onto a recording paper that is a recording material, and heats up and presses the toner images on the recording paper to fix in the fixing device to form a color image.

Figure 2A:
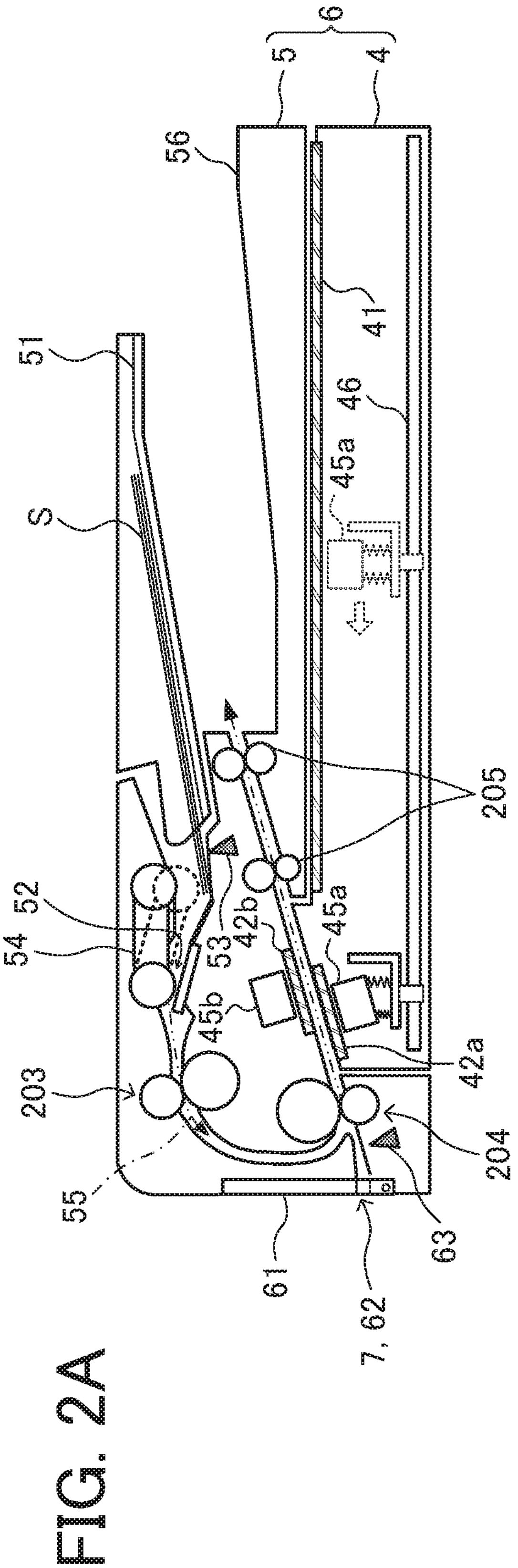
FIGS. 2A and 2B are schematic views of a basic structure of a reading device included in an image forming apparatus.
Figure 2B:
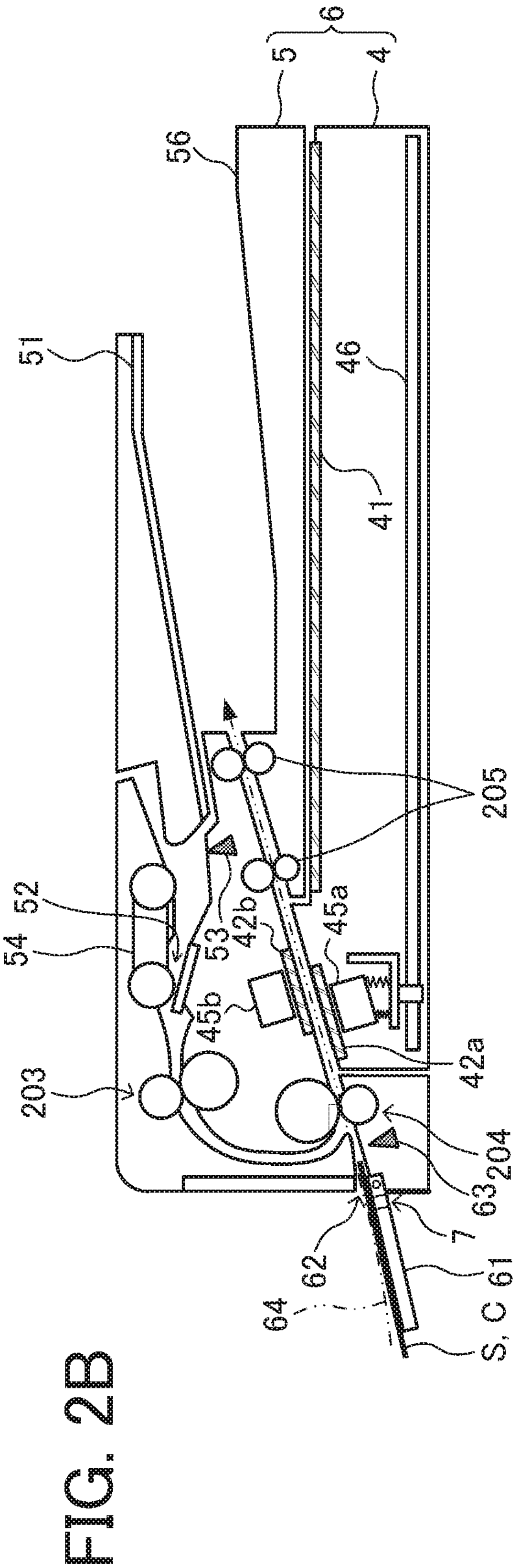

FIGS. 2A and 2B are schematic views of a basic structure of the reading device 6 included in the image forming apparatus. FIG. 2A is a view explaining the outline of one-pass simultaneous double-sided reading to read a bundle of documents stacked on a document tray 51 (document table) in a flat bed scanner mode and a DF scanner mode, and FIG. 2B is a view explaining the outline of one-pass simultaneous double-sided reading in the DF scanner mode.

The reading device 6 can be switched between the DF scanner mode (conveyed document reading mode) to read a document image during automatic conveying and a flat bed scanner mode (placed document reading mode) to read an image of a document placed on a flat contact glass.

The DF scanner mode includes the one-pass simultaneous double-sided reading to read the bundle of documents stacked on the document tray 51 as well as manually-fed single sheet linear reading to read by linearly conveying a sheet document S which cannot be bent such as a card document (hereinafter referred to as a card C as appropriate) stacked (placed) on a sheet feeding tray (manual feeder table) 61.

In the flat bed scanner mode, the image reader 4 irradiates, with light, an image surface of a document (for example, a document sheet, a cardboard, a book, etc.) on a flat bed contact glass 41 and converts reflection light from the image surface into an image signal to read the document image.

Here, when the document image is read, reading is carried out with a front side reading contact image sensor (CIS) 45*a*, moved to the left in the figure, moving under the flat bed contact glass 41 while guided by a guide 46.

In the one-pass simultaneous double-sided reading to read the bundle of documents stacked on the document tray 51, which is a sheet placement table, in the DF scanner mode, reading is carried out as follows.

The ADF 5 separates sheet documents S one by one from the bundle of documents stacked on the document tray 51 whose width direction is regulated by end fences by a sheet feeding and separating mechanism 54 arranged at the entrance of a first feed port 52 to introduce the sheet document S into a document conveyance passage 55 and conveys the sheet document S along the document conveyance passage 55. Then, during the conveyance, the front side of the sheet document S faces a front side contact glass 42*a* of the image reader 4 partially and sequentially from the upstream side in the conveyance direction to be read by the front side reading CIS 45*a*. Meanwhile, the back side of the sheet document S faces a back side contact glass 42*b* of the image reader 4 partially and sequentially from the upstream side in the conveyance direction to be read by a back side reading CIS 45*b*.

Specifically, first, a document is placed on the document tray 51, and a first sensor 53 detects the sheet document S. By selecting scan on an operation panel 200, the uppermost sheet document S is taken out from the documents placed on the document tray 51 by the sheet feeding and separating mechanism 54, and a single sheet document S is separated to be conveyed by rollers. While the document is conveyed by a first document conveying mechanism 203 and a second document conveying mechanism 204, an image is read by the front side reading CIS 45*a* and the back side reading CIS 45*b*. Then the document is conveyed by a third document conveying mechanism 205 and finally ejected onto an ejection tray 56.

Meanwhile, in the manually-fed single sheet linear reading in the DF scanner mode, in which a sheet document S which cannot be bent such as a card C document stacked on the sheet feeding tray 61 is linearly conveyed to be read, the reading is performed as follows.

The ADF 5 introduces a sheet document S that cannot be bent such as a card C stacked on the sheet feeding tray 61 provided so as to be openable and closable in the vicinity of the intermediate portion of the document conveyance passage 55 from a manual feed port 62 into a manually-fed document conveyance passage 64 and conveys the sheet document S along the manually-fed document conveyance passage 64 (a linear portion on substantially the same plane on the downstream side, in the document conveyance direction, of the intermediate portion of the document conveyance passage 55). Then, during the conveyance, the front side of the sheet document S faces a front side contact glass 42*a* of the image reader 4 partially and sequentially from the upstream side in the conveyance direction to be read by the front side reading CIS 45*a*. Meanwhile, the back side of the sheet document S faces a back side contact glass 42*b* of the image reader 4 partially and sequentially from the upstream side in the conveyance direction to be read by a back side reading CIS 45*b*.

Specifically, first, by inserting the document on the sheet feeding tray 61 into the manual feed port 62, a manual feeding detection sensor 63 detects the document. Then after about one second, rollers of the second document conveying mechanism 204 rotate by a minute amount, and the document is nipped by the nip portion and is prefed. Then, by selecting scan on the operation panel 200, the second document conveying mechanism 204 rotates to send the document. After the both sides of the document are read by the front side reading CIS 45*a* and the back side reading CIS 45*b*, the document is conveyed by the third document conveying mechanism 205 to be ejected onto the sheet ejection tray 56.

The sheet feeding tray 61 includes a card insertion slot 7 to insert a card C or the like even when the sheet feeding tray 61 is closed as illustrated in the perspective view of FIG. 1 and thus is capable of conveying the card C and the like even when the sheet feeding tray 61 is not opened.

There are many cases where in hospitals it gets crowded with patients lining up for updating a registration card or issuing a new registration card, and thus there are demands from hospitals for scanning a plurality of plastic cards (hereinafter referred to as cards) such as registration cards and IDs in a short time to eliminate the congestion. Despite such needs, in the comparative ADFs, a user has to insert a card one by one into the manual insertion port and to press a "scan start button" each time scanning is performed and that a plurality of cards cannot be scanned in a short time.

In the case of a document scanner, there are some models capable of continuously scanning about five cards; however, about five cards may have marginal effects, and a document scanner has the scanning function alone and rarely has the function of an ADF.

In other words, a comparative ADF cannot scan a sufficiently large number of cards in a short time.

In response to the need for scanning plastic cards such as registration cards and IDs particularly in medical services, the inventor has performed development under the following two concepts.

(1) "Linear Single Sheet Manual Feed" Function

A document can be scanned without being bent. In other words, using side fences of a sheet feeding tray when a document is conveyed allows the document to be scanned without being inclined.

(2) "One-Pass Simultaneous Double-Sided Reading" Function

Even a document that does not bend can be subjected to duplex scanning at a time without opening a pressing plate to expose a flat bed contact glass.

Here, with respect to the above item (1), a comparative structure will be described with reference to drawings.

Figure 3A:
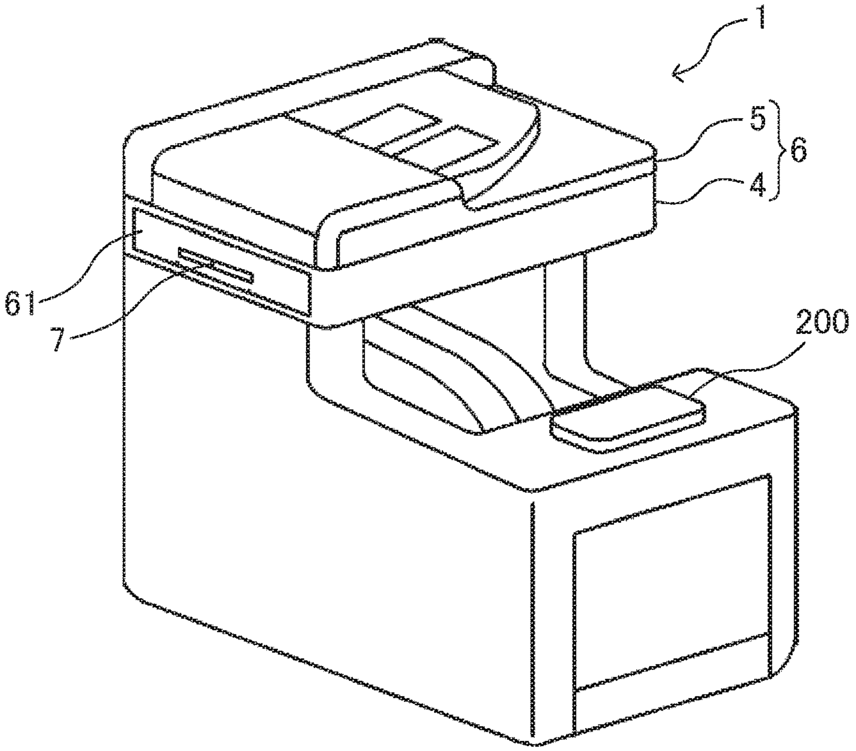
FIGS. 3A and 3B are explanatory views of a card insertion slot and a sheet feeding tray.
Figure 3B:
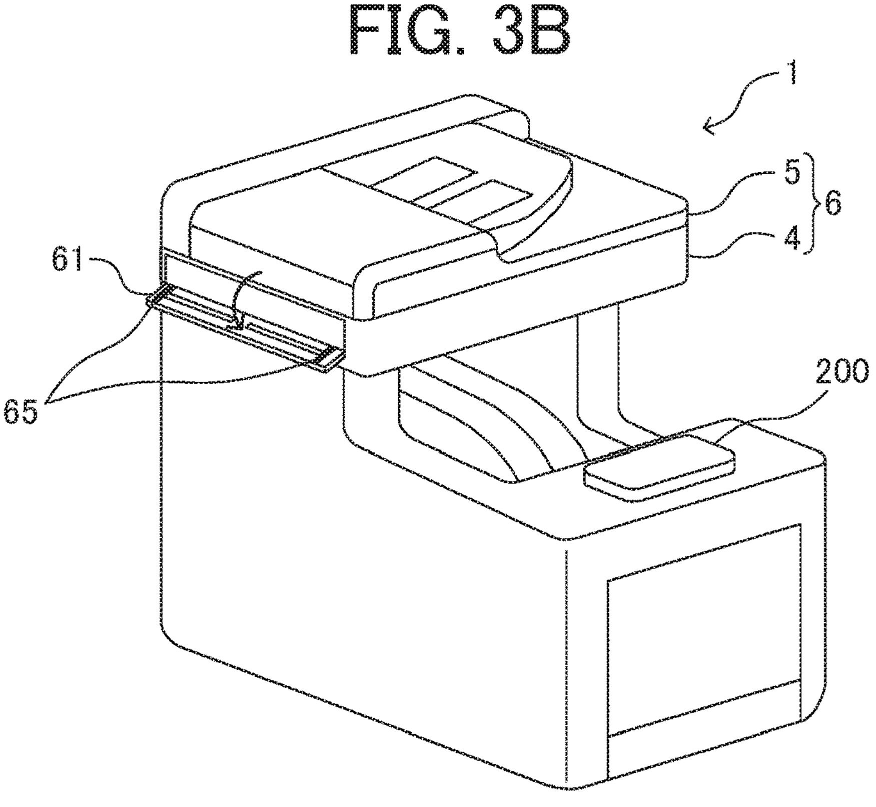
Figure 4A:
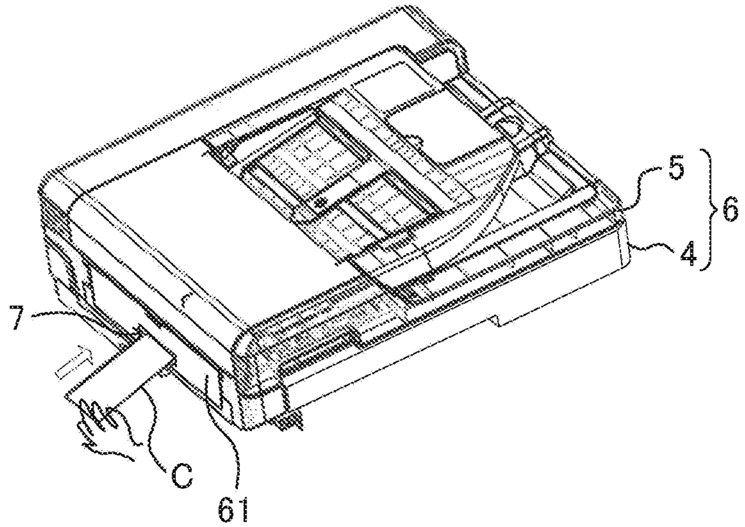
FIGS. 4A and 4B are explanatory views of a structure in which cards are conveyed while placed into a card insertion slot or a sheet feeding tray manually by a user without a document feeder assisting device.
Figure 4B:
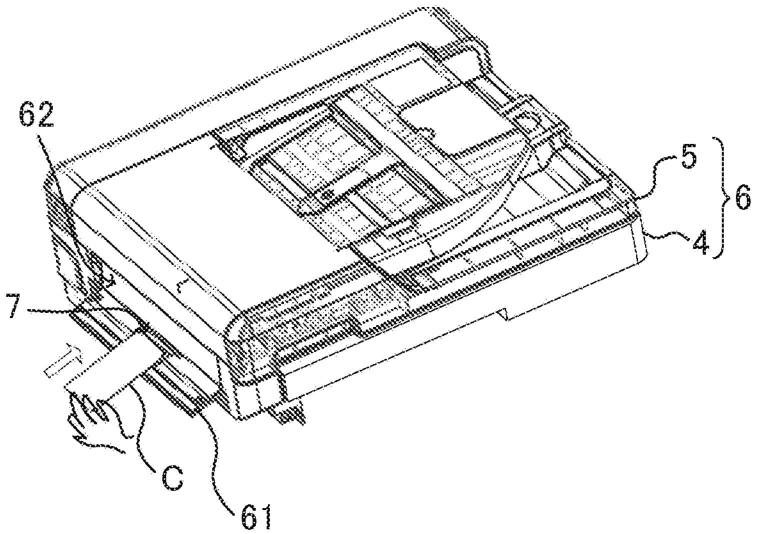

FIGS. 3A and 3B are explanatory views of a card insertion slot 7 and a sheet feeding tray 61, respectively. FIGS. 4A and 4B are explanatory views of a structure in which cards C are conveyed while manually placed into the card insertion slot 7 or the sheet feeding tray 61 by a user without the document feeder assisting device 100. FIG. 4A is an explanatory view of a structure in which a user manually inserts (conveys) a card C into the card insertion slot 7, and FIG. 4B is an explanatory view of a structure in which the user manually places the card C on the sheet feeding tray 61 for conveyance.

There are the following two comparative methods for scanning the card C or other documents.

(1-1)

As illustrated in FIG. 3A, this is a method in which the card C is inserted into the card insertion slot 7 included in the sheet feeding tray 61 without opening the sheet feeding tray 61. As illustrated in FIG. 4A, the user manually inserts (conveys) the card C into the card insertion slot 7.

(1-2)

As illustrated in FIG. 3B, this is a method in which the sheet feeding tray 61 is opened and side fences are adjusted to the document size, and then the card C is inserted into the insertion slot. As illustrated in FIG. 4B, the user manually places the card C on the sheet feeding tray 61 for conveyance.

However, with any of the methods described with reference to FIGS. 3A and 3B, a sufficiently large number of cards C cannot be scanned yet in a short time.

Meanwhile, in the case where a comparative document feeder assisting device 100*a*, to which the structure of a comparative conveying and stacking device (card processing device) is applied, is coupled to the card insertion slot 7, although a sufficiently large number of cards can be scanned in a short time, it has been made clear that the following inconvenience arises.

The comparative document feeder assisting device is not convenient that when structured to convey a document toward a feed port included in the vicinity of an intermediate portion of a conveyance passage of an ADF, the device such as the ADF including the document feeder assisting device has a larger size or incurs a higher cost.

Specifically, since it is necessary to secure a predetermined length for a rotary rib to separate documents and the length (length of the arm) of a document table, and the distance from the line of action of the force applied to the document to the center of rotation, the horizontal size of the ADF or other devices including the document feeder assisting device is likely to be significantly large.

In addition, since the contacting part for the rotary rib to press the document is a point, in order to apply a predetermined conveyance resistance force to separate the document, a driving motor of a high torque to rotate the document table is necessary, thus increasing the cost of the ADF or the other devices.

The comparative document feeder assisting device 100*a* applied with the structure of the comparative conveying and stacking device has the poor work efficiency for stacking cards C' on a card stacker 112*a*.

The comparative document feeder assisting device 100*a* applied with the structure of the comparative conveying and stacking device is also inconvenient that a card C' is prone to skew when the card C' is conveyed and that skew correction of the card C' cannot be sufficiently performed upon delivery to the ADF 5.

There is also a risk that the comparative document feeder assisting device 100*a* interferes with the main body of the ADF 5 and that cards cannot be fed stably. In addition, since the comparative document feeder assisting device 100*a* itself is likely to be larger, it is not suitable for attachment and detachment to and from the ADF 5, a document conveyance passage of which is originally raised on the downstream side.

The reason why the above inconvenience arises will be described with reference to FIGS. 5A and 5B.

Figure 5A:
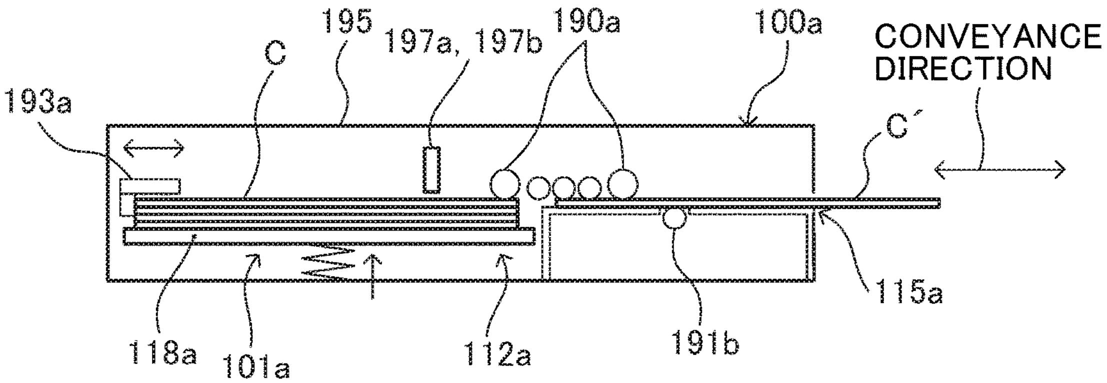
FIGS. 5A and 5B are explanatory views of an inconvenience of a comparative conveying and stacking device applicable to a document feeder assisting device.
Figure 5B:
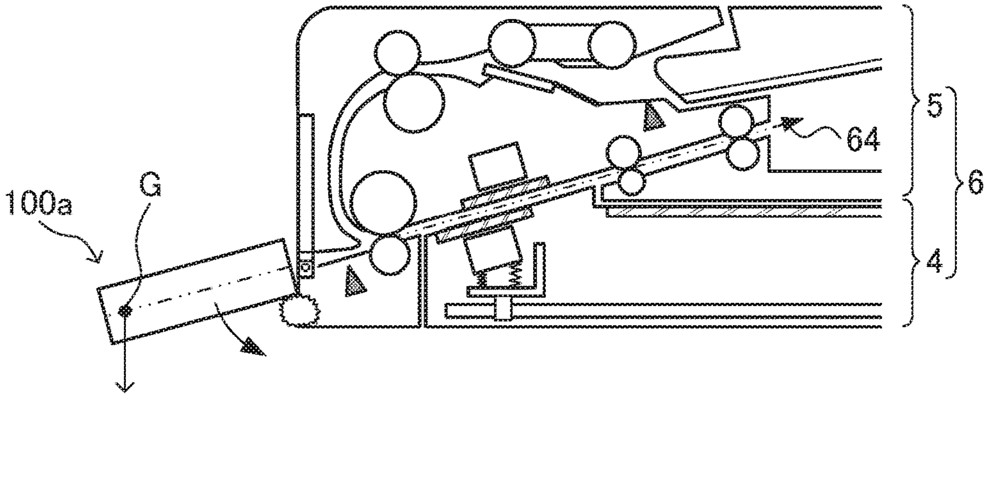

FIGS. 5A and 5B are explanatory views of an inconvenience of the comparative document feeder assisting device 100*a* in the case where the comparative structure is applied. FIG. 5A is a view explaining the reason why the work efficiency is deteriorated when the cards C' are stacked on the card stacker 112*a*, and FIG. 5B is a view explaining the reason for interference with the main body of the ADF 5.

Figure 6:
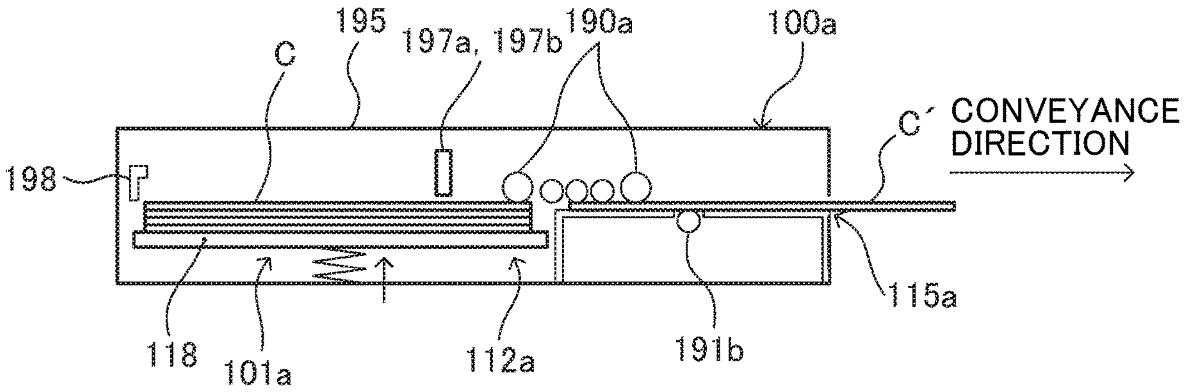
FIG. 6 is another explanatory view of an inconvenience of a comparative conveying and stacking device applicable to a document feeder assisting device.

FIG. 6 is another explanatory view of an inconvenience of the comparative document feeder assisting device 100*a* in a case where another comparative structure is applied.

The structures, symbols, and names of members used in the explanation of the comparative document feeder assisting device 100*a* illustrated in FIGS. 5A, 5B, and 6 are different from the structure, symbols, and names of members used in a known card processing device.

As illustrated in FIG. 5A, the comparative document feeder assisting device 100*a* includes a card inserting and ejecting port 115*a* serving as both a feed port to accommodate cards C' in a card stacker and an ejection port to eject the document to the outside. A card C' is stacked on the card stacker 112*a* so as to be overlaid in the thickness direction of the card C' from the card conveyance surface.

Also included are a pressing plate 118*a* movable in the contacting and separating direction with respect to the card conveyance surface and a pressing mechanism 101 that functions as a pressing device to energize the pressing plate 118*a* toward the card conveyance surface. Further included are push-down members 197*a* and 197*b* movable from the card conveyance surface to a card push-down position projecting at least by the thickness of one sheet of document toward a card push-up member.

When the push-down members 197*a* and 197*b* protrude, a gap to feed a card C' from the card inserting and ejecting port 115*a* side is formed between the stacked cards C' and the card conveyance surface.

This arrangement allows a mechanism to retract the stacked cards C' in a direction away from the card conveyance surface to be formed by a small number of parts with a reduced installation space, which is extremely advantageous for downsizing the conveying and stacking device.

In the comparative document feeder assisting device 100*a*, however, since a new card C' is stacked after retracting the stacked cards C' in a direction away from the card conveyance surface, one card C' alone can be placed in the card stacker 112*a* at a time.

Moreover, due to the dual function as the feed port to stack on the card stacker 112*a* and the ejection port to eject a document to the outside, each time a card C' is stacked on the card stacker 112*a*, the comparative document feeder assisting device 100*a* has to be detached from the ADF 5 to stack a card C' in the card stacker.

For the above reasons, the comparative document feeder assisting device 100*a* applied with the structure of the comparative conveying and stacking device has the poor work efficiency for stacking cards C' on a card stacker 112*a*.

Furthermore as illustrated in FIG. 5A, the comparative document feeder assisting device 100*a* includes, in a housing 195, driving sources to drive conveyance rollers 190*a* to convey a card C', an opposing roller 191*b*, an extruding claw 193*a*, the push-down members 197*a* and 197*b*, and other components.

Therefore, the comparative document feeder assisting device 100*a* itself weighs a lot or is increased in size, and when a large number of cards C' are stacked, when the comparative document feeder assisting device 100*a* is coupled to the ADF 5, the center of gravity G is biased on a side away from the ADF 5 as illustrated in FIG. 5B.

Specifically speaking, in the case where the structure allows detachment from the ADF 5 which conveys the cards C', since there is a distance from the card inserting and ejecting port 115*a* to the card stacker 112*a*, stacking the cards C' results in the center of gravity biased toward the card stacker 112*a*. That is, the center of gravity resides on the side away from the ADF 5.

In the case of the above, since the conveyance passage of the ADF 5 has a linear shape inclined so as to be higher toward the downstream side, substantially the whole device is pulled downward by the card stacker 112*a* and is positioned lower, thereby significantly interfering with the main body of the ADF 5. Furthermore, there is a risk that cards cannot be fed stably.

As illustrated in FIG. 6, the comparative document feeder assisting device 100*a* includes two conveyance rollers 190*a* arranged between the vicinity of an ejection port of a card C' stacked on a pressing plate 118 of a card stacker 170*a* and a card inserting and ejecting port 115*a*. The card stacker 170*a* is arranged apart from the card inserting and ejecting port 115*a* which delivers a card C' to the feed port of the ADF 5. Therefore, when the card C' is conveyed to the card inserting and ejecting port 115*a* by the two conveyance rollers 190*a*, the card C' is prone to skew.

Upon delivery to the feed port, the card C' is sandwiched at least by the conveyance rollers 190*a* on the side of the card inserting and ejecting port 15*a* and the opposing roller 191*b* facing the conveyance rollers 190*a*. Therefore, even when the delivered card C' comes in contact with conveyance rollers of the ADF 5 with which the delivered card C' first contacts, skewing of the card C' is hardly corrected.

For the above reasons, the comparative document feeder assisting device 100*a* applied with the structure of the comparative conveying and stacking device is inconvenient in which a card C' is prone to skew when the card C' is conveyed and that skew correction of the card C' cannot be sufficiently performed upon delivery to the ADF 5.

Here, description will be given with reference to drawings on skew that is corrected when a user manually inserts a card C into the card insertion slot 7 included in the sheet feeding tray 61 included in the ADF 5 without using the comparative document feeder assisting device 100*a* applied with the structure of the comparative conveying and stacking device described above.

Figure 7C:
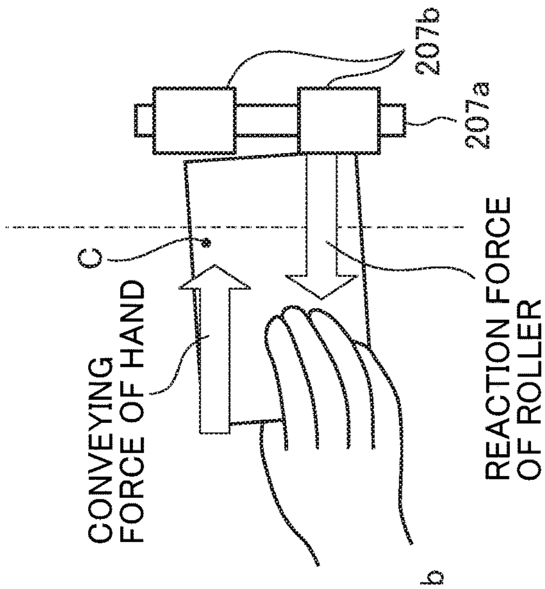
FIGS. 7A to 7C are explanatory views when a document is brought into contact with a roller in a comparative structure without the document feeder assisting device.
Figure 7B:
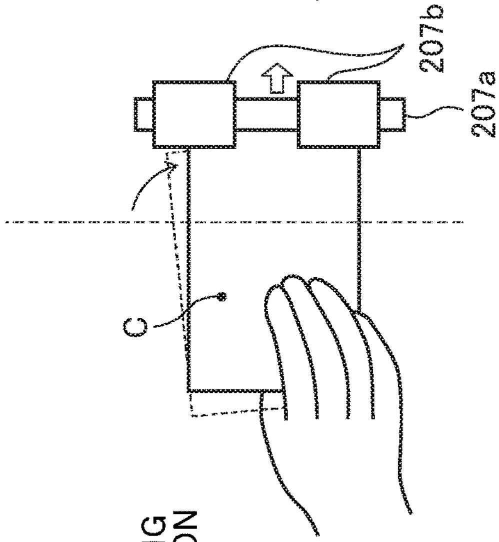
Figure 7A:
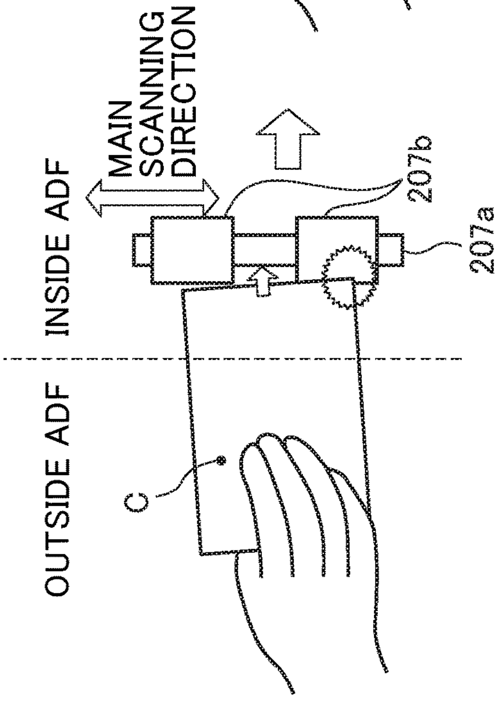

FIGS. 7A to 7C are explanatory views when a document is brought into contact with a roller in the comparative structure without the document feeder assisting device. FIG. 7A is a view illustrating a skewed card C first coming into contact with conveyance rollers 207*b* of the ADF 5. FIG. 7B is a view illustrating the skewed card C also contacting another conveyance roller 207*b*, thus correcting the skew of the card C. FIG. 7C is a view explaining forces applied to the card C when the skew is corrected.

As illustrated in FIG. 7A, the user manually inserts the document into a manual insertion port of the ADF 5 to allow the leading end of the document to contact on a manual insertion port roller. At this time, since the card C is not fixed but is flexible, let us assume that for example the card C is inserted obliquely into the card insertion slot 7 and contacts on one of the conveyance rollers 207*b* as illustrated in FIG. 7A.

Even in the case of such contact, as illustrated in FIGS. 7B and 7C, by the conveying force by the hand and the reaction force of the conveyance rollers 207*b*, the card C is rotated and aligned straight by a right-turning (clockwise) moment in the drawings, thereby the skew is corrected. Then the card C can be brought into contact with both of the conveyance rollers 207*b*, and thus there is no inconvenience.

In addition, description will be given with reference to drawings on skew that occurs when a document feeder assisting device is used which a user manually operates with respect to the card insertion slot 7 included in the sheet feeding tray 61 included in the ADF 5, without using the comparative document feeder assisting device 100*a* applied with the structure of the comparative conveying and stacking device described above.

Figure 8C:
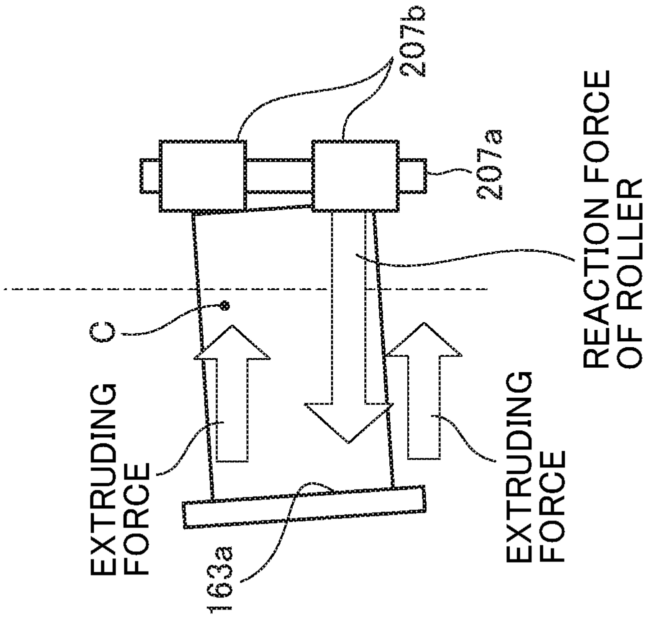
FIGS. 8A to 8C are explanatory views when a document is conveyed by a document feeder assisting device having a large document extruding surface manually operated by a user to allow the document to contact against a roller.
Figure 8B:
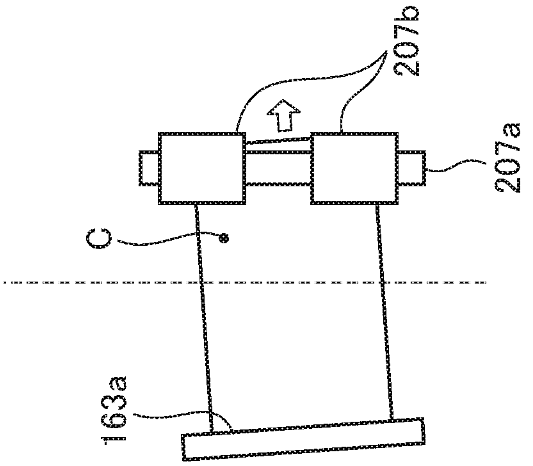
Figure 8A:
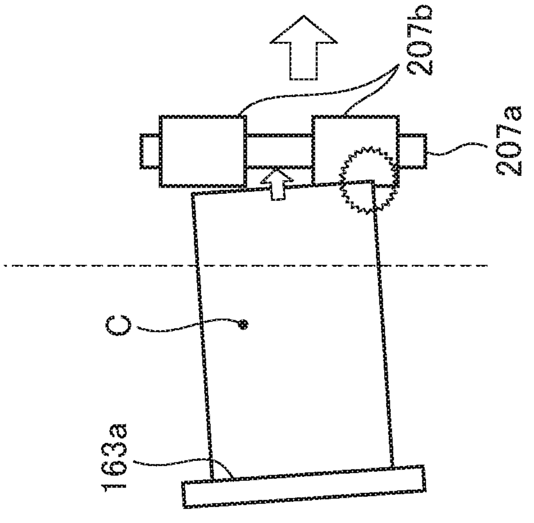

FIGS. 8A to 8C are explanatory views of a card C conveyed by the document feeder assisting device having a large extruding surface 163*a* which is a large document extruding surface manually operated by a user and brought into contact with the conveyance rollers 209*b*. FIG. 8A is a view illustrating the skewed card C first contacting conveyance rollers 207*b* of the ADF 5. FIG. 8B is a view illustrating the card C also contacting another conveyance roller 207*b* while still skewed. FIG. 8C is a view explaining forces applied to the skewed card C when the card C first contacts one of the conveyance rollers.

In the structure using the document feeder assisting device manually operated by a user, a card C is conveyed as follows.

The user moves a card conveying lever or the like, in conjunction with which the large extruding surface 163*a* to extrude the card C extrudes the trailing end of the card C to allow the leading end of the card to contact one of the conveyance rollers 207*a* of the ADF 5 as illustrated in FIG. 8A.

Here, as illustrated in FIG. 8A, in the case where the card C is conveyed to the feed port in a skewed state and contacts one of the conveyance rollers 207*b*, in the case where the large extruding surface 163*a* is sufficiently large in the main-scanning direction, the extruding force generates both the right-turning and left-turning moments for the reaction force of the conveyance rollers 207*b* as illustrated in FIG. 8C. Therefore, since the forces cancel out each other, there is a risk that the card C may be conveyed within the ADF 5 without being rotated as illustrated in FIG. 8B.

Hereinafter, structures to solve the inconvenience of the comparative document feeder assisting device 100*a* applied with the structure of the comparative conveying and stacking device described above and the inconvenience related to skewing of the card C in the structure using the document feeder assisting device which a user manually operates will be described with a plurality of embodiments.

Embodiment 1

First, a description is given of a document feeder assisting device 100 according to Embodiment 1 to convey a card C toward the card insertion slot 7 included in the vicinity of the intermediate portion of the document conveyance passage 55 of the ADF 5 (reading device 6) of the present embodiment of this disclosure, with reference to drawings.

Figure 9A:
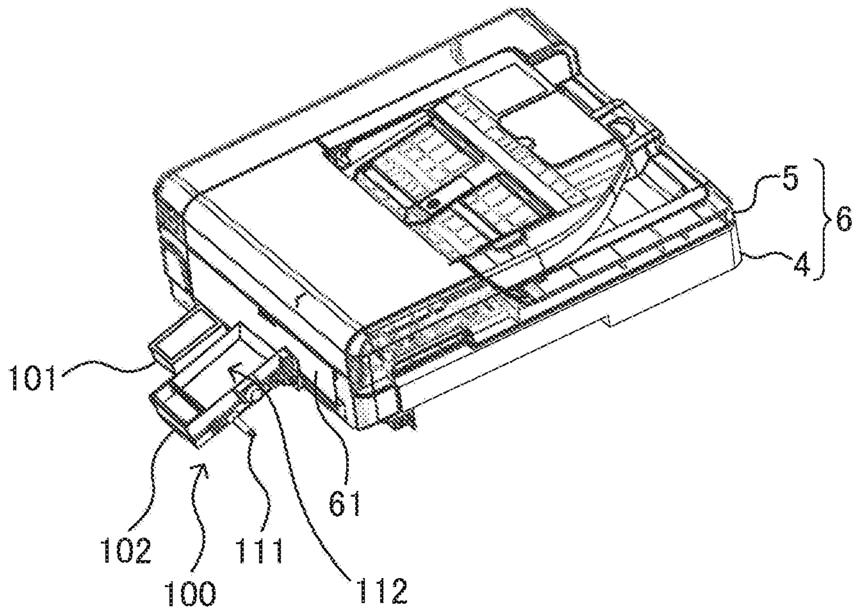
FIGS. 9A and 9B are explanatory perspective views of a structure according to Embodiment 1 in which cards are placed by a user in a document feeder assisting device attached to an auto document feeder (ADF) and are manually conveyed.
Figure 9B:
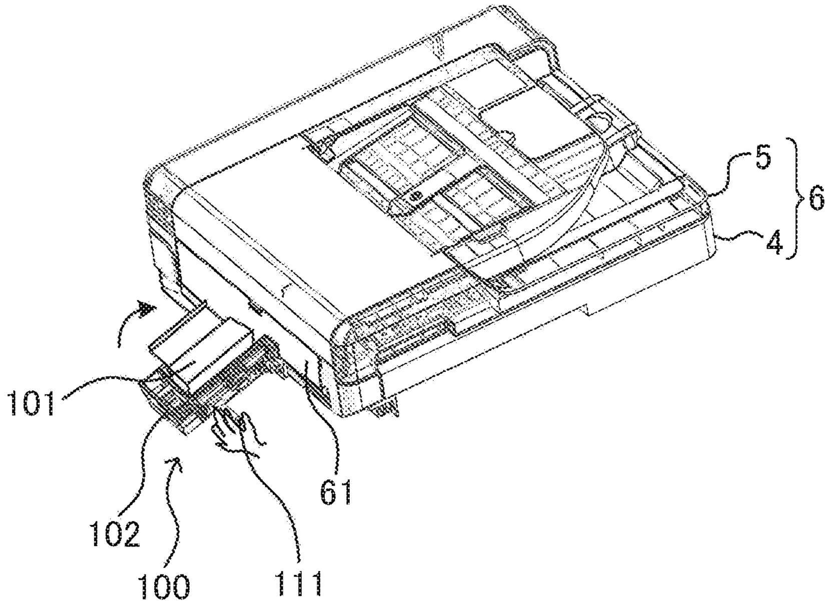
Figure 10:
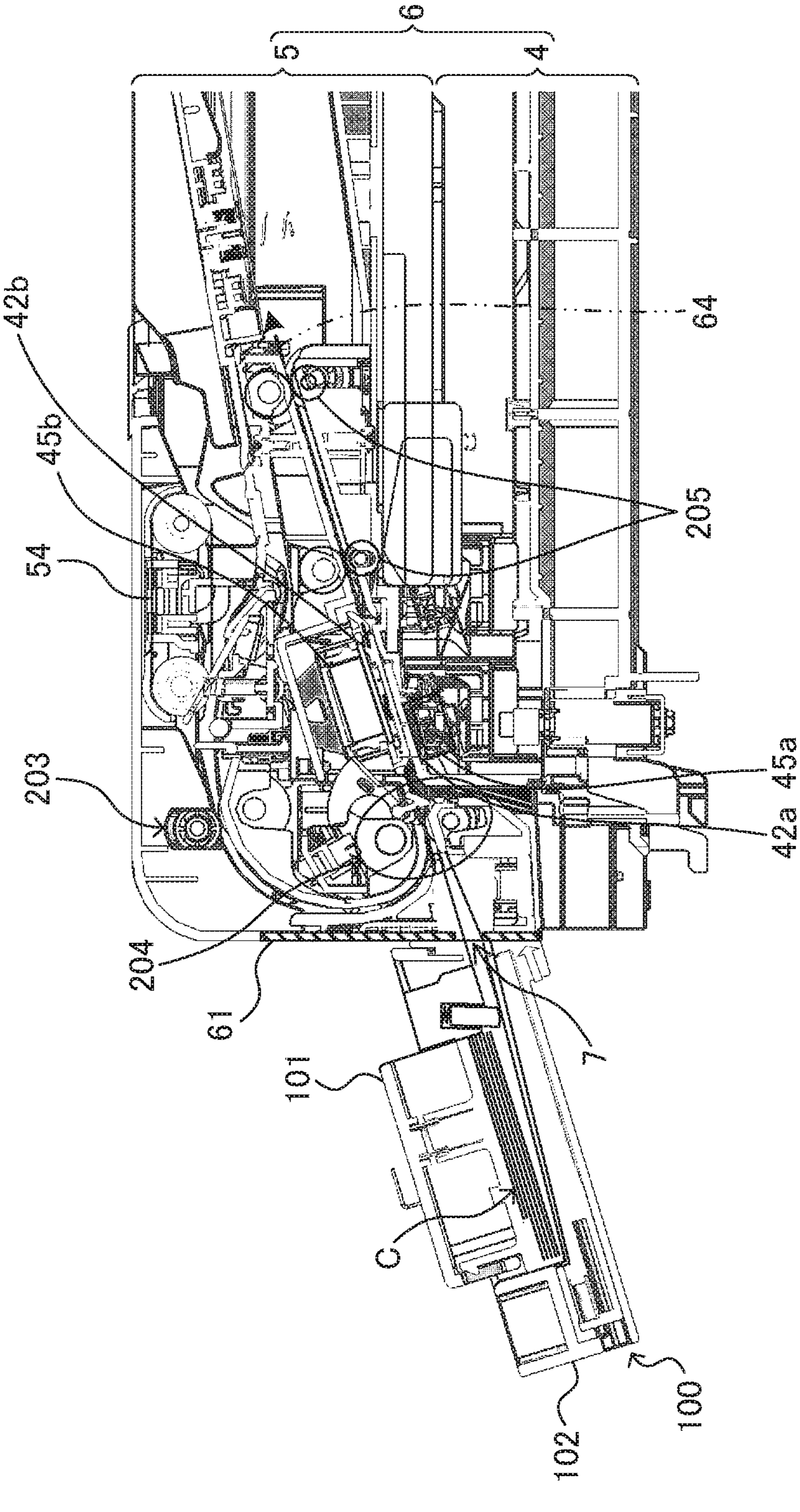
FIG. 10 is an explanatory cross-sectional view of the document feeder assisting device attached to the ADF.
Figure 11:
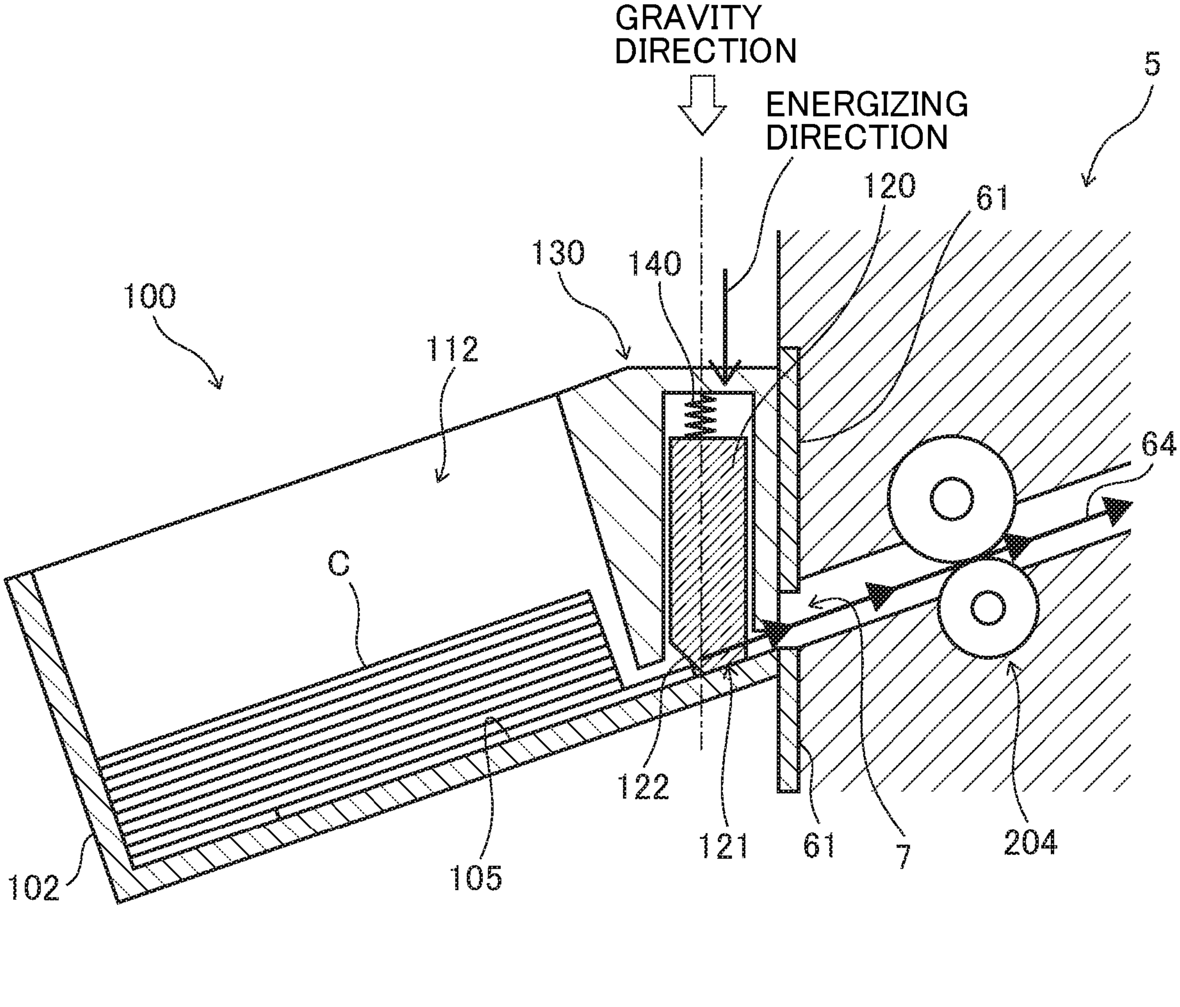
FIG. 11 is a cross-sectional view for explaining card conveyance from the document feeder assisting device attached to the ADF.

FIGS. 9A and 9B are explanatory perspective views of a structure according to the present embodiment in which cards C are placed by a user in a document feeder assisting device 100 attached to the ADF 5 and are manually conveyed. FIG. 9A is an explanatory view before the cards C are placed on a placement surface of a card stacker 112 included in the document feeder assisting device 100. FIG. 9B is an explanatory view after the cards C are placed on the placement surface of the card stacker 112 and pressed, and then conveyed by the user. FIG. 10 is an explanatory cross-sectional view of the document feeder assisting device 100 attached to the ADF 5. FIG. 11 is an explanatory cross-sectional view of card conveyance from the document feeder assisting device 100 attached to the ADF 5 (reading device 6).

As illustrated in the explanatory perspective views of FIGS. 9A and 9B, the document feeder assisting device 100 of the present embodiment is attached to the ADF 5 (sheet feeding tray 61) such that the position of the card insertion slot 7 in a state where the sheet feeding tray 61 of the ADF 5 is closed matches the position where the cards are ejected (an ejection port 115).

Then, as illustrated in FIG. 9A, a pressing mechanism 101 of the attached document feeder assisting device 100 is opened in a rotating manner from the stacker case 102 to expose the placement surface of the card stacker 112 on which the cards C are stacked to stack a desired number of cards C. Then, after rotating and closing the pressing mechanism 101 that functions as a pressing device to press the cards C, the user slides a card conveying lever 111 (card trailing end extruding member 113) toward the ADF 5 to convey the lowermost card C in the stack.

When the card C is conveyed in this manner, the card insertion slot 7 of the closed sheet feeding tray 61 serves as a feed port to convey the card C by the document feeder assisting device 100 as illustrated in FIG. 10.

As illustrated in FIGS. 10 and 11, the stacker case 102 of the document feeder assisting device 100 attached to the ADF 5 (card insertion slot 7) has a substantially linear conveyance passage inclined so as to be higher toward the downstream of the conveyance passage. Since the stacker case 102 has a function that allows continuous conveyance of the cards C into the inlet of the conveyance passage, the document feeder assisting device 100 has a linear conveyance passage having similar inclination to the inclination of the manually-fed document conveyance passage 64 of the ADF 5 as illustrated in FIGS. 10 and 11.

Thus, the document feeder assisting device 100 is attached such that the position of the ejection port 115 of the document feeder assisting device 100 (see FIGS. 12A to 12C) matches the position of the card insertion slot 7 as the conveyance inlet entrance in a state where the sheet feeding tray 61 of the ADF 5 is closed.

Furthermore, although detailed description will be given later, in the document feeder assisting device 100 of Embodiment 1, as illustrated in FIG. 11, two surfaces are formed on a gate 120 which is opened and closed by conveying force to convey a card C placed on the placement surface 105 of the card stacker 112 toward the ejection port 115 or the card insertion slot 7.

Specifically, the following two surfaces are formed on the gate 120 which can be opened and closed by being energized in the energizing direction by compression springs 140 to be displaced in the energizing direction.

One is a first surface 121 that contacts the placement surface 105 of the card stacker 112 when the gate 120 is closed, and another is a second surface 122 that receives displacing force in the direction opposite to the energizing direction by the compression springs 140 when the card C contacts during conveyance and the gate 120 opens.

Moreover, as described above, using the compression springs 140 as an energizing member to energize the gate 120 can contribute to cost reduction and space saving of the document feeder assisting device 100.

Here, the second surface on the gate 120 of the present embodiment is formed so as to be higher toward the upstream side in the conveyance direction of the card C as illustrated in FIG. 11. The second surface is not orthogonal to the energizing direction by the compression springs 140.

Moreover, as described above, using the compression springs 140 as an energizing member to energize the gate 120 can contribute to cost reduction and space saving of the document feeder assisting device 100.

Next, the basic structure of the document feeder assisting device 100 and the positional relationship with the ADF 5 (the reading device 6) will be described with reference to drawings.

Figure 12A:
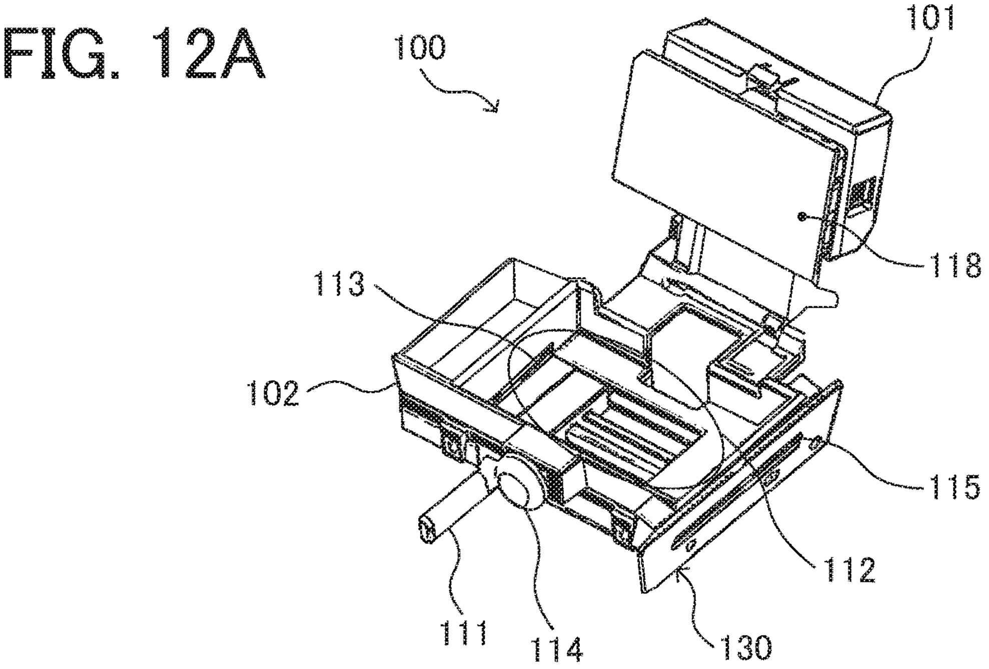
FIGS. 12A to 12C are explanatory views of a basic structure of the document feeder assisting device and a positional relationship with the ADF.
Figure 12B:
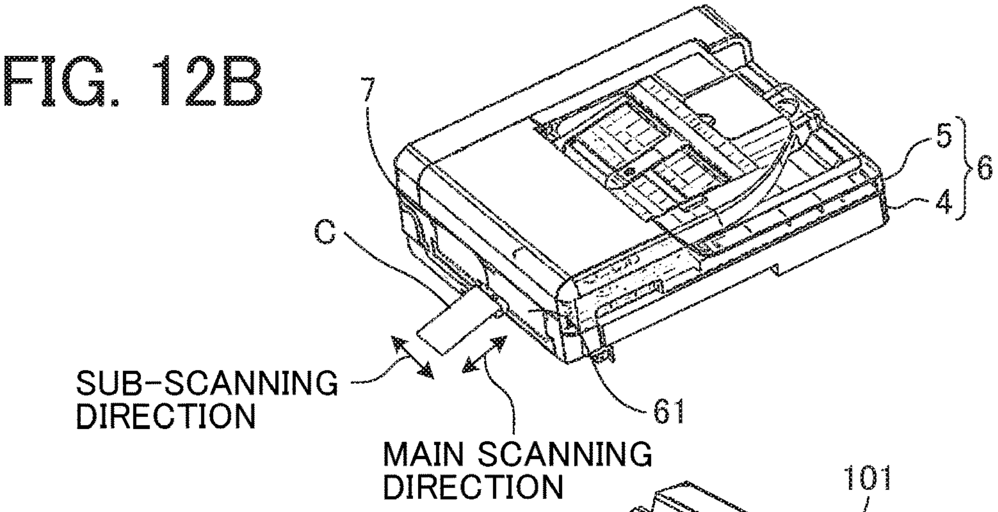
Figure 12C:
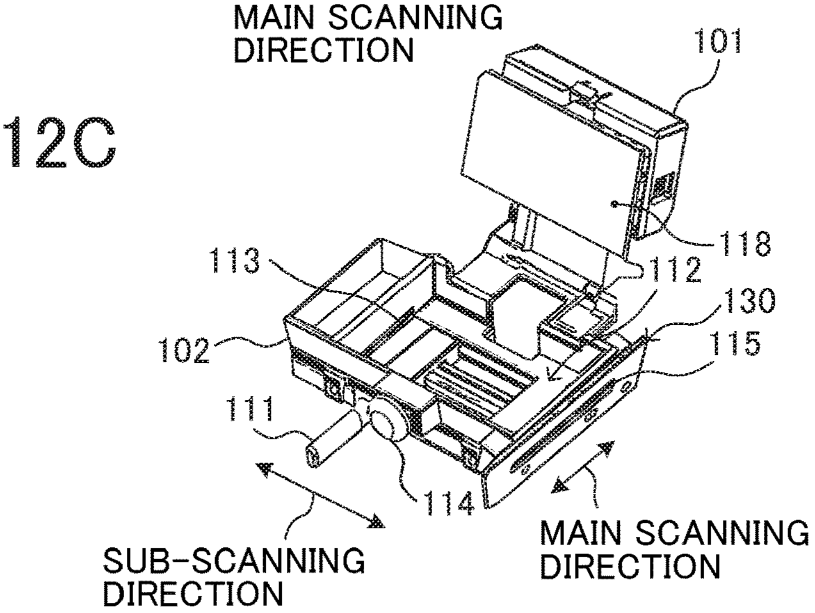

FIGS. 12A to 12C are explanatory views of the basic structure of the document feeder assisting device 100 and the positional relationship with the ADF 5. FIG. 12A is an explanatory view of the basic structure of the document feeder assisting device 100, FIG. 12B is an explanatory view of the main-scanning direction and the sub-scanning direction in the ADF 5, and FIG. 12C is an explanatory view of the main-scanning direction and the sub-scanning direction in the document feeder assisting device 100.

Figure 13A:
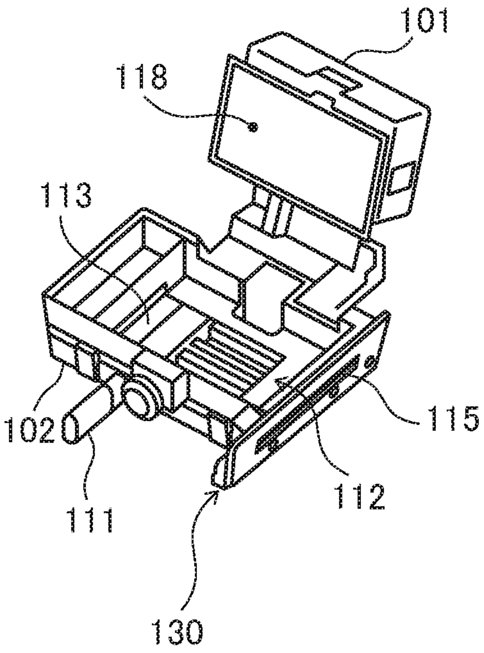
FIGS. 13A to 13D are explanatory views of a card conveying procedure performed by the document feeder assisting device.
Figure 13B:
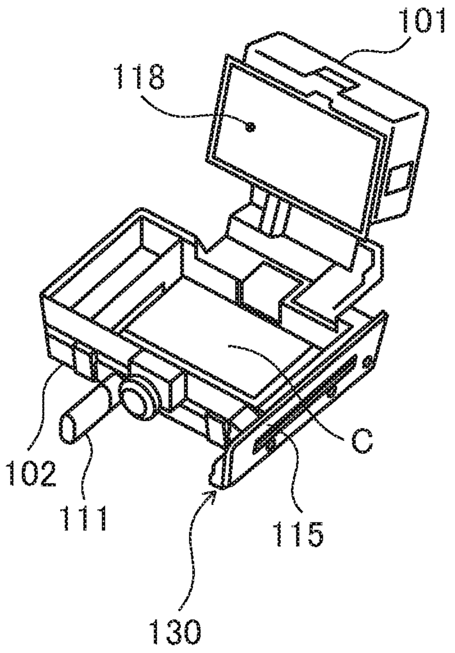
Figure 13C:
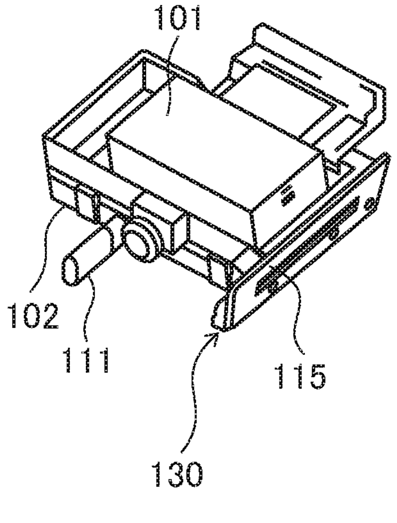
Figure 13D:
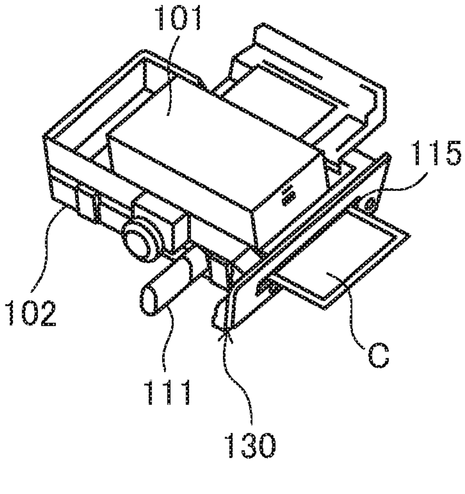

FIGS. 13A to 13D are explanatory views of a conveyance procedure of a card C by the document feeder assisting device 100. FIG. 13A is a view illustrating a state in which the placement surface 105 of the card stacker 112 is exposed, FIG. 13B is a view illustrating a state where cards C are stacked, and FIG. 13C is a view illustrating a state where the stacked cards C are pressed. FIG. 13D is a view illustrating a state in which the card conveying lever 111 is slid (moved) to eject a card C from the ejection port 115 included in the guide 130.

As illustrated in FIG. 12A, the document feeder assisting device 100 includes a stacker case 102 having a card stacker 112 to stack the cards C and the pressing mechanism 101 pivotally supported to open and close with respect to the stacker case 102.

The document feeder assisting device 100 further includes the trailing end extruding part 113 to extrude a card C in the conveyance direction, the card conveying lever 111 which the user holds and slides to move the card trailing end extruding member 113, and a pressing mechanism release button 114 to unlock the closed pressing mechanism 101.

Moreover, on the downstream side of the conveyance direction of cards C which is the document conveyance direction of the stacker case 102, there are included an ejection port 115 through which a card C is ejected and a guide 130 to guide the opening and closing of the gate 120 that opens and closes the ejection port 115. In the guide 130, the ejection port 115 of a rectangular shape through which the card C to be conveyed passes is formed, and the placement surface 105 of the card stacker 112 is formed to be substantially flush with the lower portion of the ejection port 115.

The pressing mechanism 101 has a pressing plate 118 that presses the cards C stacked on the placement surface 105 of the card stacker 112 when closed.

As illustrated in FIG. 12B, as to the main-scanning direction and the sub-scanning direction in the ADF 5 (the reading device 6), the conveyance direction in which the card C is inserted from the card insertion slot 7 of the closed sheet feeding tray 61 corresponds to the sub-scanning direction, and the width direction of the document orthogonal to this sub-scanning corresponds to the main-scanning direction. In other words, the conveyance direction of the card C inserted from the card insertion slot 7 corresponds to the sub-scanning direction, whereas the width direction of the card C corresponds to the main-scanning direction.

Meanwhile, applying these directions to the document feeder assisting device 100 attached to the ADF 5, the moving direction of the card trailing end extruding member 113, which is moved by sliding the card conveying lever 111, to extrude the card C and the conveyance direction of the card C correspond to the sub-scanning direction. A direction parallel to the placement surface 105 of the card stacker 112 and orthogonal to the conveyance direction of the card C corresponds to the main-scanning direction.

The conveyance procedure of a card C by the document feeder assisting device 100 is as follows. First, as illustrated in FIG. 13A, the pressing mechanism 101 is rotated and opened to expose the placement surface 105 of the card stacker 112, and then as illustrated in FIG. 13B, cards C are stacked on the placement surface 105 of the exposed card stacker 112. After the cards C are stacked, the pressing mechanism 101 is closed to press the cards C as illustrated in FIG. 13C. Then, as illustrated in FIG. 13D, the card conveying lever 111 is slid to eject the card C from the ejection port 115 included in the guide 130.

Next, accessibility to a card C stacked in the stacker case 102 will be described with reference to FIGS. 14A and 14B.

Figure 14A:
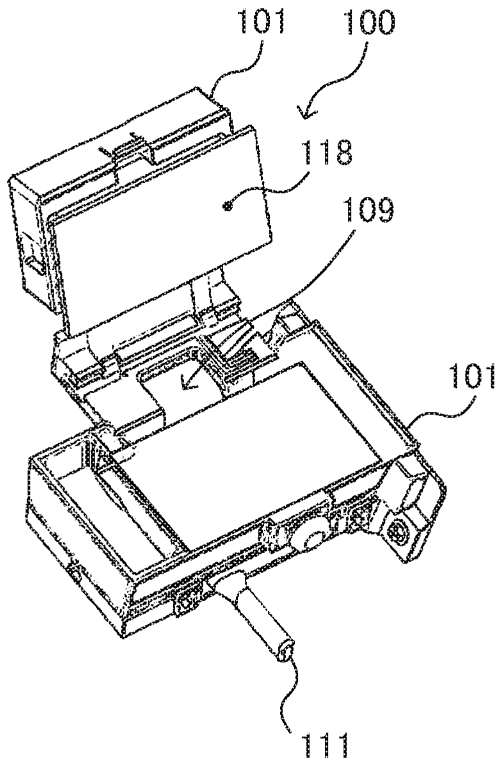
FIGS. 14A and 14B are explanatory views of a hole to access to a bottom surface of a card provided in a stacker case.
Figure 14B:
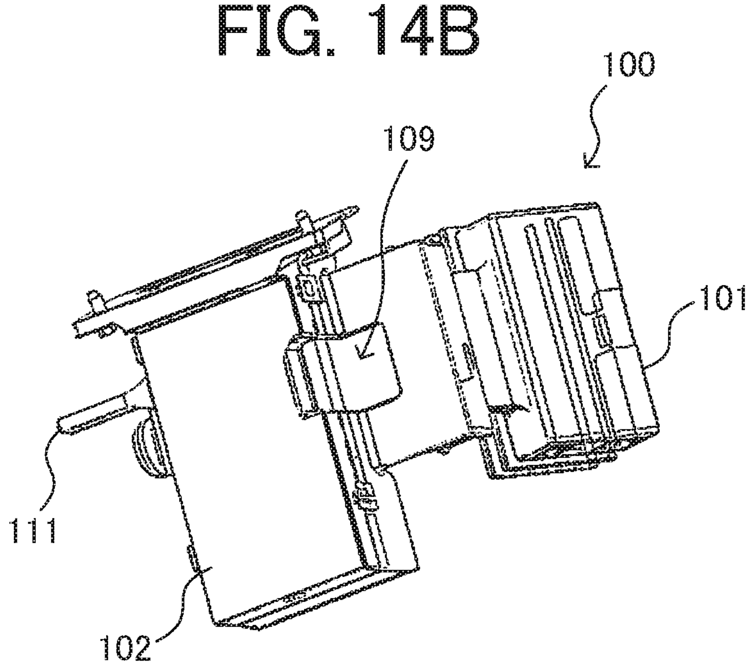

FIGS. 14A and 14B are explanatory views of a hole 109 to access to the bottom surface of a card C formed in a stacker case 102. FIG. 14A is a perspective explanatory view from above, and FIG. 14B is a perspective explanatory view from below.

There are times when it is desired to stop the card conveyance and to take out the bundle of cards remaining in the stacker case 102 while a plurality of cards C is stacked (set) as a bundle (hereinafter referred to as a card bundle as appropriate) and the cards C are sequentially conveyed and read.

In such a case, in the case of a tapered shape which will be described later in detail, there is no space to enter a finger in the gap between the cards C and the inner surface of the stacker case 102, and thus it is very difficult to take out the cards C.

Therefore, as illustrated in FIGS. 14A and 14B, by forming the hole 109 in the stacker case 102 such that the bottom surface of the cards can be accessed, the bottom surface of the card bundle can be supported by a finger to easily take out the card bundle.

Next, an outline of the pressing mechanism 101 will be described with reference to FIGS. 15A and 15B.

Figure 15A:
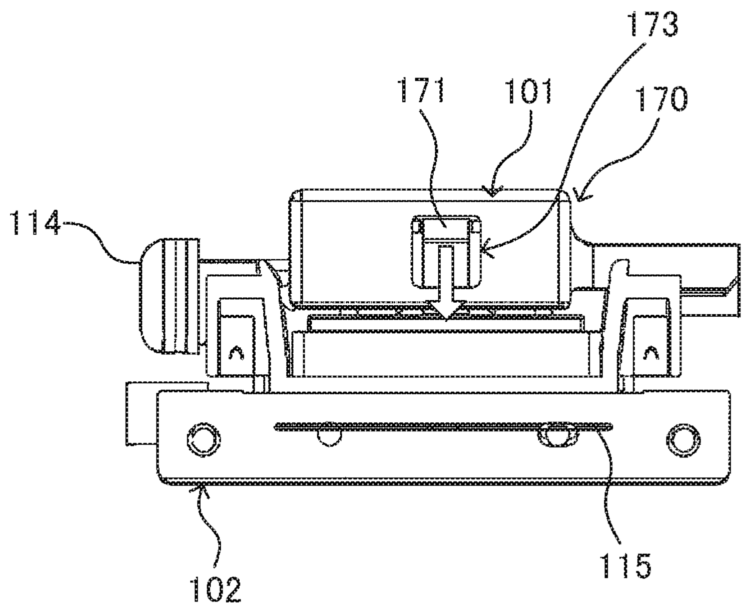
FIGS. 15A and 15B are explanatory views of an outline of a pressing mechanism.
Figure 15B:
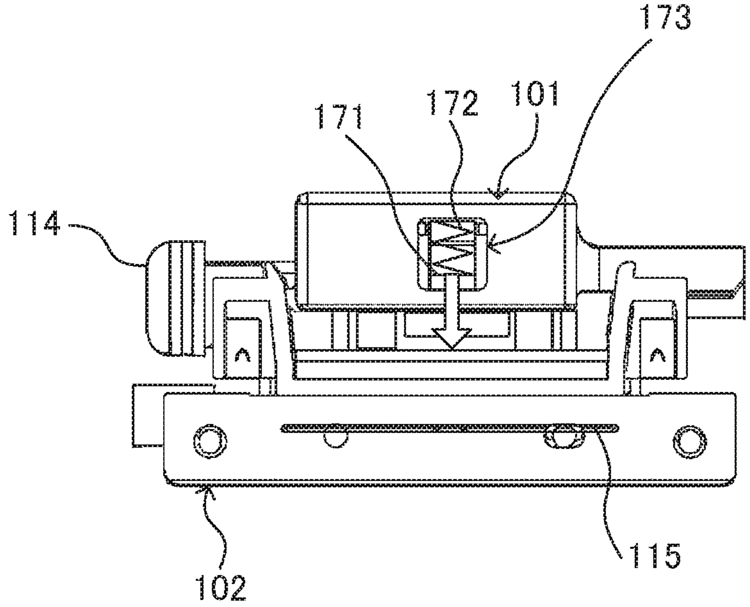
Figure 16A:
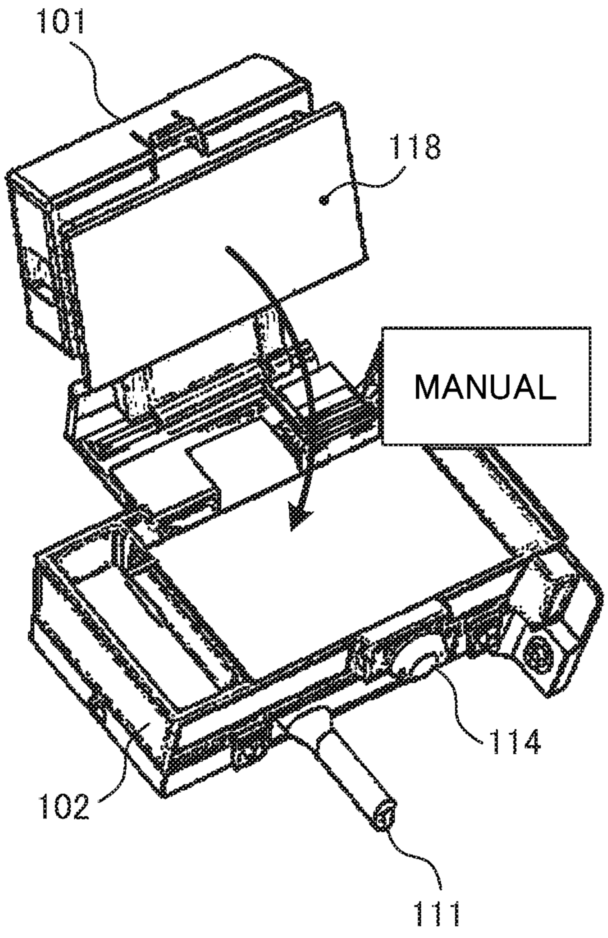
FIGS. 16A and 16B are explanatory views of a procedure when a card or a card bundle is pressed by the pressing mechanism.
Figure 16B:
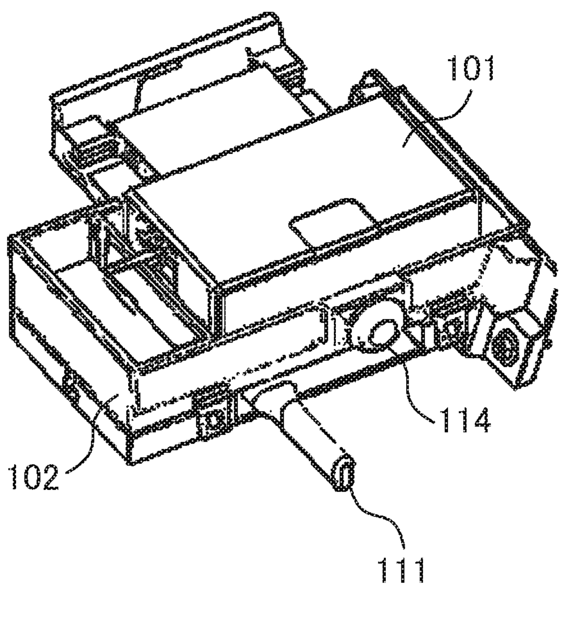

FIGS. 15A and 15B are explanatory views of an outline of the pressing mechanism 101. FIG. 15A is a view illustrating a plurality of cards C, for example ten cards, pressed by the pressing mechanism 101, and FIG. 15B is a view illustrating one card C pressed by the pressing mechanism 101. FIGS. 16A and 16B are explanatory views of a procedure when a card C or a card bundle is pressed by the pressing mechanism 101. FIG. 16A is a view explaining setting a card bundle or the like, and FIG. 16B is a view explaining pressing after the setting.

In order to enable conveyance of a warped card, as a mechanism to reduce the warpage by pressing the card bundle from above as illustrated in FIGS. 15A and 15B to convey the card C without difficulties, the pressing mechanism 101 is added.

In this manner, with the pressing mechanism 101 to press the card C in the thickness direction, even a warped card can be pressed in the thickness direction by the pressing mechanism 101 to reduce the warpage to be conveyed.

In order to secure the pressing force upon pressing even in the case where the thickness of the card bundle varies, the pressing compression spring 172 is installed inside the pressing mechanism 101, thereby allowing the pressing plate 118 to move vertically depending on the thickness of the card bundle.

In other words, the pressing plate 118 to press the cards C contacts the uppermost surface of the stacked cards C and is movable in the thickness direction of the cards C depending on the thickness of the stacked cards C.

With this arrangement, even in the case where a card C is conveyed or newly added and the thickness of the stacked cards C changes, the pressing force can be applied.

In addition, the elastic force of the pressing force compression spring 172 is leveraged as pressing force to press the cards C.

This arrangement allows the pressing mechanism 101 to move and to press in the thickness direction depending on the stacked cards C with a simple structure, which reduces the cost and enhances the layout property.

The pressing mechanism 101 includes at least one pressing plate supporting member 171 having a pressing function and a pressing guide 173 to restrict the displacement direction of the pressing plate supporting member 171 in the thickness direction of the cards C. Sliding parts of the pressing plate supporting member 171 and the pressing guide 173 are made of a polyoxymethylene (POM) material.

With this arrangement, by using a POM material having good sliding performance, the resistance at the time of displacement can be reduced, thus allowing the pressing operation to be stably performed.

The operation procedure includes stacking (setting) the card bundle in the case with the pressing mechanism 101 opened as illustrated in FIGS. 16A and 16B, then manually closing the pressing mechanism 101 to press the card bundle to allow a desired number of cards to be conveyed. Thereafter when releasing the press by the pressing mechanism 101, pressing the pressing mechanism release button 114 automatically opens the pressing mechanism 101 by a torsion coil spring to return to the open state again.

Next, a card conveying mechanism will be described with reference to FIGS. 17A to 17C.

Figure 17A:
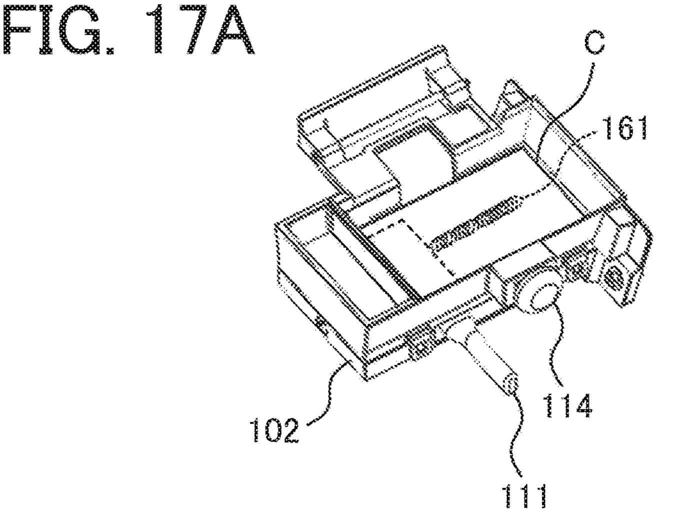
FIGS. 17A to 17C are explanatory views of a flow of operation when a card is conveyed.
Figure 17B:
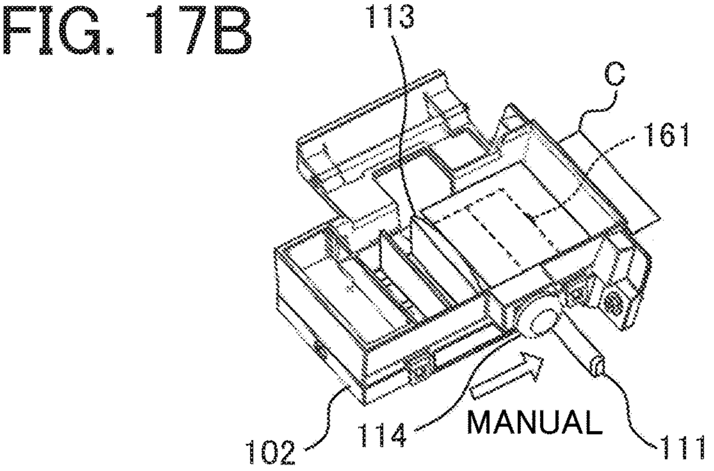
Figure 17C:
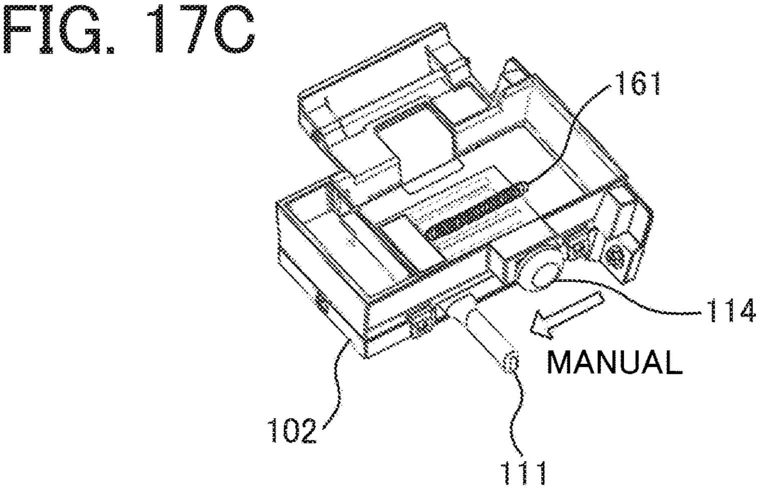

FIGS. 17A to 17C are explanatory views of a flow of operation when a card is conveyed. FIG. 17A is a view illustrating the card conveying lever 111 is in the home position (hereinafter referred to as "HP" as appropriate). FIG. 17B is a view illustrating a card conveying lever 111 moved to convey a card C, and FIG. 17C is a view illustrating the card conveying lever 11 returned to the HP after conveyance of the card C.

As a series of operations to convey the card C, a user moves the card conveying lever 111 as illustrated in FIG. 17A, in conjunction with which a card trailing end extruding member 113 including an extruding surface to extrude the card moves to push the trailing end of the card by the surface to convey the card C. Releasing the hand after the card conveying lever 111 is moved to its maximum position allows the card conveying lever 111 to automatically return to the home position by the spring.

Here, although the pressing mechanism 101 is closed during the above-described series of operations, the pressing mechanism 101 is omitted in FIGS. 17A to 17C to facilitate understanding.

A card exit of the card stack case is coupled to the manual insertion document port inside the ADF 5. The leading end of the card C conveyed inside the stacker case 102 is pressed against a nip of a manual feed inlet roller in the ADF 5, and then the card C is prefed inside of the main body of the ADF 5.

Next, a separation mechanism of cards by an opening and closing mechanism (shutter) having the gate 120 or other components to be opened and closed will be described with reference to FIGS. 18A to 18E.

Figure 18A:
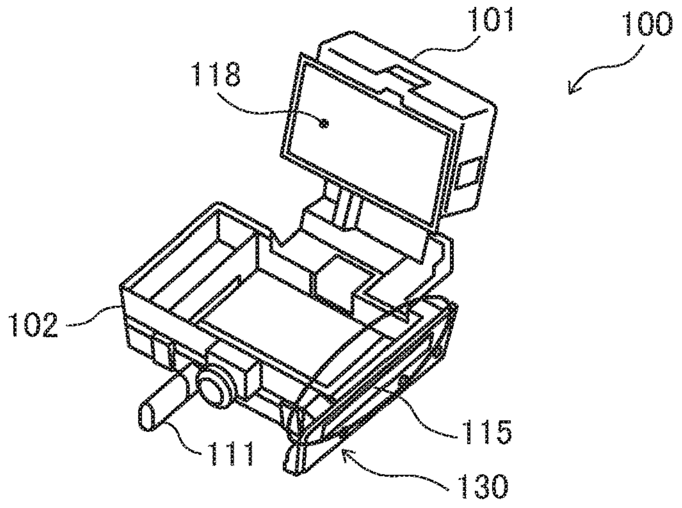
FIGS. 18A to 18E are explanatory views of a separation mechanism of cards by the document feeder assisting device.
Figure 18B:
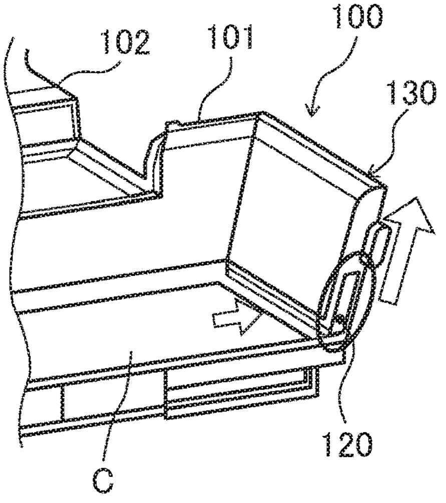
Figure 18C:
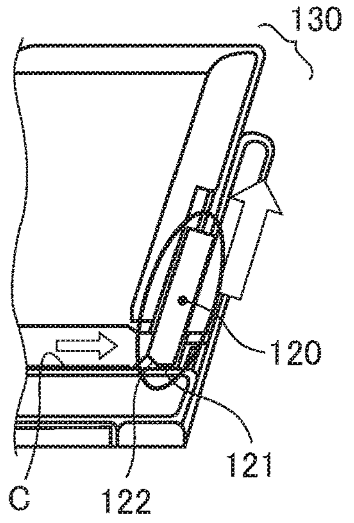
Figure 18D:
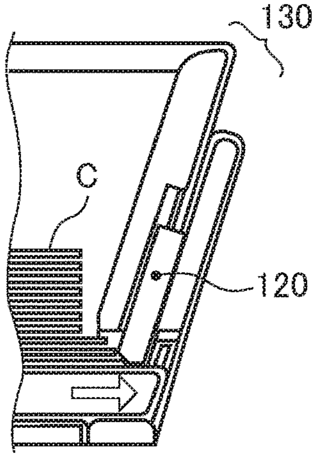
Figure 18E:
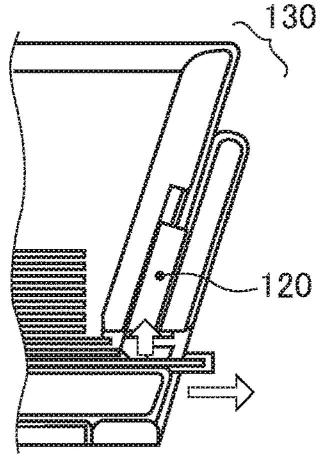
Figure 19:
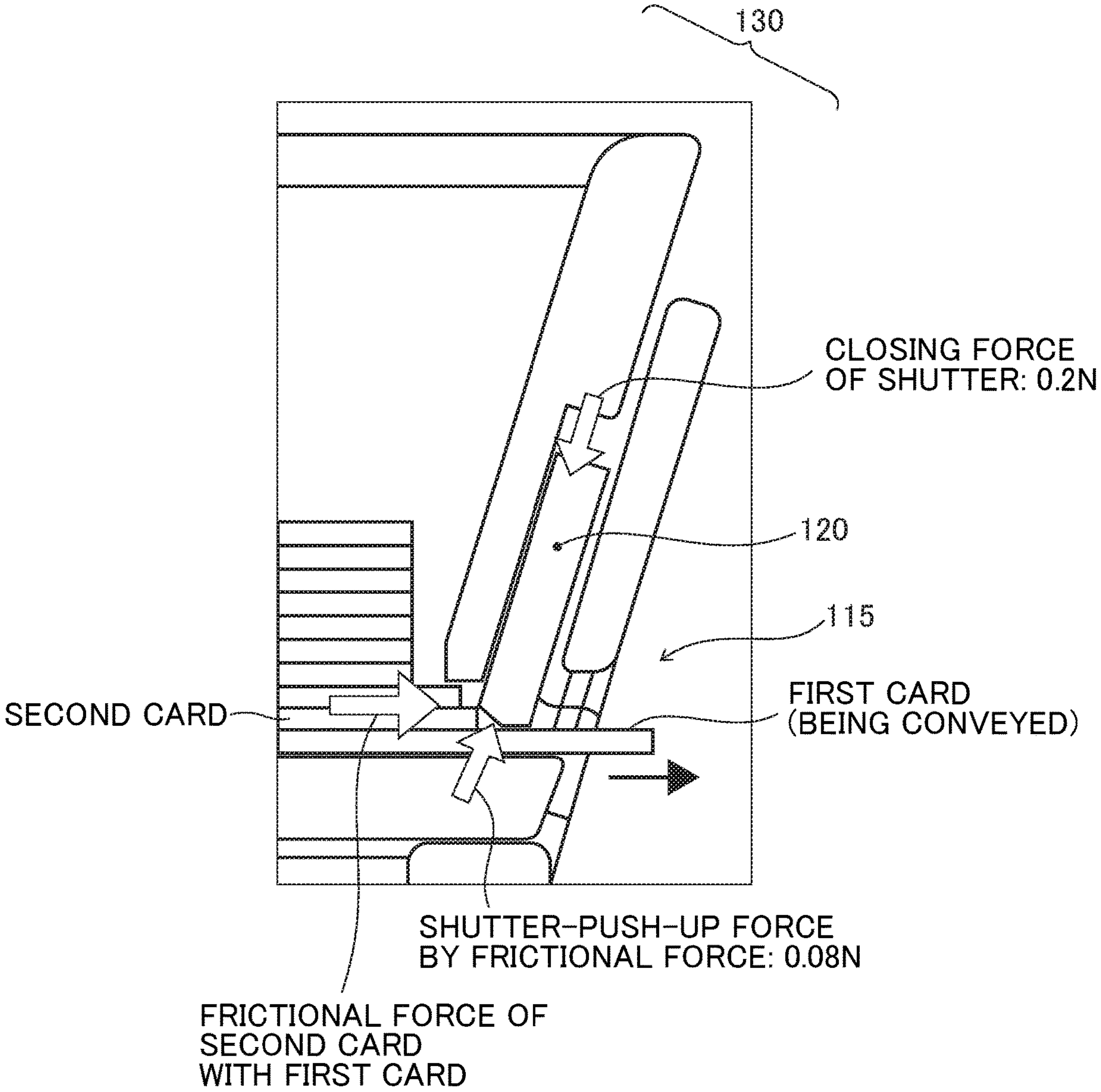
FIG. 19 is an explanatory view of forces generated in a second card when a plurality of cards is stacked.

FIGS. 18A to 18E are explanatory views of a separation mechanism of cards C by the document feeder assisting device 100. FIG. 18A is a perspective explanatory view of the pressing mechanism 101 in an open state, and FIGS. 18B and 18C are explanatory views of the case where one card C is placed. Meanwhile, FIGS. 18D and 18E are explanatory views of the case where a plurality of cards C is stacked. FIG. 19 is an explanatory view of forces generated in a second card when a plurality of cards C is stacked.

Here, in FIGS. 18B, 18C, 18D, 18E, and 19, the direction of conveyance of the card C is illustrated to be substantially a horizontal direction. In an actual state, however, the card C is gradually conveyed upwardly toward the downstream side of the direction of conveyance of the card C. Accordingly, the energizing direction of the gate 120 energized by the compression springs 140 becomes substantially vertical.

To be more specific, as illustrated in FIG. 11, the document feeder assisting device 100 of Embodiment 1 is provided such that the energizing direction of the gate 120 energized by the compression springs 140 to be substantially parallel to the gravity direction. Accordingly, the energizing direction of the gate 120 energized by the compression springs 140 is substantially vertical.

For compatibility with various card thicknesses, in the document feeder assisting device 100 of Embodiment 1, the gate 120 is pushed up to be opened by the card C by the conveying force of the card C as illustrated in FIGS. 18A to 18E. In addition, compression springs 140 are provided on an upper part of the gate 120 to generate a closing force when the card C pushes up the gate 120 to open the gate 120.

Specifically, as illustrated in FIGS. 18B and 18C, when a single card C alone is placed on the placement surface 105 of the card stacker 112 and conveyed in the direction of the arrow in the drawings, the leading end of the card C is brought into contact with the second surface 122 of an obliquely-chamfered shape of the gate 120. Due to a component of this force of contact, the gate 120 is pushed up and rises obliquely upward in the drawings and thereby opens.

Here, until the card C comes into contact with the gate 120, the gate 120 is closed with the first surface 121 parallel to the placement surface 105 being in contact with the placement surface 105 of the card stacker 112 by the weight of the gate itself and the energizing force of the compression springs 140.

Meanwhile, as illustrated in FIGS. 18D and 18E, when a plurality of cards C is placed on the placement surface 105 of the card stacker 112 and conveyed in the direction of the arrow in the drawings, the leading end of a first card C first comes into contact with the second surface 122 which is an obliquely-cut portion of the gate 120 to raise the gate 120.

However, since frictional force with the first card C is generated in a second card overlaid immediately on the first card C when the lowermost first card C is conveyed, there is a possibility that the second card pushes up the gate 120 together in conjunction with the first card C and is thereby conveyed, resulting in double feeding.

In order to prevent this double feeding, in the present embodiment as illustrated in FIG. 19, a design value of the closing force of the gate 120 is set to 0.2 N so as to exceed "0.08 N that is a component of the frictional force with the first card C of the second card" and to include the tolerance.

As illustrated in FIGS. 10 and 11, the document feeder assisting device 100 of the present embodiment described above includes the card stacker 112, functioning as a document tray, having the placement surface 105 as a document placement surface on which cards C are stacked. The document feeder assisting device 100 also includes the card conveying lever 111 functioning as a conveyance device to convey a card C stacked on the top surface toward the card insertion slot 7 which is a feed port included in the vicinity of the intermediate portion of the document conveyance passage 55 of the ADF 5. Further included is the gate 120 that is energized by the compression springs 140 in a direction substantially orthogonal to the placement surface 105 of the card stacker 112 and can be opened and closed by being displaced in the energizing direction.

The gate 120 has a first surface such as the first surface 121 that contacts the placement surface 105 when the gate 120 is closed as illustrated in FIGS. 11 and 18A to 18E and a second surface such as the second surface 122 that receives a force in a direction opposite to the energizing direction when the gate 120 is opened by a document contacting during conveyance.

With this arrangement the following effects can be obtained.

The comparative document feeder assisting device is not convenient that when structured to convey a document toward a feed port included in the vicinity of an intermediate portion of a conveyance passage of an ADF, the device such as the ADF including the document feeder assisting device has a larger size or incurs a higher cost.

Specifically, since it is necessary to secure a predetermined length for a rotary rib to separate documents and the length (length of the arm) of a document table, and the distance from the line of action of the force applied to the document to the center of rotation, the horizontal size of the ADF or other devices including the document feeder assisting device is likely to be significantly large.

In addition, since the contacting part for the rotary rib to press the document is a point, in order to apply a predetermined conveyance resistance force to separate the document, a driving motor of a high torque to rotate the document table is necessary, thus increasing the cost of the ADF or the other devices.

On the other hand, in the present embodiment, the gate 120 to separate the plurality of cards C has the first surface 121 energized by the compression springs 140 in the direction substantially orthogonal to the placement surface 105 and when closed, contacting the placement surface 105 as well as the second surface 122 which receives a force in the direction opposite to the energizing direction when opened by a card C contacting during conveyance.

This arrangement can reduce the horizontal size as compared with the structure including the comparative rotary rib to separate a document or the document table and enables use of the compression springs 140 as the energizing member, and thus it is not necessary to include a driving motor of a high torque that increases the cost of the comparative structure.

This enables provision of the document feeder assisting device 100 capable of preventing an increase in the size or increasing the cost of the ADF 5 or other devices including the document feeder assisting device 100.

Here, another method to separate a card C is also conceivable, in which a hole slightly larger than the thickness of the card C is simply formed at the same position as the gate 120 to separate the card C. However, this method is not employed. The reason why the structure to separate a card C by opening and closing the gate 120 will be described.

As mentioned above, since there are many demands for scanning plastic cards such as registration cards and IDs in medical services, it is desirable to be compatible with scanning of cards C having various thicknesses of less than or equal to 0.8 [mm].

However, major hospitals integrate registration cards to a thickness of 0.76 [mm] which is the JIS standards, whereas relatively small clinics may use cards of about 0.5 [mm] thick in some cases, and thus the thickness of registration cards used varies from hospital to hospital.

In the method of forming a hole slightly larger than the thickness of the card C described above, for example, the hole to separate a card having a thickness of 0.76 [mm], which is the JIS standards thickness often used in hospitals, generally has a height of about 0.85 [mm] to 0.9 [mm] including tolerance.

Meanwhile, in the case where cards of a thickness of 0.48 [mm], which is also the JIS standards thickness often used in hospitals like the cards having a thickness of 0.76 [mm], are separated using this hole, two cards have a thickness of about 0.96 [mm]. Therefore, it is difficult to stably convey documents since there are cases such as that two cards of 0.48 [mm]thick pass (double feeding) depending on a processing tolerance of the hole or that two cards are jammed while passing the hole and cause a conveyance failure.

Enhancing the processing precision to form a hole having a height of about 0.85 [mm] incurs an additional cost. In other words, it is difficult to ensure compatibility with various card thicknesses in the method to form a hole matching the card thickness at the same position, and it is not inconvenient that the card thickness is limited.

Contrary to this, according to the separation method using the gate 120 of the present embodiment, the gate 120 is displaced by the thickness of the card C to open or close. Therefore, by including the gate 120 and the energizing member enables stable conveyance of cards of various types of thicknesses.

With the arrangement as described above, the document feeder assisting device 100 of the present embodiment can achieve the following effects.

As described above, the comparative document feeder assisting device has an inconvenience that when structured to convey a document toward a feed port included in the vicinity of an intermediate portion of a conveyance passage of an ADF, the device such as the ADF including the document feeder assisting device has a larger size or incurs a higher cost.

Specifically, since it is necessary to secure a predetermined length for a rotary rib to separate documents and the length (length of the arm) of a document table, and the distance from the line of action of the force applied to the document to the center of rotation, the horizontal size of the ADF or other devices including the document feeder assisting device is likely to be too large.

In addition, since the contacting part for the rotary rib to press the document is a point, in order to apply a predetermined conveyance resistance force to separate the document, a driving motor of a high torque to rotate the document table is necessary, thus increasing the cost of the ADF or the other devices.

Meanwhile in the document feeder assisting device 100 of the present embodiment described above, the gate 120 to separate cards C as described above is a member having the following two surfaces.

The gate 120 has the first surface 121 energized by the compression springs 140 in the direction substantially orthogonal to the placement surface 105 of the card stacker 112 and when closed, contacting the placement surface 105 as well as the second surface 122 which receives a displacing force in the direction opposite to the energizing direction when opened by a card C contacting during conveyance.

This arrangement can reduce the horizontal size as compared with the structure including the comparative rotary rib to separate a document or the document table and enables use of the compression springs 140 as the energizing member, and thus it is not necessary to include a driving motor of a high torque that increases the cost of the comparative structure.

This enables provision of the document feeder assisting device 100 capable of preventing an increase in the size or increasing the cost of the ADF 5 including the document feeder assisting device 100, the reading device 6 including the ADF 5, or the image forming apparatus 1 including the ADF 5 or the reading device 6.

In the document feeder assisting device 100 of the present embodiment, it is preferable to set the thickness of a card C to be conveyed to within a range from 0.48 [mm] to 0.78 [mm].

According to this arrangement, cards C having various thicknesses within a range from 0.48 [mm] to 0.78 [mm] can be reliably conveyed.

More specifically, documents having a thickness of about 0.5 [mm], which is often the size of registration cards in hospitals, along with cards having a thickness of 0.48 [mm] or 0.78 [mm] conforming to the JIS II standards can be dealt with.

Furthermore, in the document feeder assisting device 100, it is preferable that the vertical and horizontal dimensions of a card C to be conveyed are 53.98 [mm] and 85.60 [mm], respectively.

According to the above, the following effects can be obtained.

The above dimensions of the card C conform to the JIS II standards, which are often conveyed to the card insertion slot 7 included in the vicinity of the intermediate portion of the document conveyance passage 55 of the ADF 5.

Therefore, many of registration cards in hospitals, credit cards, cash cards, driver's licenses, individual number cards, and the like can be conveyed in a preferable manner. Moreover, in the document feeder assisting device 100, it is preferable that a document to be conveyed is at least one of a "carrier sheet," a "plastic card," a "postcard," an "envelope," a "form," a "clear file holder," and a "business card."

According to this, even a document having a thickness thicker than the thickness of a general sheet document S can be preferably conveyed toward the card insertion slot 7 included in the vicinity of the intermediate portion of the document conveyance passage 55 of the ADF 5.

Furthermore, it is preferable that the document feeder assisting device 100 is attachable to and detachable from the ADF 5.

According to the above, the document feeder assisting device 100 can be detached from the ADF 5 when not in use, which can downsize the ADF 5, the reading device 6, and the image forming apparatus 1 to which the document feeder assisting device 100 is to be attached.

Next, conveyance of a card C by the document feeder assisting device 100 according to the present embodiment will be described with reference to drawings.

Figure 20A:
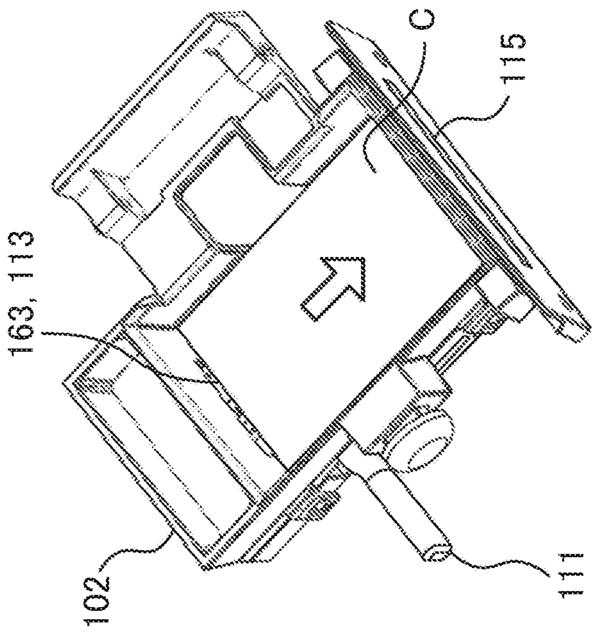
FIGS. 20A and 20B are views illustrating a state in which an extruding surface extrudes the trailing end of a card to convey the card.
Figure 20B:
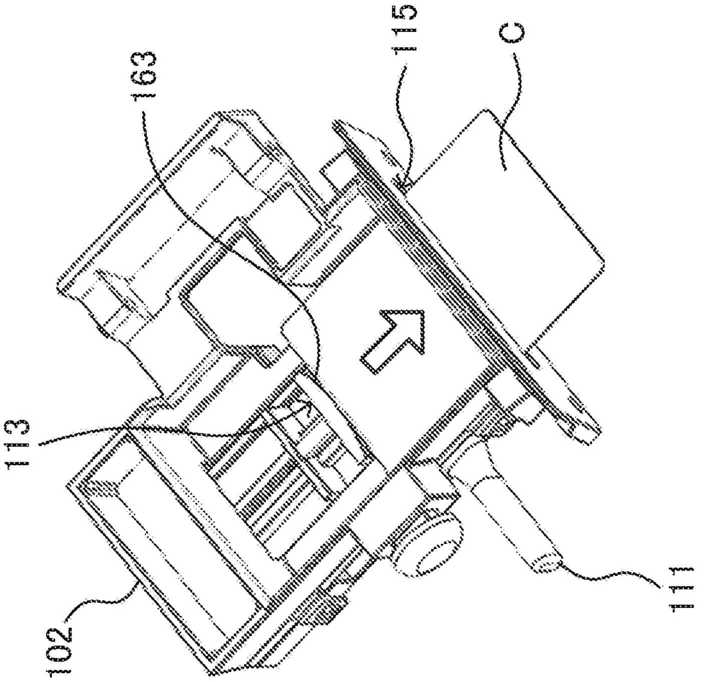

FIGS. 20A and 20B are views illustrating a state in which the extruding surface 163 extrudes the trailing end of a card C to convey the card C. FIG. 20A is a view illustrating the initial stage of conveyance, and FIG. 20B is a view illustrating a state in which the card C is conveyed so as to be about half extruded from the ejection port 115.

As illustrated in FIG. 20A, in Embodiment 1, the extruding surface 163 included on the card trailing end extruding member 113 contacts the trailing end (CE) of the card C in the card conveyance direction on the upstream side in the card conveyance direction, and transfers a force in the card conveyance direction to at least a part of the trailing end of the card C.

Due to this transfer, the force in the card conveyance direction applied by the user to the card conveying lever 111 is transferred to the card C, and the card C is extruded and conveyed as illustrated in FIG. 20B.

With this arrangement, the following effects can be obtained.

Although the function to convey the card C can be implemented by installing conveyance rollers on and under the card C in the thickness direction, the size of the device itself is increased in the thickness direction depending on the diameter of the conveyance rollers. On the other hand, in the structure in which a force is applied to the trailing end of the card C, the conveying function can be implemented without increasing the size of the device itself as in the structure in which the conveyance rollers are installed on and under the card C in the thickness direction.

Next, a structure to convey the card C by interlocking the card conveying lever 111 and the card trailing end extruding member 113 will be described with reference to drawings.

Figure 21B:
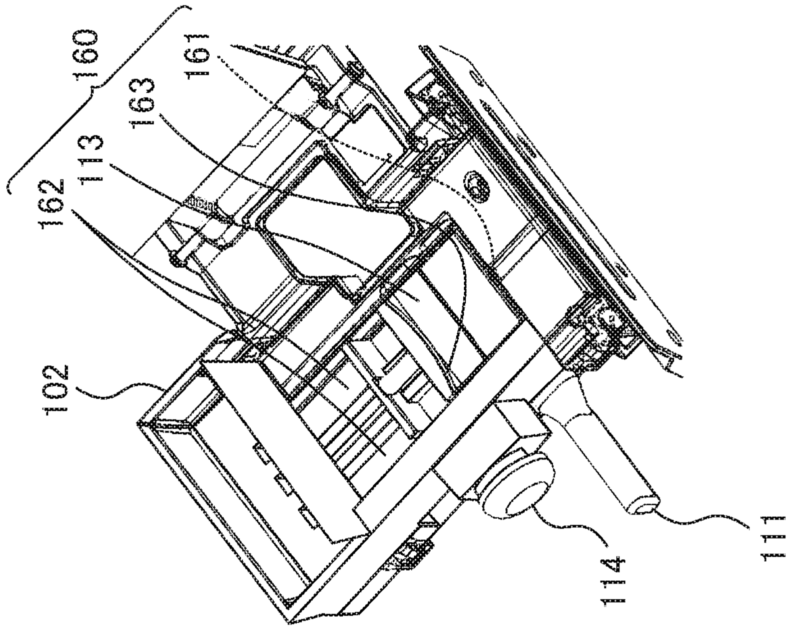
FIGS. 21A and 21B are views illustrating a card conveying lever and the trailing end of a card extruding part moving in conjunction with each other.
Figure 21A:
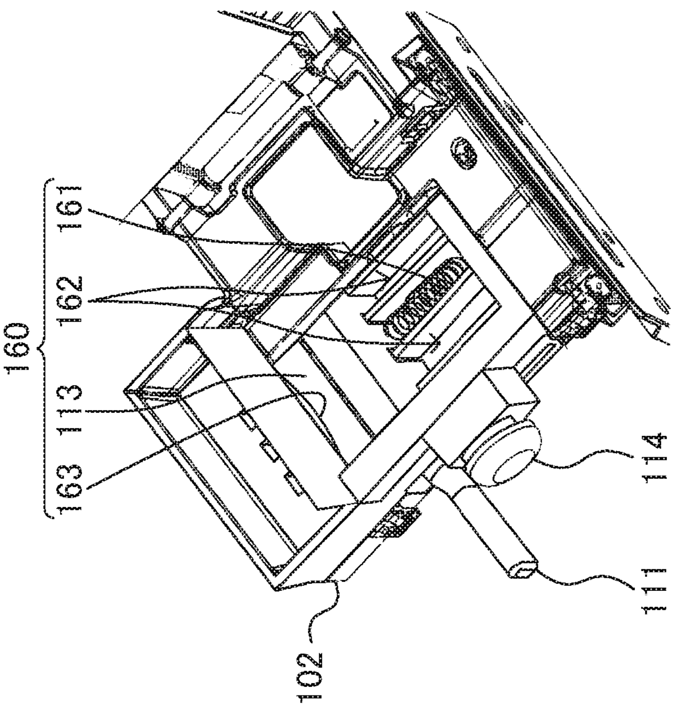
Figure 22:
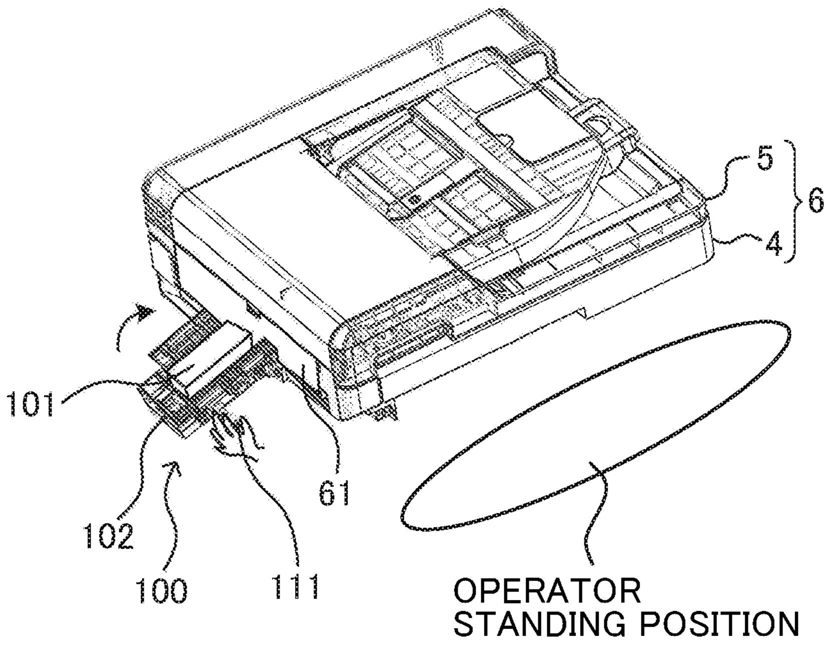
FIG. 22 is an explanatory view of the positional relationship between the card conveying lever and the position of a user.

FIGS. 21A and 21B are views illustrating the card conveying lever 111 and the card trailing end extruding member 113 moving in conjunction with each other. FIG. 21A is a view illustrating the initial stage of conveyance, and FIG. 20B is a view illustrating a state in which the card conveying lever 111 is moved to the maximum. FIG. 22 is an explanatory view of the positional relationship between the card conveying lever 111 and the position of a user.

As illustrated in FIGS. 21A and 21B, when force along the conveyance direction is applied to the card conveying lever 111, the card conveying lever 111 and the card trailing end extruding member 113 move in the card conveyance direction in conjunction with each other while guided by slide grooves 162 and other parts. At this time, when a card C is placed, the extruding surface 163 formed in the card trailing end extruding member 113 transfers the force in the card conveyance direction to at least a part of the trailing end of the card C, thereby conveying the card C.

In other words, the conveyance device of the present embodiment includes the document conveying mechanism including the card trailing end extruding member 113 and other components to extrude the card C and the card conveying lever 111. With the movement of the document conveying mechanism interlocked with the movement of the card conveying lever 111, force is applied to the trailing end of the document in the card conveyance direction.

With this arrangement, a user can intuitively move the card conveying lever 111 in the card conveyance direction to convey the card C in the same direction.

Here, as illustrated in FIG. 22, the card conveying lever 111 protrudes toward an operator who operates the document feeder assisting device at the time of conveying the document.

With this arrangement, the user can easily operate the card conveying lever 111.

Next, with reference to drawings, description will be given on a structure in which the card conveying lever 111 and the document conveying mechanism automatically return to the home positions by an elastic member when the card conveying lever 111 strikes MAX.

Figure 23A:
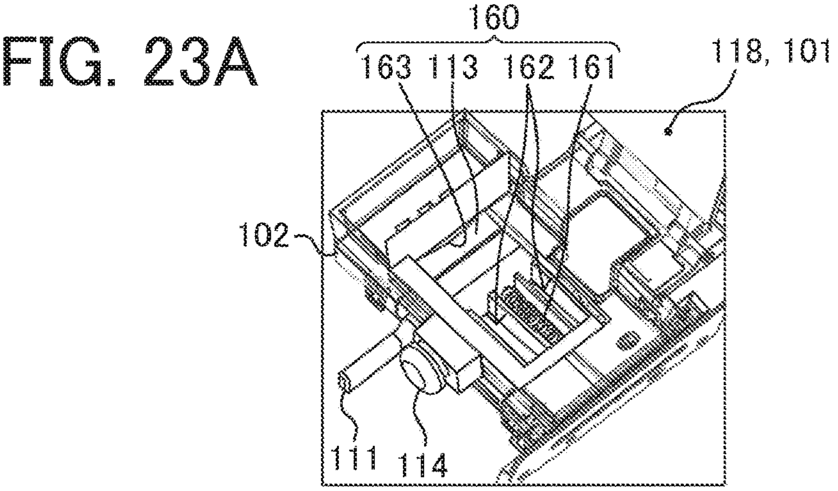
FIGS. 23A to 23C are views illustrating the card conveying lever and the document conveying mechanism automatically return to the home positions by an elastic member when the card conveying lever strikes MAX.
Figure 23B:
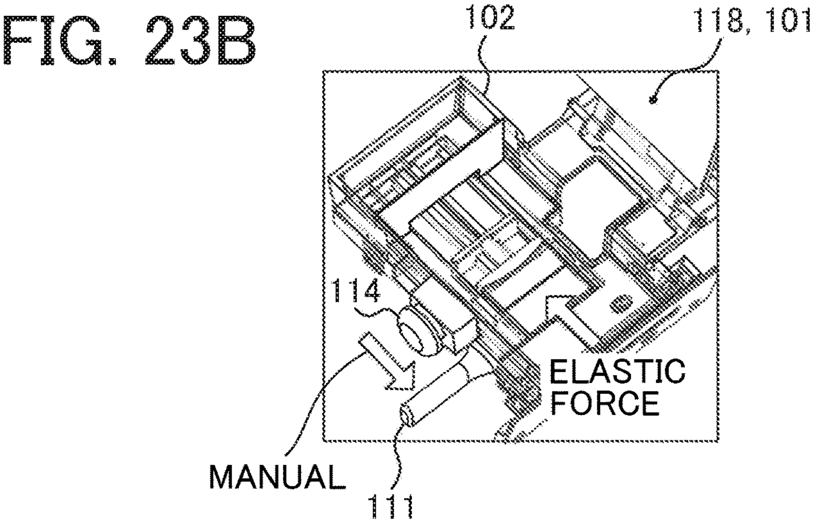
Figure 23C:
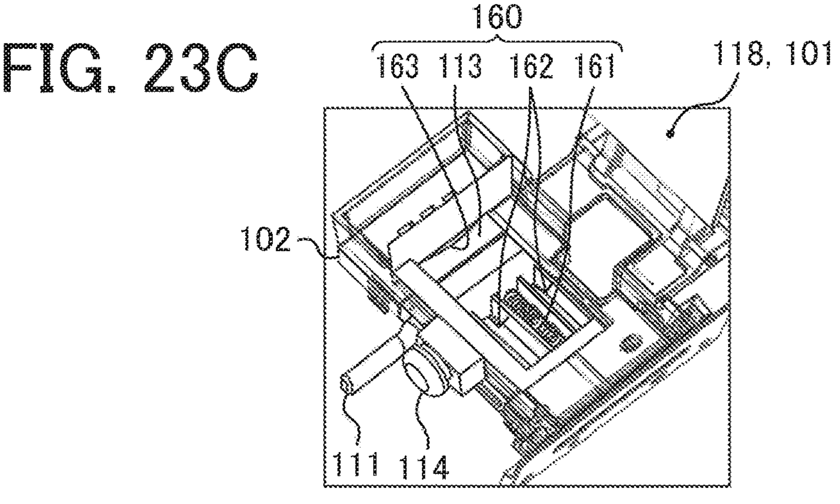

FIGS. 23A to 23C are views illustrating the card conveying lever 111 and the document conveying mechanism automatically return to the home positions by an elastic member when the card conveying lever 111 strikes the MAX. FIG. 23A is a view illustrating the initial state. FIG. 23B is a view illustrating the card conveying lever 111 being manually moved, and FIG. 23C is a view illustrating the card conveying lever 111 returned to the HP.

In the present embodiment, the conveyance device includes a returning compression spring 161 which is an elastic member to automatically return the card conveying lever 111 and the document conveying mechanism to the home positions.

Since the card C is conveyed by pushing the trailing end of the card by the extruding surface 163 of the document conveying mechanism, when the card C is conveyed, the document conveying mechanism is to be positioned on the outer side than the end of the document. This is because in the case where the extruding surface 163 of the document conveying mechanism is retracted below the cards C in the thickness direction, the trailing end of the card cannot be pushed in the conveyance direction, thus failing to convey the card C.

With the structure enabling automatic return to the home positions as described above, immediately after the card C is conveyed, that is, from the MAX position stroked by the card conveying lever 111, it is ensured that the card conveying lever 111 returns to the home position without the user's operation. That is, when the user returns the card conveying lever 111 to the home position, the card conveying lever 111 does not stop midway (under the stacked cards C in the thickness direction).

Therefore, this structure can ensure to prevent conveyance failure of the stacked documents and also, at the same time, eliminate the burden of the user to return the lever to the home position.

Incidentally, as the elastic member to automatically return the card conveying lever 111 and the document conveying mechanism to the home positions, it is preferable to use a compression spring as described above.

This arrangement implements a simple structure, reduces the cost, and enhances the layout property.

A preferable relationship between the line of action of the elastic member and the position of the center of gravity of the movable part in the structure in which the card conveying lever 111 and the document conveying mechanism are automatically returned to the home positions by using the elastic member as described above will be described with reference to FIG. 24.

Figure 24:
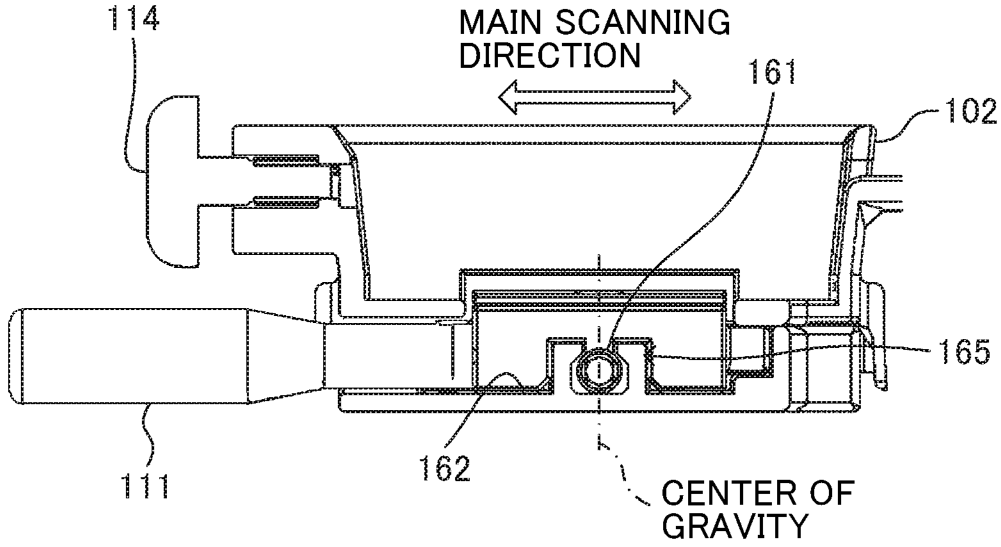
FIG. 24 is an explanatory view of the positional relationship between the line of action of the elastic member and the position of the center of gravity in the main-scanning direction of a movable part that conveys a card.

FIG. 24 is an explanatory view of the positional relationship between the line of action of the elastic member and the position of the center of gravity in the main-scanning direction of movable parts that conveys a card C.

It is preferable that the position of the line of action by the elastic member such as the compression spring 161 and the position of the center of gravity in the main-scanning direction of movable parts such as the card trailing end extruding member 113 and the card conveying lever 111 to convey a card C substantially coincide with each other as illustrated in FIG. 24.

With this arrangement, since the card trailing end extruding member 113, the card conveying lever 111, and other components included in the document conveying mechanism can be positioned at the home positions without being oblique, and thus the extruding surface at the trailing end of the document can be pushed orthogonal to the trailing end surface of the document.

Next, with reference to drawings, description will be given on a slide guide 165 to regulate and to guide movement of the card conveying lever 111 and a document conveying mechanism 160 in the card conveyance direction.

Figure 25A:
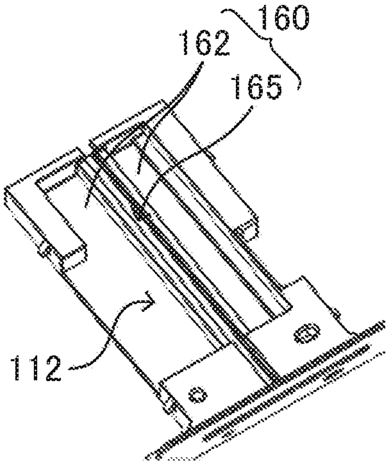
FIGS. 25A to 25D are explanatory views of a guide to regulate and to guide movement of the card conveying lever and the document conveying mechanism in the card conveyance direction.
Figure 25B:
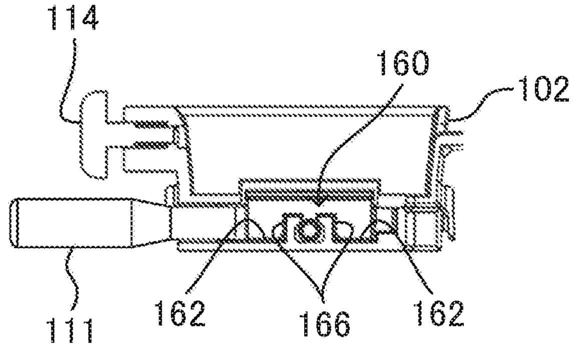
Figure 25C:
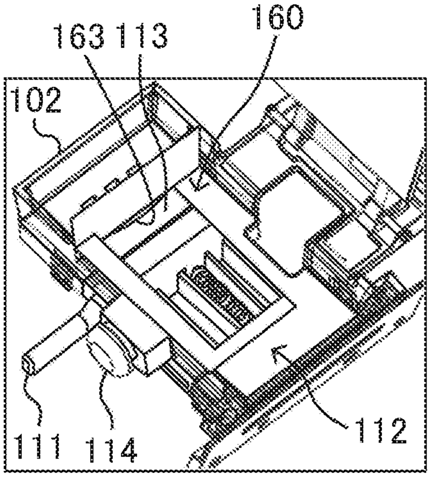
Figure 25D:
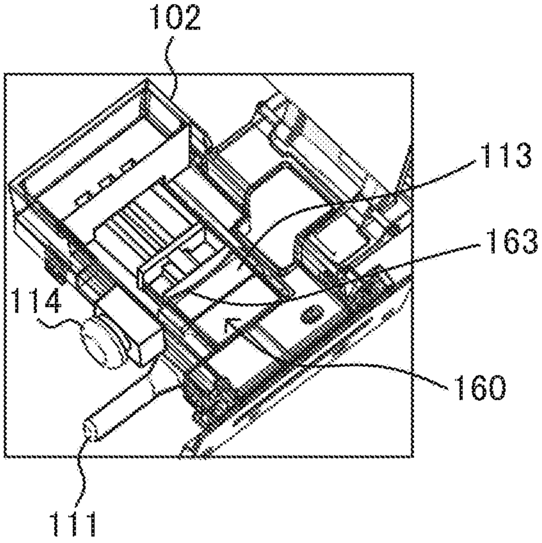

FIGS. 25A to 25D are explanatory views of the slide guide 165 to regulate and to guide movement of the card conveying lever 111 and the document conveying mechanism 160 in the card conveyance direction. FIG. 25A is an explanatory view of the slide guide 165 included at the bottom of the stacker case 102. FIG. 25B is an explanatory cross-sectional view of the slide guide in the main-scanning direction, FIG. 25C is an explanatory view of the card conveying lever 111 in the home position, and FIG. 25D is an explanatory view of the card conveying lever 111 striking the MAX.

As illustrated in FIG. 25A, the slide guide 165 is included on the bottom of the stacker case 102 while sandwiched between two rows of slide grooves 162 along the card conveyance direction. As illustrated in FIG. 25B, the cross-section of the slide guide 165 in the main-scanning direction has a protruding shape sandwiched by the two slide grooves 162 with two outer side surfaces serving as guide surfaces 166 to guide a recessed inner side surfaces of the card conveying lever 111 and the document conveying mechanism 160.

The card conveying lever 111 and the document conveying mechanism 160 guided by the slide guide 165 slide along the card conveyance direction between the home positions illustrated in FIG. 25C and the position of the card conveying lever 111 striking the MAX.

Incidentally, the direction of sliding is directed along a desired card conveyance direction. That is, with this arrangement, the card C can be conveyed in a desired direction.

Here, it is desirable that the sliding resistance between the two guide surfaces 166 of the slide guide 165 and guide surface 166 on which the two guide surfaces 166 are slid, that is, the conveyance resistance is low.

Therefore, in Embodiment 1, sliders of the card conveying lever 111, the document conveying mechanism 160, and the slide guide 165 are made of a POM material.

By using a POM material having good sliding performance, the conveying resistance can be reduced, thus enhancing the operational feeling of an operator.

As described above, the document feeder assisting device 100 of the present embodiment includes the card stacker 112 to stack the cards C conveyed toward the card insertion slot 7 of the ADF 5 and the pressing mechanism 101 to press the cards C toward the placement surface 105 of the card stacker 112. The document feeder assisting device 100 also includes the document conveying mechanism 160 to convey the card C. The pressing mechanism 101 is moved to allow the placement surface 105 of the card stacker 112 to be exposed above, on which the cards C are stacked.

With this arrangement, the following effects can be obtained.

In the document feeder assisting device 100*a* applied with the structure of the comparative conveying and stacking device, since a new card C is stacked after already-stacked cards C are retracted in a direction away from the card conveyance surface, one card C alone can be placed in the card stacker at a time.

Moreover, due to the dual function as the feed port to stack on the card stacker and the ejection port to eject a card C to the outside, each time a card C is stacked on the document stacker, the document feeder assisting device 100*a* has to be detached from the ADF 5 to stack a card C in the card stacker.

For the above reasons, the document feeder assisting device 100*a* applied with the structure of the comparative conveying and stacking device has the poor work efficiency for stacking cards C on the card stacker.

On the other hand, in the document feeder assisting device 100 of the present embodiment, since the pressing mechanism 101 is moved to allow the placement surface 105 to be exposed above, the number of cards C that can be stacked on the card stacker 112 can be stacked at a time. In addition, the stacking work can be performed while the document feeder assisting device 100 is kept attached to the ADF 5.

This enables provision of the document feeder assisting device 100 capable of enhancing work efficiency for stacking the cards C on the card stacker 112.

The document feeder assisting device 100 of the present embodiment includes the card stacker 112 to stack the cards C conveyed toward the card insertion slot 7 of the ADF 5 and the pressing mechanism 101 to press the cards C toward the placement surface 105 of the card stacker 112. The document feeder assisting device 100 also includes the document conveying mechanism 160 to convey a card C and other components. The document feeder assisting device 100 is attachable to and detachable from the ADF 5.

Further included is the opening and closing mechanism which opens and closes in conjunction with the card conveyance. The opening and closing mechanism includes the gate 120 which is raised and opened when a leading end of a card contacts in the card conveyance direction and closes when the document passes under. The conveyance device transfers operation force of the user operating the document feeder assisting device 100 at the time of conveying a card to the card C.

With this arrangement, the following effects can be obtained.

In the document feeder assisting device 100*a* applied with the structure of the comparative conveying and stacking device, the document feeder assisting device 100*a* includes, in the housing 195, the conveyance rollers 190*a* and the opposing roller 191*b* to convey a card C' as well as driving sources to drive these components.

Therefore, the document feeder assisting device 100*a* itself weighs a lot or is increased in size, and when a large number of cards C' are stacked, when the document feeder assisting device 100*a* is coupled to the ADF 5, the center of gravity G is biased on a side away from the ADF 5 as illustrated in FIG. 5B.

As a result, since the conveyance passage of the ADF 5 has a linear shape inclined so as to be higher toward the downstream side, substantially the whole device is pulled downward by the card stacker 112*a* and is positioned lower, thereby significantly interfering with the main body of the ADF 5. Furthermore, there is a risk that cards cannot be fed stably.

On the other hand, in the document feeder assisting device 100 of the present embodiment, the opening and closing mechanism that opens and closes in conjunction with the card conveyance includes the gate 120 which is raised and opened when a leading end of a card contacts in the card conveyance direction and closes when the document passes under.

In addition, the conveyance device transfers operation force of the user operating the document feeder assisting device 100 at the time of conveying a card to the card C.

As described above, unlike the document feeder assisting device 100*a* applied with the structure of the comparative conveying and stacking device, the document feeder assisting device 100 of the present embodiment does not need to separately include driving sources to separate cards or to convey a card. This can prevent the center of gravity G from being biased toward a side away from the ADF 5.

Therefore, this can prevent such cases from occurring that substantially the whole device is pulled downward by the card stacker 112 to be positioned lower to significantly interfere with the main body of the ADF 5 by moment or to fail to feed the cards.

In the document feeder assisting device 100 of the present embodiment, it is preferable to set the thickness of a card C to be conveyed to within a range from 0.48 [mm] to 0.78 [mm].

This arrangement can ensure conveyance of cards C having various thicknesses within a range from 0.48 [mm] to 0.78 [mm].

More specifically, documents having a thickness of about 0.5 [mm], which is often the size of registration cards in hospitals, along with cards having a thickness of 0.48 [mm] or 0.78 [mm] conforming to the JIS II standards can be dealt with.

Furthermore, in the document feeder assisting device 100, it is preferable that the vertical and horizontal dimensions of a card C to be conveyed are 53.98 [mm] and 85.60 [mm], respectively.

With this arrangement, the following effects can be obtained.

The above dimensions of the card C conform to the JIS II standards, which are often conveyed to the card insertion slot 7 included in the vicinity of the intermediate portion of the document conveyance passage 55 of the ADF 5.

Therefore, many of registration cards in hospitals, credit cards, cash cards, driver's licenses, individual number cards, and the like can be conveyed in a preferable manner.

Moreover, in the document feeder assisting device 100, it is preferable that a document to be conveyed is at least one of a "carrier sheet," a "plastic card," a "postcard," an "envelope." a "form," a "clear file holder," and a "business card."

With this arrangement, even a document having a thickness thicker than the thickness of a general sheet document S can be preferably conveyed toward the card insertion slot 7 included in the vicinity of the intermediate portion of the document conveyance passage 55 of the ADF 5.

Furthermore, it is preferable that the document feeder assisting device 100 is attachable to and detachable from the ADF 5.

With this arrangement, the document feeder assisting device 100 can be detached from the ADF 5 when not in use, which can downsize the ADF 5, the reading device 6, and the image forming apparatus 1 to which the document feeder assisting device 100 is to be attached.

Furthermore, the document feeder assisting device 100 is attachable to and detachable from the ADF 5.

With this arrangement, the document feeder assisting device 100 can be detached when not in use, which can downsize devices such as the ADF 5 (ADF 5, the reading device 6, and the image forming apparatus 1) to which the document feeder assisting device 100 is to be attached.

Furthermore, the ADF 5 of the present embodiment includes any one of the document feeder assisting devices 100 described above as a document conveyance assisting unit to convey a card C toward the card insertion slot 7 included in the vicinity of the intermediate portion of the document conveyance passage 55.

This arrangement enables provision of the ADF 5 that can achieve similar effects to the effects of any of the document feeder assisting devices 100 described above.

Furthermore, the reading device 6 of the present embodiment includes the ADF 5 including any one of the document feeder assisting devices 100 described above as a document conveyance assisting unit to convey a card C toward the card insertion slot 7 included in the vicinity of the intermediate portion of the document conveyance passage 55. This arrangement enables provision of the reading device 6 that can achieve similar effects to the effects of the ADF 5 including any of the document feeder assisting devices 100 described above.

Furthermore, the image forming apparatus 1 of the present embodiment includes the ADF 5 including any one of the document feeder assisting devices 100 described above as a document conveyance assisting unit to convey a card C toward the card insertion slot 7 included in the vicinity of the intermediate portion of the document conveyance passage 55.

This arrangement enables provision of the image forming apparatus 1 that can achieve similar effects to the effects of the ADF 5 including any of the document feeder assisting devices 100 described above.

Embodiment 2

First, Embodiment 2 of the document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

A document feeder assisting device 100 according to the present embodiment has a basic structure similar to the structure of Embodiment 1 described above. However, the structure of Embodiment 2 is different from the structure of Embodiment 1 in which a more preferable exemplary structure of the opening and closing mechanism is described.

Therefore, structures and effects similar to structures and effects of Embodiment 1 will be omitted from description as appropriate, and the same members will be denoted by the same symbol in the description unless it is particularly required to distinguish the members.

Figure 26A:
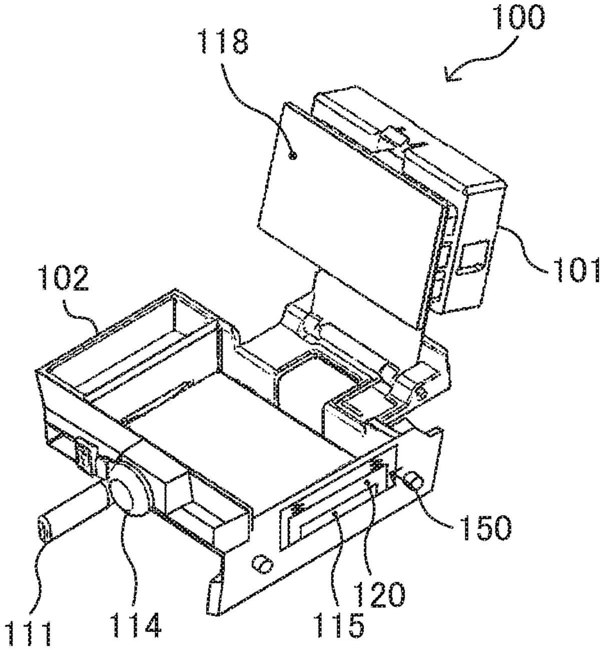
FIGS. 26A and 26B are explanatory views of an opening and closing mechanism when a gate is closed according to Embodiment 2 of this disclosure.
Figure 26B:
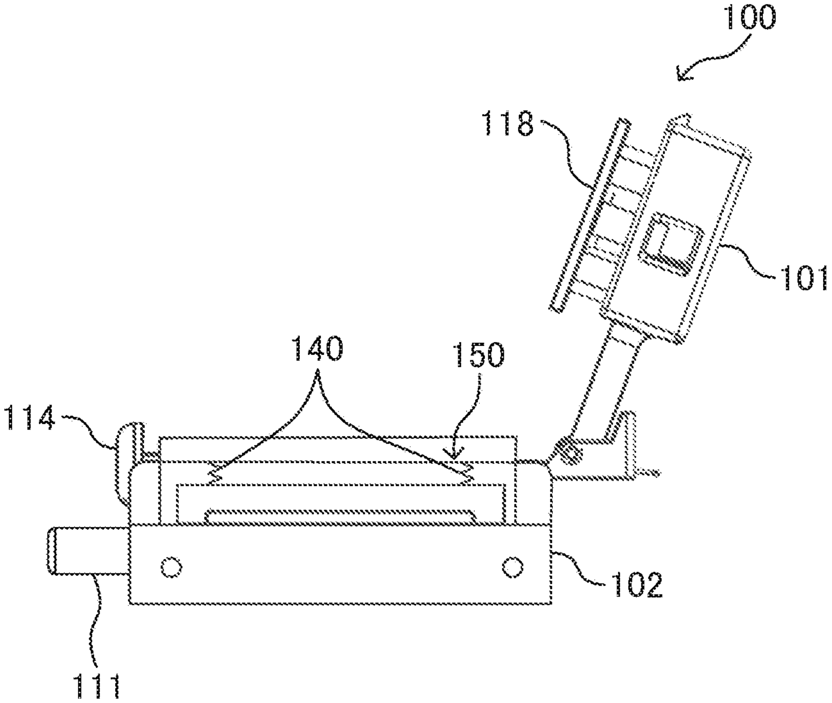
Figure 27A:
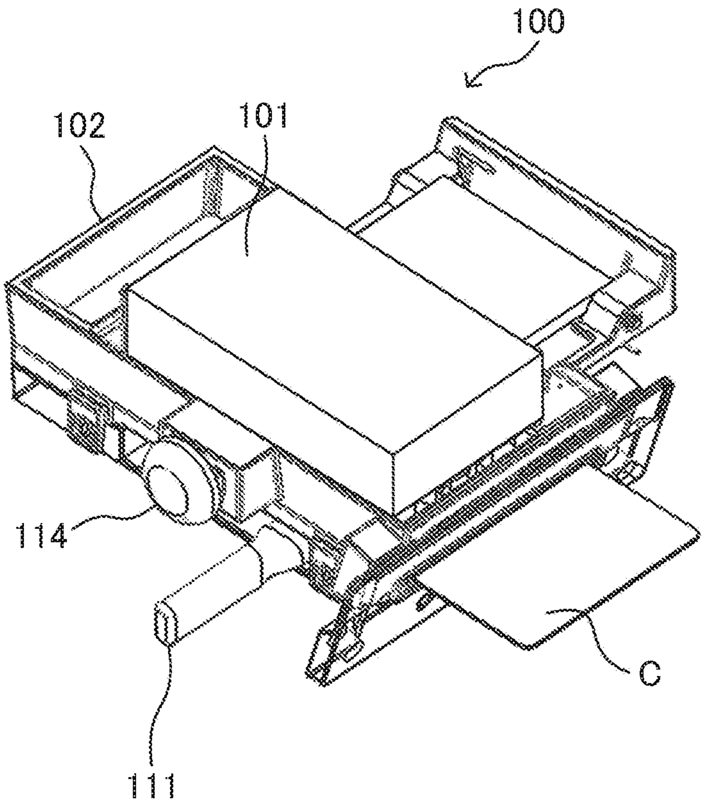
FIGS. 27A and 27B are explanatory views of the opening and closing mechanism when the gate is open.
Figure 27B:
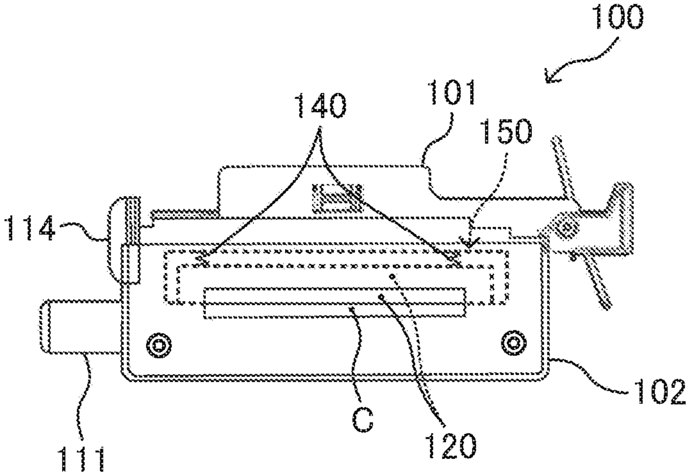
Figure 28B:
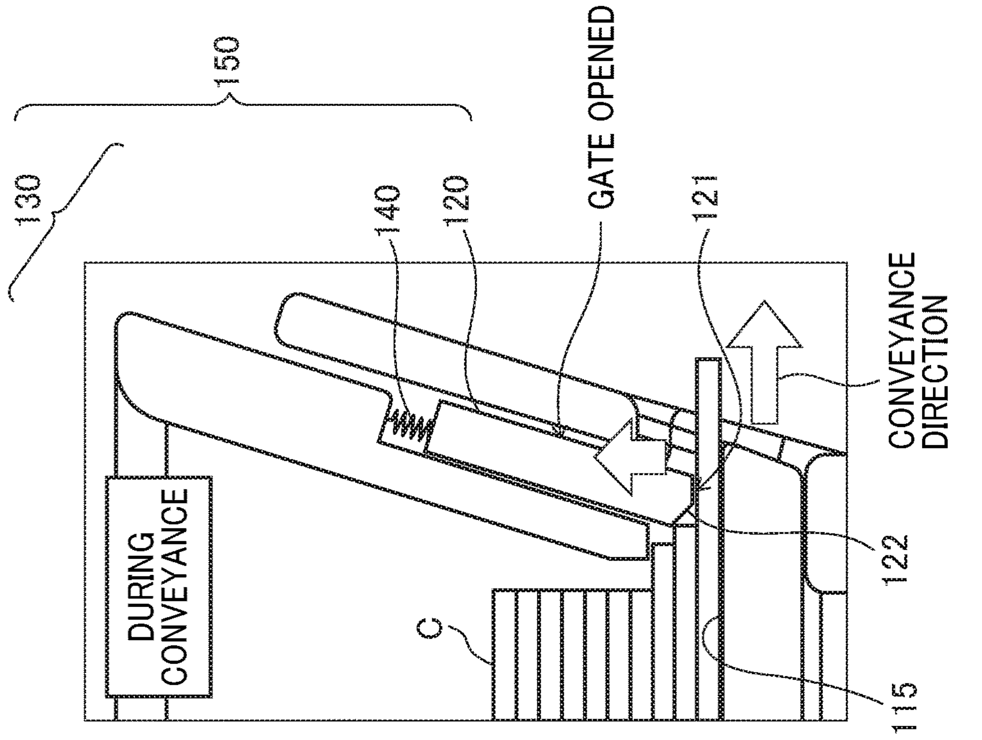
FIGS. 28A and 28B are explanatory views of the gate transitioning from a closed state to an open state during card conveyance.
Figure 28A:
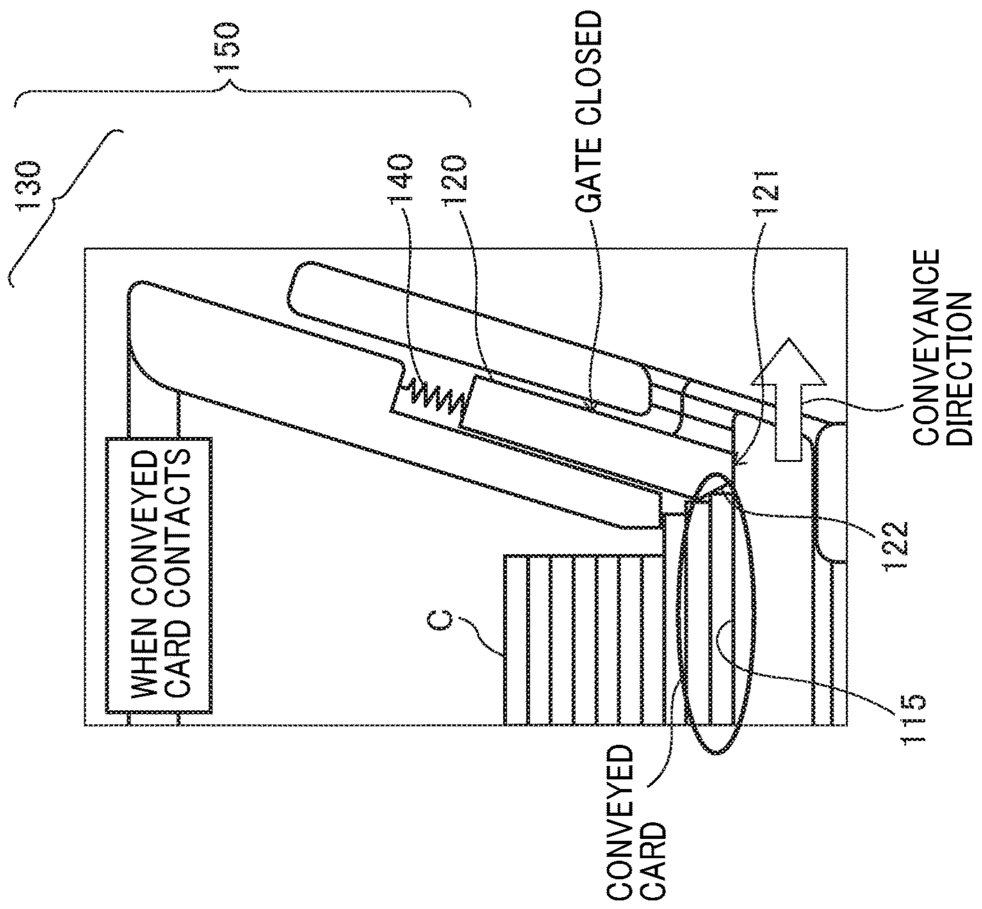
Figure 29:
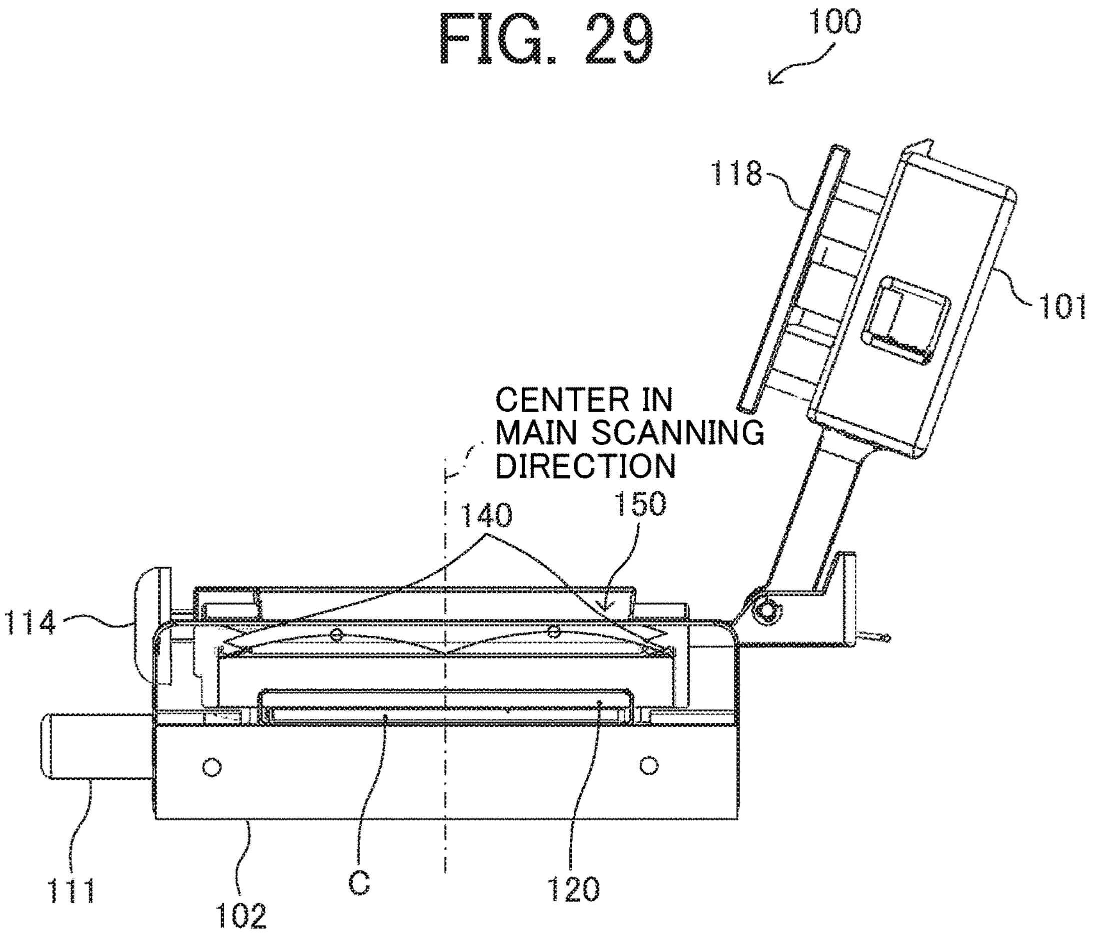
FIG. 29 is an explanatory view of the central position of the opening and closing mechanism in the main-scanning direction and positions of compression springs.
Figure 30:
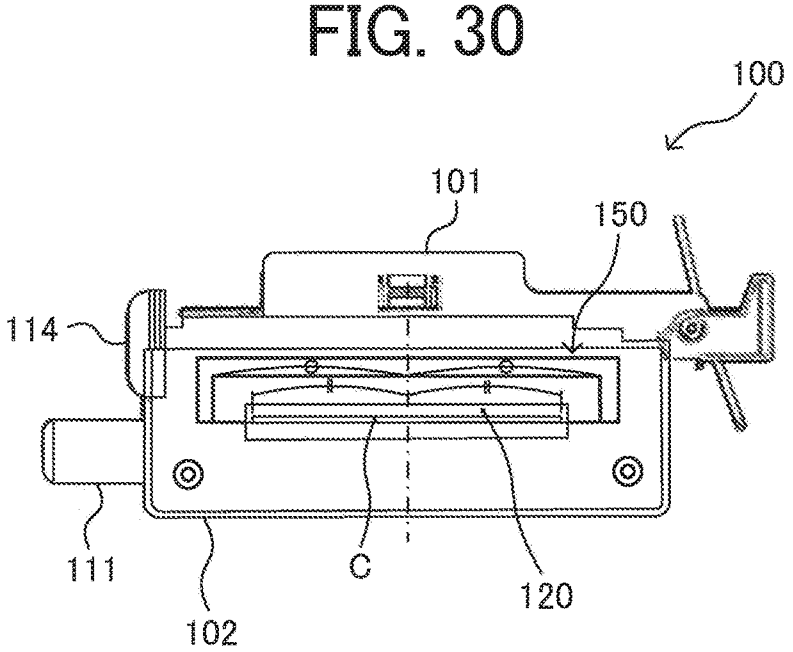
FIG. 30 is an explanatory view of the central position of a card in the main-scanning direction and the central position of the opening and closing mechanism in the main-scanning direction.

FIGS. 26A and 26B are explanatory views of an opening and closing mechanism 150 when a gate 120 is closed. FIG. 26A is a perspective explanatory view, and FIG. 26B is an explanatory view of an ejection port 115 viewed from the front side. FIGS. 27A and 27B are explanatory views of the opening and closing mechanism 150 when the gate 120 is open. FIG. 27A is a perspective explanatory view, and FIG. 27B is an explanatory view of the ejection port 115 viewed from the front side. FIGS. 28A and 28B are explanatory views of the gate 120 transitioning from a closed state to an open state during card conveyance. FIG. 28A is a view illustrating a state before the gate 120 opens, and FIG. 28B is a view illustrating a state in which the gate opens and a card C is conveyed. FIG. 29 is an explanatory view of the central position of the opening and closing mechanism 150 in the main-scanning direction and the positions of compression springs 140. FIG. 30 is an explanatory view of the central position of the card C in the main-scanning direction and the central position of the opening and closing mechanism 150 in the main-scanning direction.

The document feeder assisting device 100 of the present embodiment includes the opening and closing mechanism 150 functioning as an opening and closing device and including the gate 120 to open and close the ejection port 115. The conveying force to convey the card C causes the leading end of the card in the card conveyance direction to push up the gate 120, thereby conveying the card C.

As illustrated in FIGS. 26A and 26B, the gate 120 of the opening and closing mechanism 150 is closed before the conveyance of the card C starts, such as when the pressing mechanism 101 is open.

On the other hand, when the card C is conveyed as illustrated in FIGS. 27A and 27B, the card C is pushed upward, and the gate 120 of the opening and closing mechanism 150 opens.

As illustrated in FIG. 28A, when the gate 120 of the opening and closing mechanism 150 transits from the closed state to the open state, the gate 120 stays closed until the card C being conveyed comes into contact with the second surface 122 which is an obliquely-cut portion of the gate 120.

As the card C continues to be conveyed even after the contact, the gate is pushed upward by the card C and opens. While the card C passes under the gate 120 as illustrated in FIG. 28B, the gate 120 does not close.

That is, the present embodiment includes the opening and closing mechanism 150 including the gate 120 to open and close the ejection port 115 to eject the card C. The conveying force to convey the card C causes the leading end of the card in the card conveyance direction to push up the gate, thereby causing the card C to be conveyed.

This arrangement can ensure conveyance of documents having various thicknesses within a range from 0.48 [mm] to 0.78 [mm].

In a case where one type of card thickness is assumed, it is sufficient to leave a gap corresponding to that thickness, and there is no need to include the opening and closing mechanism 150 as in this example. However, in this example, in order to cope with a plurality of thicknesses, the opening and closing mechanism 150 as described above is included.

The document feeder assisting device 100 of the present embodiment is made compatible with cards having a thickness of about 0.5 [mm], which is often the size of registration cards in hospitals, along with cards having thicknesses of 0.48 [mm] and 0.78 [mm] which conform to the JIS II standards.

Moreover, as illustrated in FIGS. 28A and 28B, in the document feeder assisting device 100 of the present embodiment, the gate 120 is energized toward a placement surface 105 by the elastic force of the compression springs 140.

With this arrangement, after the gate 120 opens during card conveyance, it can be ensured that the gate 120 closes before conveyance of a next card C.

Here, in the case where the gate 120 is open before the card conveyance, there is a possibility of double feeding since the card C to be conveyed and an overlaid card C cannot be separated.

As illustrated in FIG. 29, in the opening and closing mechanism 150, a plurality of elastic members for energizing the gate 120 is arranged substantially symmetrically with respect to the central position in the main-scanning direction.

With this arrangement, the following effects can be obtained.

In the case where one compression spring 140 alone is arranged at the center in the main-scanning direction, the compression spring 140 may rotate too much about the installation position of the compression spring 140. Therefore, when some force such as catching is generated on one side of the conveyance device at the time of opening and closing, there is a possibility that, that side may remain open without being closed.

Therefore, by arranging two or more compression springs 140 on both sides with respect to the center in the main-scanning direction, the motion of the gate 120 can be restricted to in the opening and closing direction, which allows the gate 120 to be reliably closed.

As elastic members to energize the gate 120, compression springs such as the compression springs 140 are used.

The above arrangement enables provision of the document feeder assisting device 100 having a simple structure of low costs and is space-saving.

Furthermore, as illustrated in FIGS. 28A and 28B, at least a part of the end of the gate 120 of the present embodiment on the side in contact with the placement surface 105 has a chamfered shape. More specifically, a chamfered shape is formed on the corner portion of the side that comes in contact with the placement surface 105 and the card C contacts when the card C is conveyed. This forms the second surface 122 of the gate 120.

With this arrangement, the following effects can be obtained.

Since the card C can be guided downward at the front end of the gate during card conveyance, not only a card C without warpage but also a card C, an end of which is warped in the height direction of the thickness direction, can be fed without a failure.

Here, the shape to be formed on at least a part of the end of the gate 120 on the side in contact with the placement surface 105 is not limited to the chamfered shape, but also an arc shape can achieve similar effects.

That is, in the case where at least a part of the end of the gate 120 on the side in contact with the placement surface 105 is formed into an arc shape or a chamfered shape, similar effects to the above-described effects can be achieved.

Furthermore, as illustrated in FIG. 30, the document feeder assisting device 100 is structured such that the central position of the opening and closing mechanism 150 and the central position of the card C in the main-scanning direction substantially coincide with each other.

With this arrangement, the following effects can be obtained.

During card conveyance, since the card C passes under the opening and closing mechanism 150, in the case where the central position in the main-scanning direction of the card C and the center in the main-scanning direction of the opening and closing mechanism 150 do not coincide with each other, this means that an unnecessary part exists in the main-scanning direction of the opening and closing mechanism 150 for the conveyance of the card C. By the unnecessary part existing in the main-scanning direction in the opening and closing mechanism 150, the size of the device increases too much.

Thus, by structuring such that the central position of the opening and closing mechanism 150 and the central position of the card C substantially coincide with each other in the main-scanning direction, unnecessary parts for conveyance of the card C can be omitted in the main-scanning direction of the opening and closing mechanism 150. This can prevent the device from becoming larger.

Incidentally, in the opening and closing mechanism 150, at least a part of a slider of the gate 120 and a slider of a guide 130 to guide the gate 120 in the energizing direction by the compression springs 140 is made of a POM material.

Embodiment 3

With this arrangement, by using a POM material having good sliding performance in the slider of the gate 120 and the slider of the guide 130, the resistance at the time of opening and closing can be reduced, thus allowing opening and closing operation of the opening and closing mechanism 150 to be stably performed.

Embodiment 3

First, Embodiment 3 of a document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 according to the present embodiment has a similar basic structure to the structures of Embodiments 1 and 2 described above. However, the structure of Embodiment 3 is different from the structures of Embodiments 1 and 2 in which a more preferable exemplary structure of the pressing mechanism 101 is described.

Therefore, structures and effects similar to structures and effects of Embodiments 1 and 2 will be omitted from description as appropriate, and the same members will be denoted by the same symbol in the description unless it is particularly required to distinguish the members.

Figure 31A:
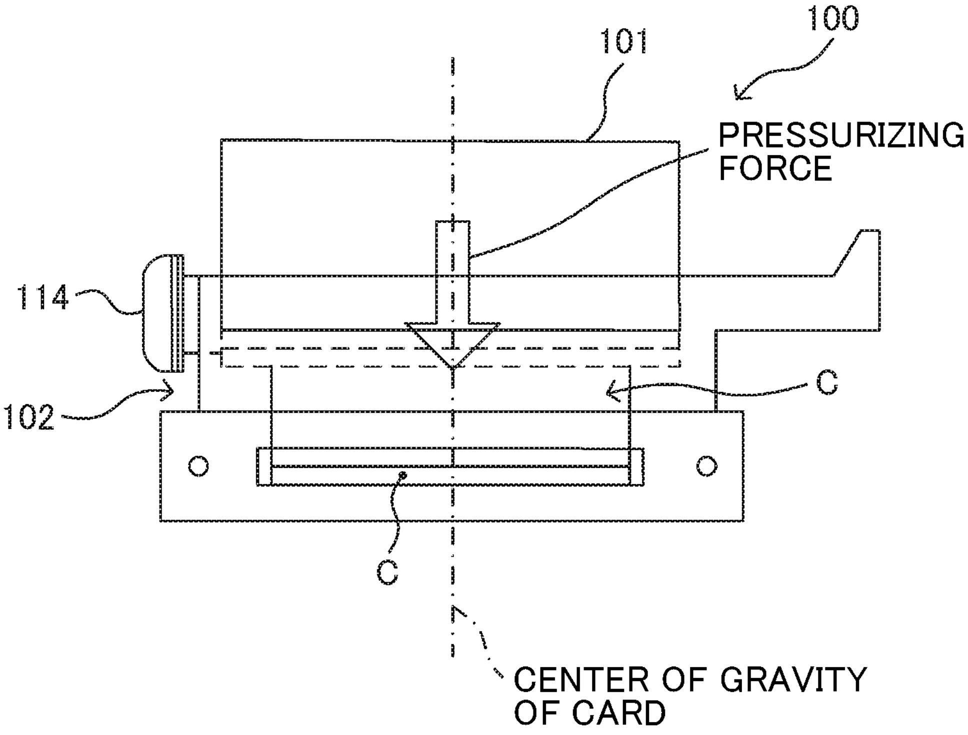
FIGS. 31A and 31B are explanatory views of a vector position of resultant force of pressing force of the pressing mechanism and the position of the center of gravity of cards according to Embodiment 3 of this disclosure.
Figure 31B:
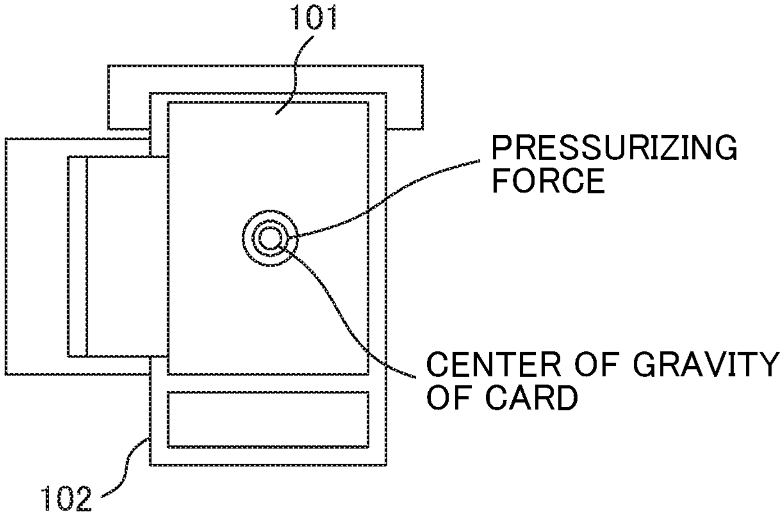
Figure 32B:
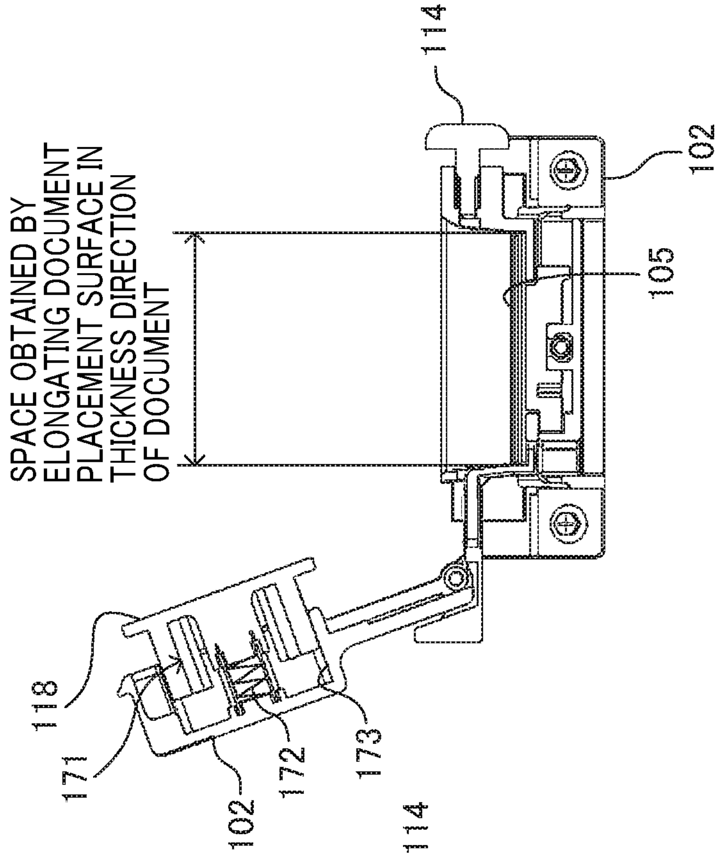
FIGS. 32A and 32B are explanatory views of a press mode and a non-press mode of the pressing mechanism.
Figure 32A:
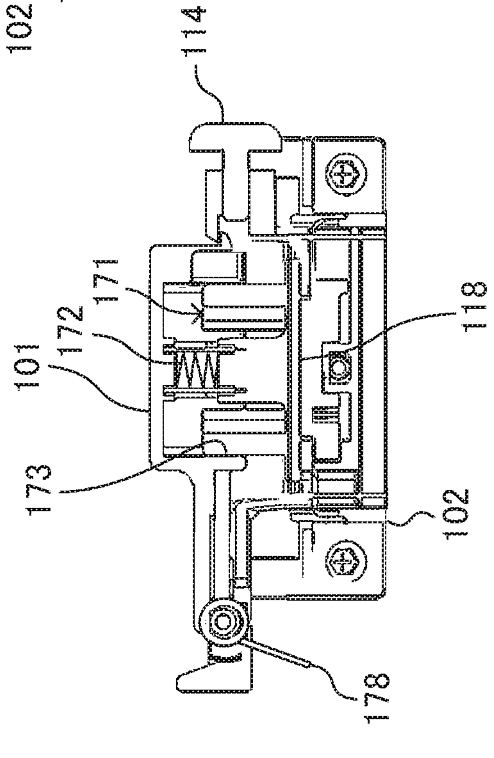
Figure 33B:
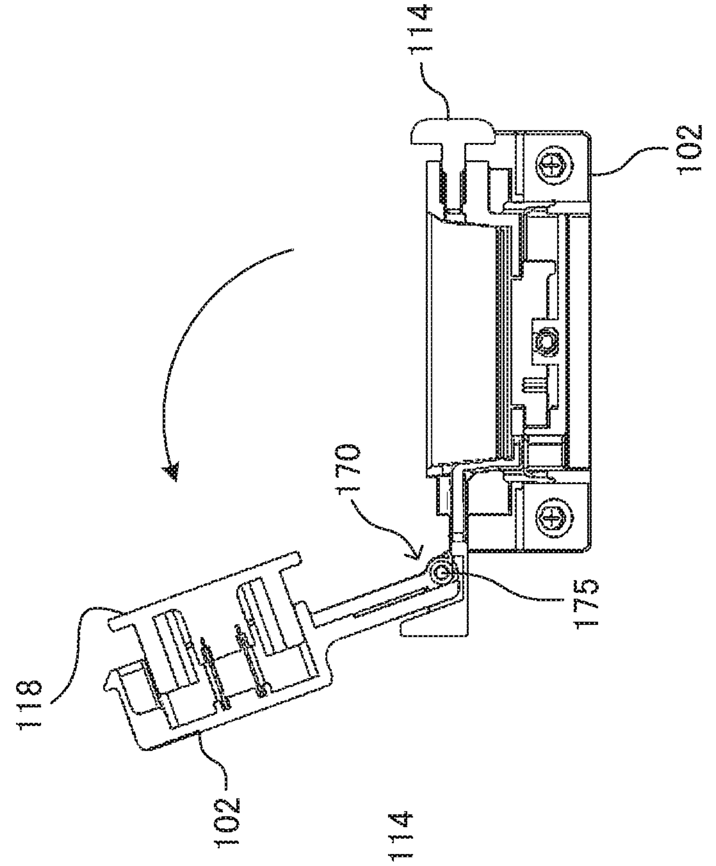
FIGS. 33A and 33B are explanatory views of a structure in which the pressing mechanism is rotated to switch from the press mode to the non-press mode.
Figure 33A:
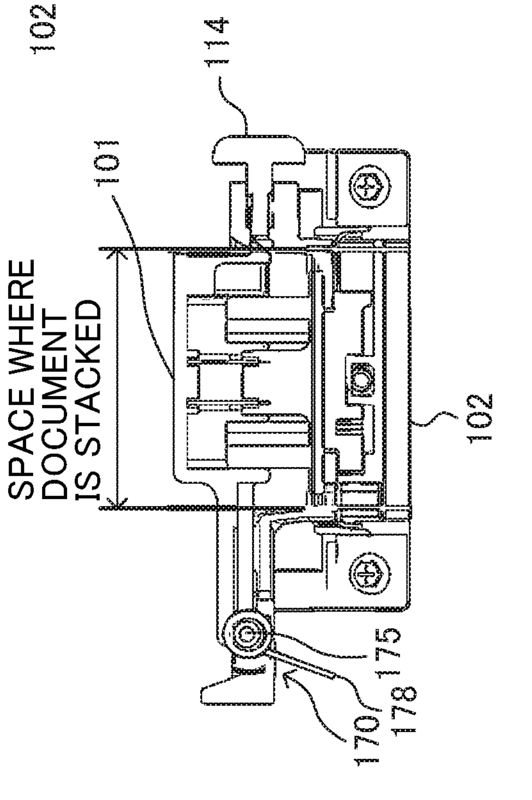
Figure 34:
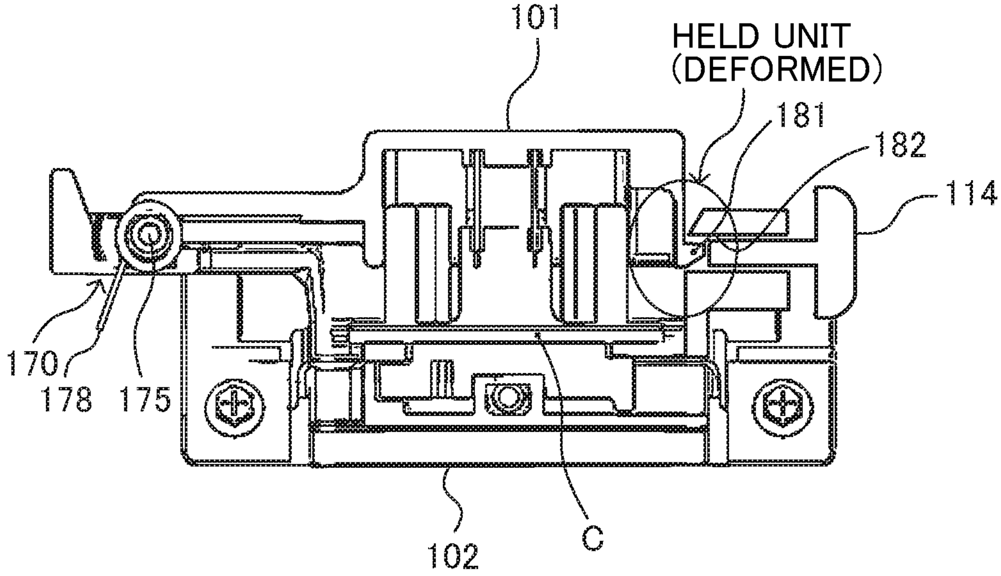
FIG. 34 is an explanatory view of the pressing mechanism in the press mode when held by a held unit.

FIGS. 31A and 31B are explanatory views of a vector position of resultant force of pressing force of the pressing mechanism 101 and the position of the center of gravity of cards. FIG. 31A is a cross-sectional explanatory view, and FIG. 31B is a plan explanatory view. FIGS. 32A and 32B are explanatory views of a press mode and a non-press mode of the pressing mechanism 101. FIG. 32A is an explanatory view of the press mode, and FIG. 32B is an explanatory view of the non-press mode. FIGS. 33A and 33B are explanatory views of a structure in which the pressing mechanism 101 is rotated to switch from the press mode to the non-press mode. FIG. 33A is a view illustrating the press mode, and FIG. 33B is a view illustrating the non-press mode. FIG. 34 is an explanatory view of the pressing mechanism 101 in the press mode when held by a held unit 181.

Figure 35B:
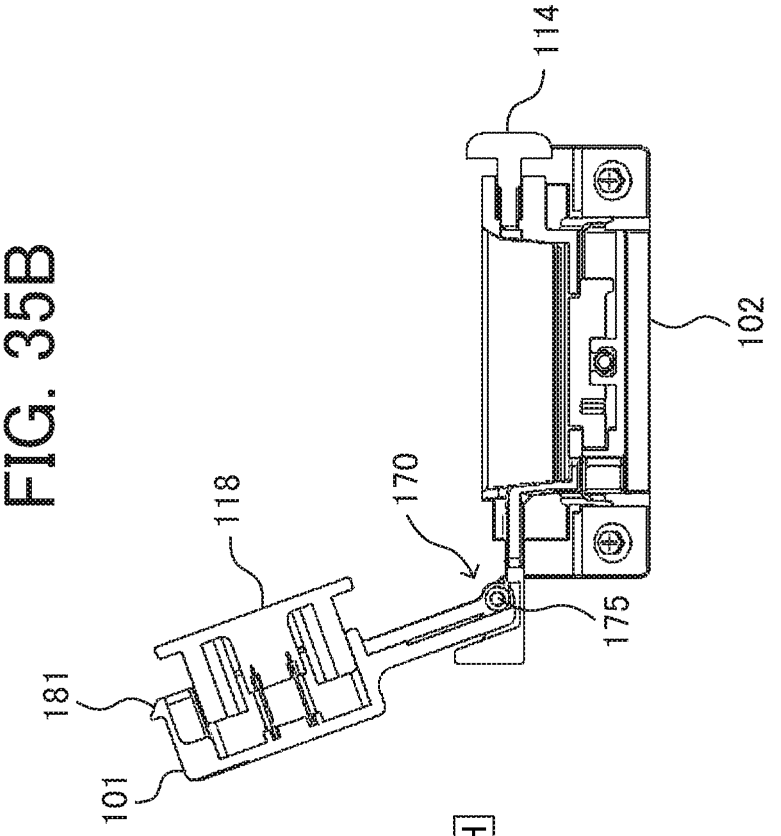
FIGS. 35A and 35B are explanatory views of a structure in which pressing the held unit of the pressing mechanism results in transition of the pressing mechanism from the press mode to the non-press mode.
Figure 35A:
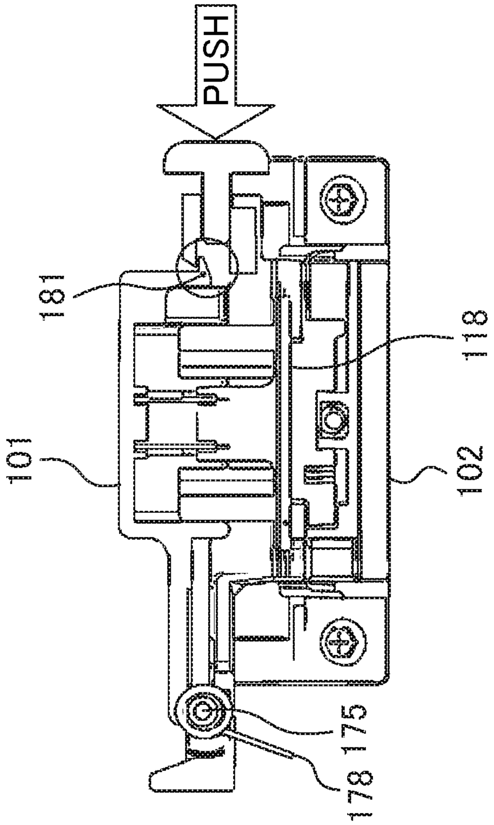
Figure 36B:
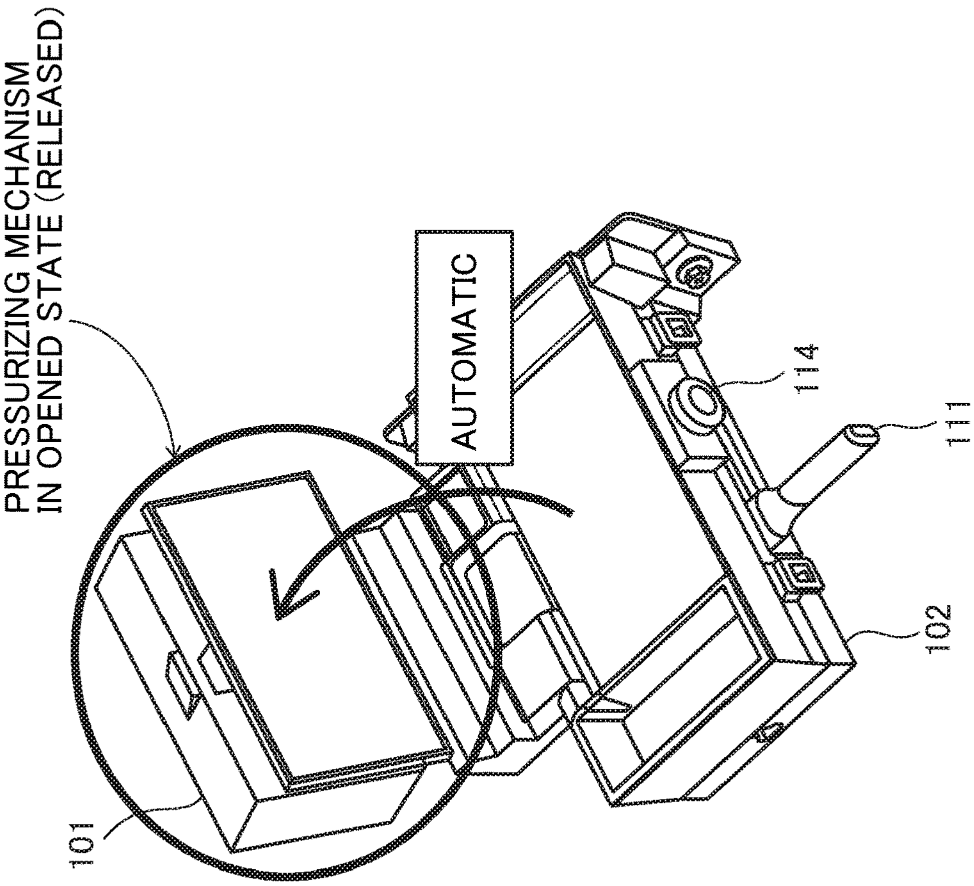
FIGS. 36A and 36B are explanatory views illustrating that pressing a pressing mechanism release button releases the press mode of the pressing mechanism.
Figure 36A:
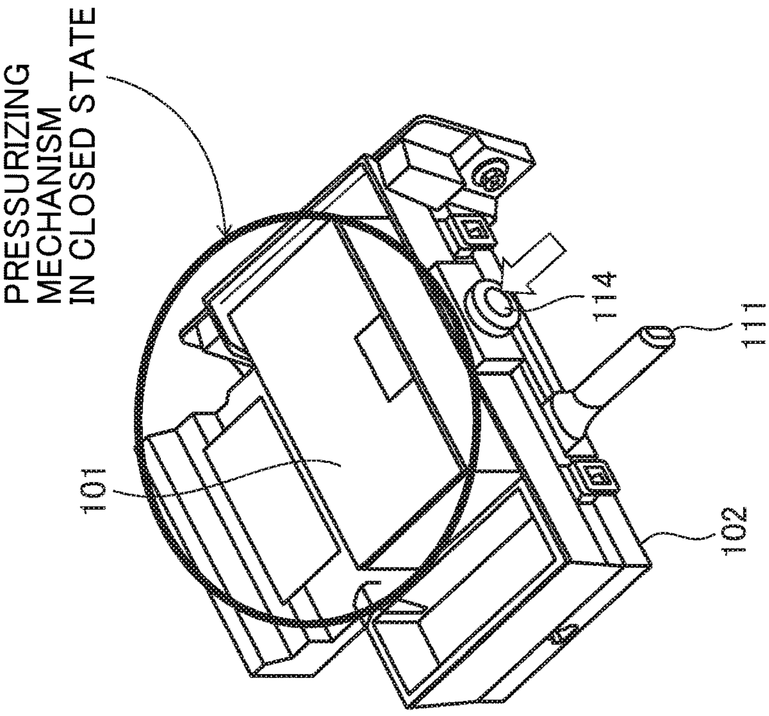

FIGS. 35A and 35B are explanatory views of a structure in which pressing the held unit 181 of the pressing mechanism 101 results in transition of the pressing mechanism 101 from the press mode to the non-press mode. FIG. 35A is an explanatory view of the held unit 181 being pressed, and FIG. 35B is an explanatory view illustrating the state after transition to the non-press mode. FIGS. 36A and 36B are explanatory views illustrating that pressing a pressing mechanism release button 114 releases the press mode of the pressing mechanism 101. FIG. 36A is an explanatory view illustrating how to release, and FIG. 36B is an explanatory view illustrating how the pressing mechanism 101 automatically rotates and opens.

As illustrated in FIG. 31, the pressing mechanism 101 included in the document feeder assisting device 100 of the present embodiment is structured such that the line of action of resultant force of the pressing force when a pressing surface of a pressing plate 118 presses cards C and the position of the center of gravity of the cards C stacked on a card stacker 112 substantially coincide with each other.

With this arrangement the surface to be pressed of the stacked cards C can be pressed without bias.

As illustrated in FIGS. 32A and 32B, the pressing mechanism 101 of the present embodiment has two modes of the pressing mode in which the cards C are pressed and the non-press mode in which the pressing mechanism 101 is positioned outside the space extending from the placement surface 105 in the thickness direction of the cards C. With this arrangement, since the pressing mechanism 101 is pressing the cards C during press, there is little space for replacing the cards C during the press, and thus great force is required to place or take out the cards C. Therefore, not only the press mode but also the non-press mode, in which the pressing mechanism 101 is arranged outside the space extending from the placement surface 105 of the cards C in the thickness direction of the cards C for replacement of the cards C, is provided to allow the cards C to be easily placed and to be taken out.

As illustrated in FIGS. 33A and 33B, when a user operating the document feeder assisting device 100 rotates the pressing mechanism 101 about a rotating shaft 175 of a rotation mechanism 170 arranged outside the space extending from the placement surface 105 in the thickness direction of the cards C, the press mode is switched to the non-press mode.

With this arrangement, the following effects can be obtained.

In the method of displacing the pressing mechanism 101 in the thickness direction of the cards C upon switching to the non-press mode, the displacement amount to cause the pressing mechanism 101 to be at a height where the cards C can be easily placed and taken out is large, which significantly increases the size of the whole document feeder assisting device 100.

On the other hand, in the method of rotating the pressing mechanism 101 about the rotating shaft 175 of the rotation mechanism 170, the pressing mechanism 101 can be easily displaced in the lateral direction of the card stacker 112, and the displacement amount of the pressing mechanism 101 to allow the cards C to be easily placed and taken out can be smaller than in the above method. Therefore, the size of the whole document feeder assisting device 100 is not as large as in the above method.

In addition, the pressing mechanism 101 is structured to switch from the press mode to the non-press mode by being rotated by reaction force of a torsion coil spring 178.

The above arrangement enables provision of the document feeder assisting device 100 having a simple structure of low costs and is space-saving.

Moreover, as illustrated in FIG. 34, transition to the press mode is performed when the held unit 181, which is formed on the outer portion of the pressing mechanism 101 and made of an elastic member, is deformed and held by a recess 182, formed in the stacker case 102, to secure the pressing mechanism 101. Here, the shaped portion to hold the held unit 181 is not limited to the recess 182 but may be a projection formed on the stacker case 102.

With this arrangement, a low-cost structure can be implemented by adopting a so-called snap-fit system.

Furthermore, as illustrated in FIGS. 35A and 35B and FIGS. 36A and 36B, the pressing mechanism release button 114 is brought into contact with a part of the held unit 181 held by the recess (or projection), which is to secure the pressing device, to thereby deform the held unit 181 to release the press mode and to be switched to the non-press mode.

With this arrangement, by providing the pressing mechanism release button 114 as a push-type button to automatically switch from the press mode to the non-press mode, usability for a user can be enhanced.

In this example, it is desirable that the held unit 181 described above is made of ABS resin.

With this arrangement, since the ABS material is resistant against repeated bending stress, the number of times of durability increases.

Embodiment 4

First, Embodiment 4 of a document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 according to the present embodiment has a similar basic structure to the structures of Embodiments 1 through 3 described above. However, the structure of Embodiment 4 is different from the structures of Embodiments 1 through 3 in which more preferable exemplary structures of the hole 109 for accessing, the stroke of the card conveying lever 111, and the inner walls of the card stacker 112 are described.

Therefore, structures and effects similar to structures and effects of Embodiments 1 through 3 will be omitted from description as appropriate, and the same members will be denoted by the same symbol in the description unless it is particularly required to distinguish the members.

Figure 37:
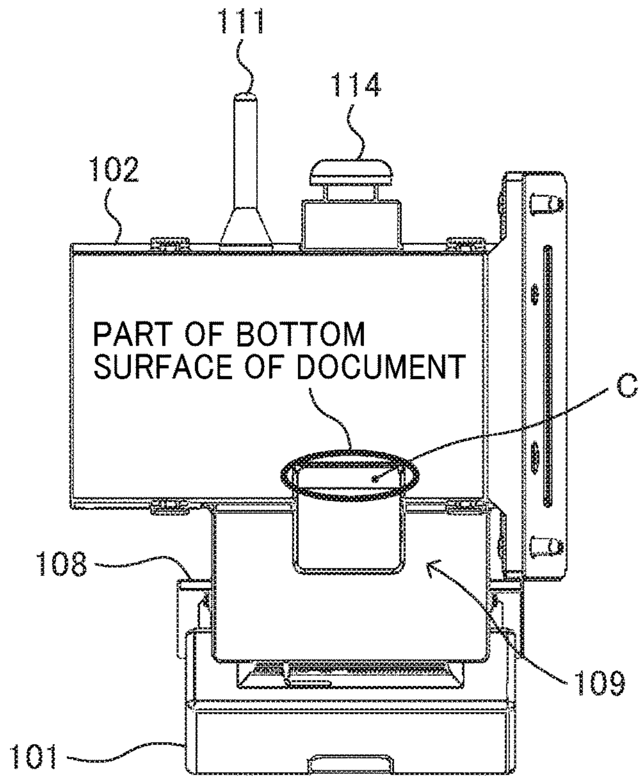
FIG. 37 is an explanatory view of a hole opened such that a part of the bottom surface of a card (i.e., a document bottom surface) is visible, according to Embodiment 4 of this disclosure.
Figure 38:
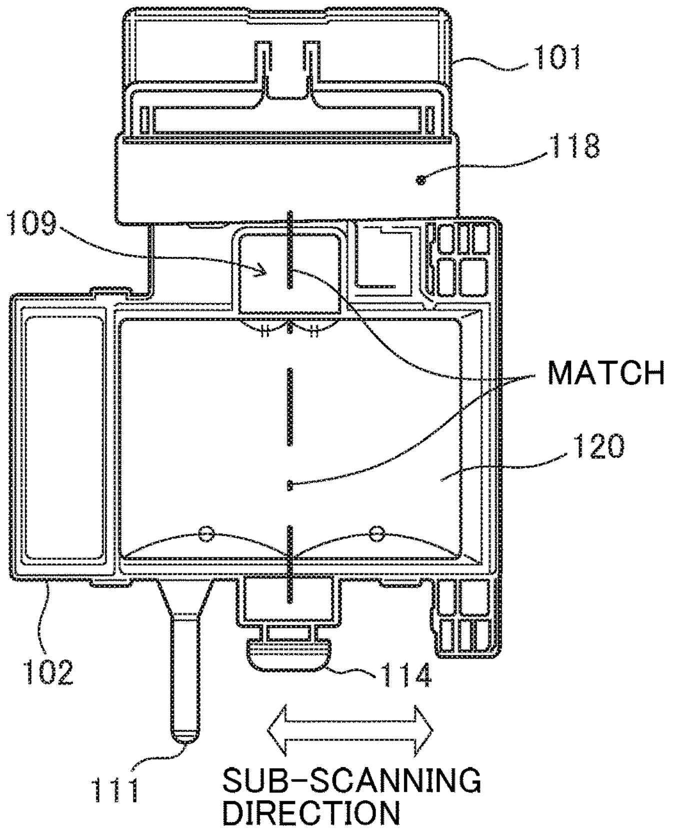
FIG. 38 is an explanatory view of the central position of the hole in the sub-scanning direction and the central position of the stacked cards C in the sub-scanning direction.
Figure 39A:
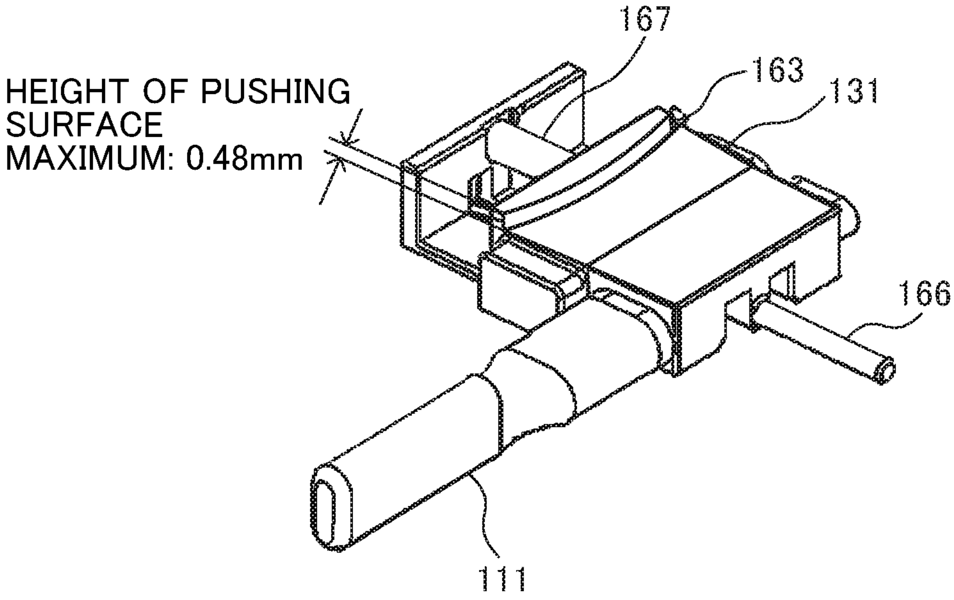
FIGS. 39A and 39B are explanatory views of the card conveying mechanism.
Figure 39B:
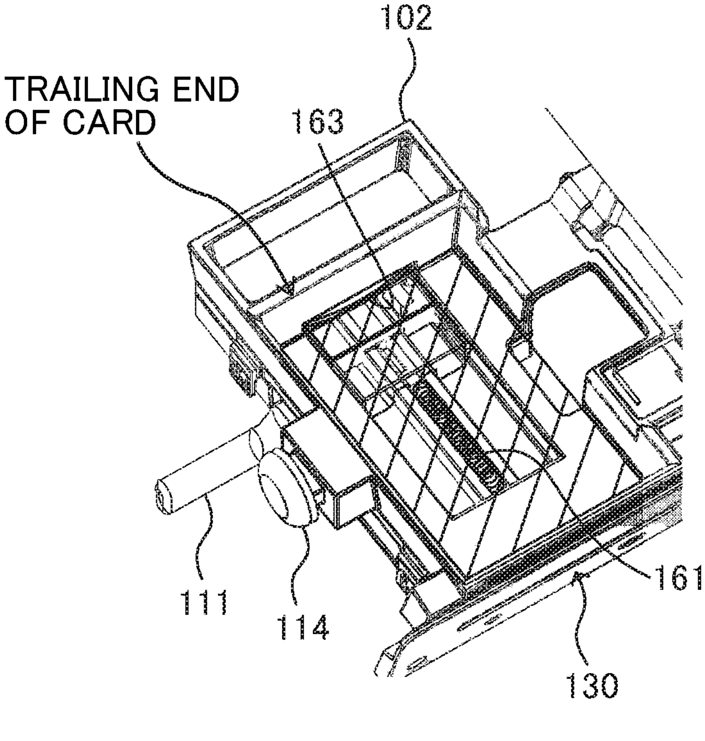
Figure 40:
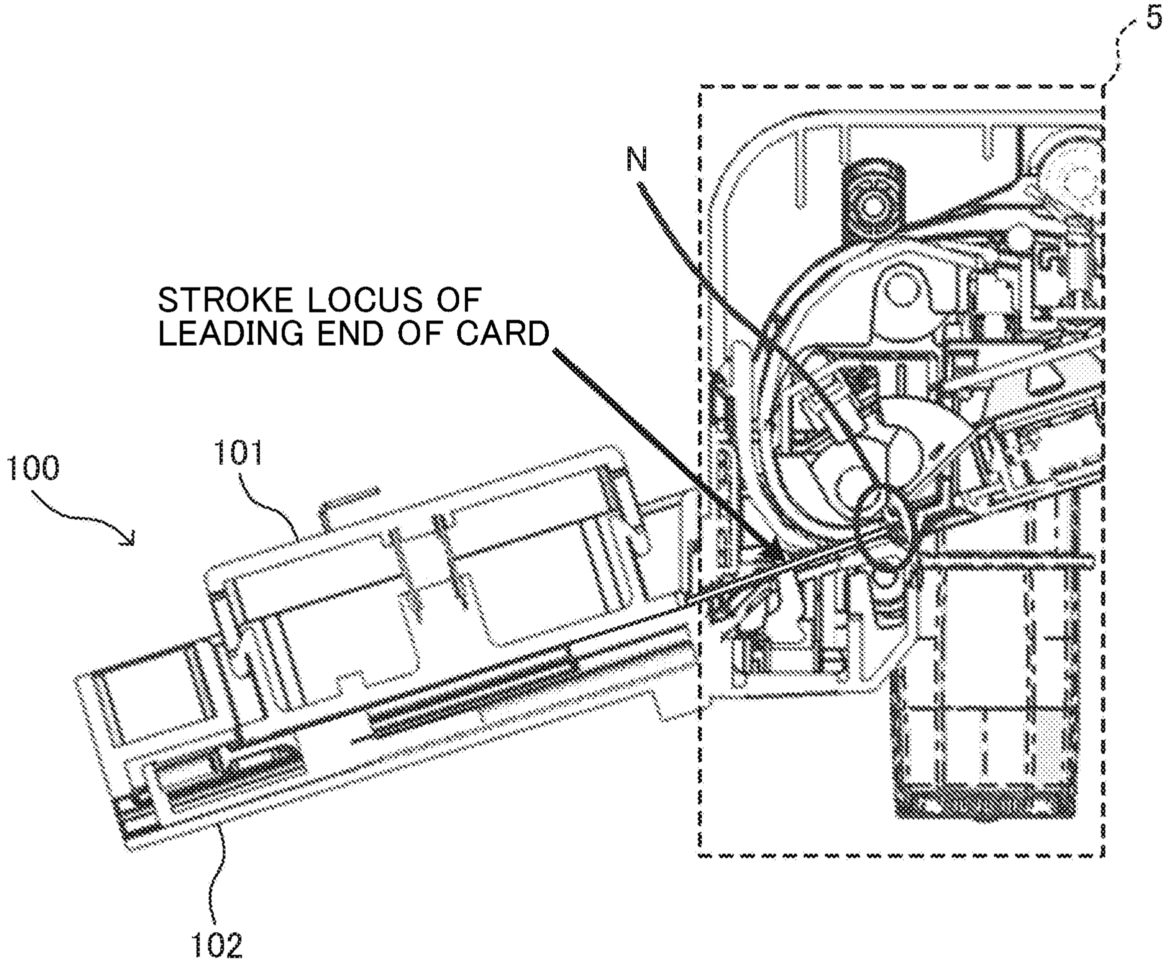
FIG. 40 is an explanatory cross-sectional view when the stacker case is mounted to the main body of the ADF.
Figure 41B:
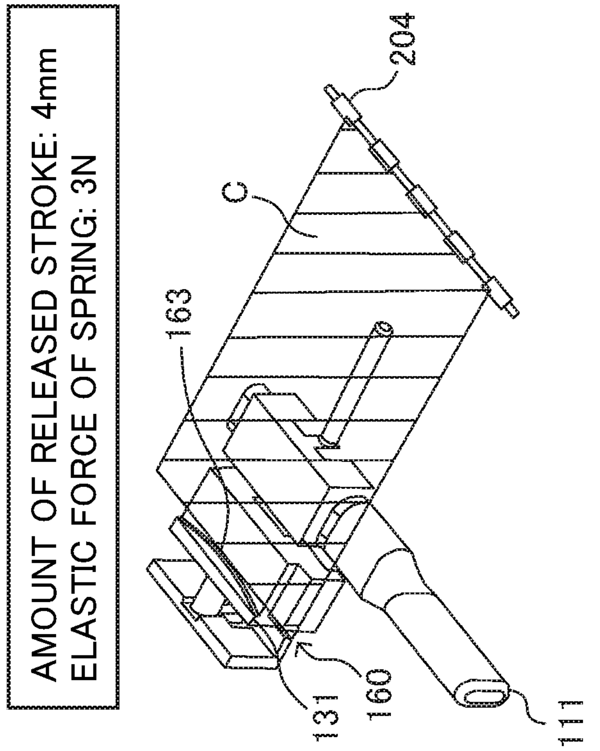
FIGS. 41A and 41B are explanatory views of a collision between conveyance rollers of the ADF and a card to be conveyed.
Figure 41A:
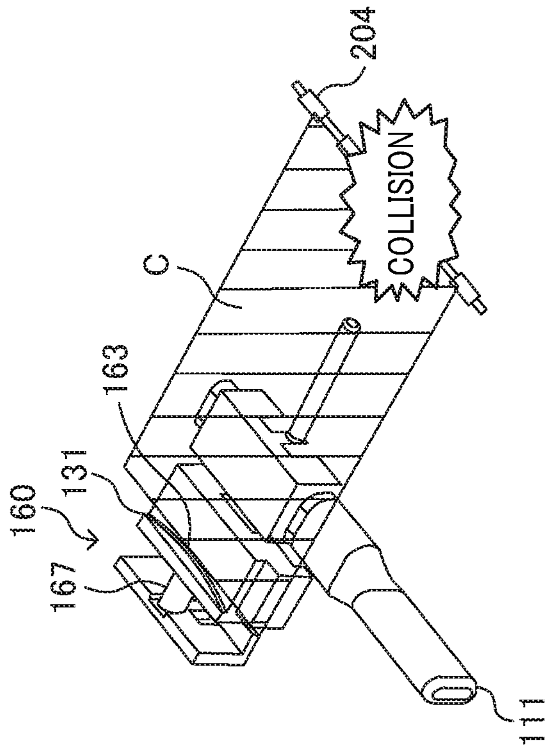
Figure 42A:
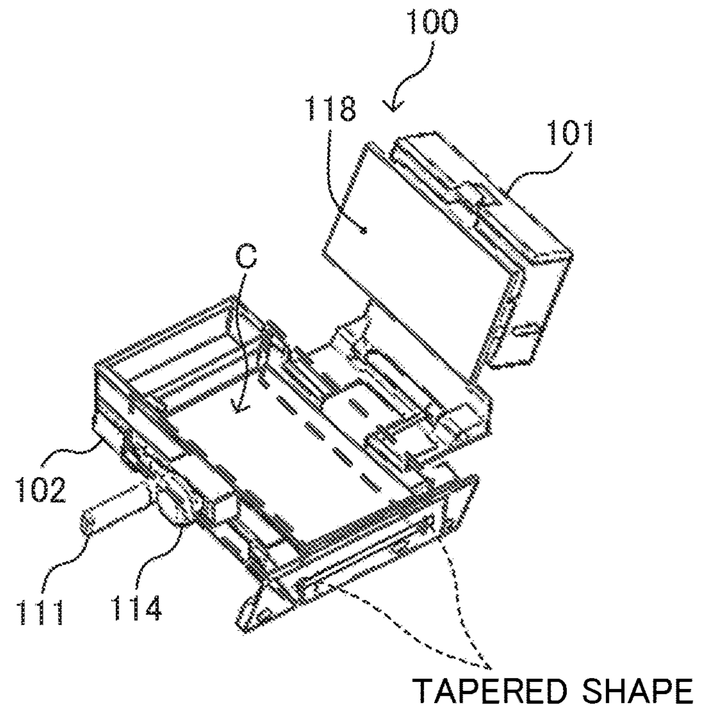
FIGS. 42A and 42B are explanatory views of an inner wall of a card stacker having a tapered shape.
Figure 42B:
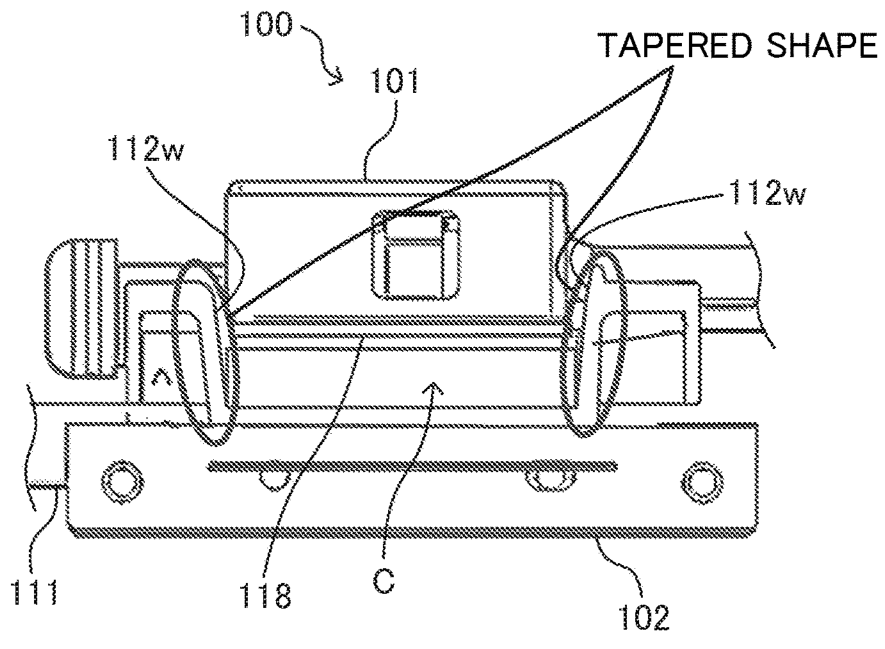
Figure 43:
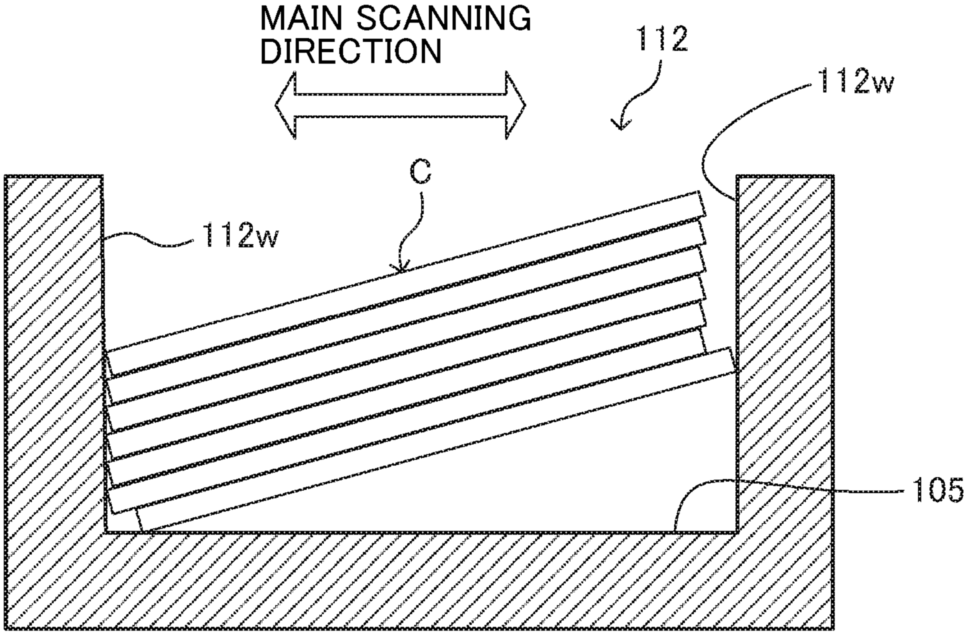
FIG. 43 is explanatory view of an exemplary card stacker not having a tapered shape.

FIG. 37 is an explanatory view of a hole 109 opened such that a part of the bottom surface of a card (document bottom surface) is visible, and FIG. 38 is an explanatory view of the central position of the hole 109 in the sub-scanning direction and the central position of the stacked cards C in the sub-scanning direction. FIGS. 39A and 39B are explanatory views of a card conveying mechanism. FIG. 39A is an explanatory view illustrating components of the card conveying mechanism, and FIG. 39B is an explanatory view illustrating the positional relationship among a placement surface 105 on which the cards C are stacked, the trailing end of the cards, and a card extruding surface. FIG. 40 is an explanatory cross-sectional view when a stacker case 102 is mounted to the main body of the ADF 5. FIGS. 41A and 41B are explanatory views of a collision between conveyance rollers of the ADF 5 and a card to be conveyed. FIG. 41A is an explanatory view illustrating collision of the card, and FIG. 41B is an explanatory view illustrating a card conveying lever 111 is moved to the MAX after the collision. FIGS. 42A and 42B are explanatory views of inner walls of a card stacker 112 having a tapered shape. FIG. 42A is a perspective explanatory view, FIG. 42B is an explanatory cross-sectional view, and FIG. 43 is an explanatory view of an exemplary card stacker not having a tapered shape.

First, the hole 109 for accessing which is formed in the stacker case 102 (card stacker 112) described in Embodiment 1 will be described in detail.

As illustrated in FIG. 37, in the stacker case 102, the hole 109 for accessing is formed in the vicinity of the cards C stacked on the card stacker 112, and a part of the bottom of the stacked cards C (i.e., the document bottom surface) is exposed from the hole 109 for accessing.

With this arrangement, by forming the hole 109 for accessing that allows a user to access the bottom surface of the cards C, to collectively take out the plurality of stacked cards C and to place new cards C are facilitated.

Here, in the case where there is no access to the bottom surface, it is difficult to hold and to lift the cards C. Furthermore, in the case where there is a plurality of cards C but a single card C, the plurality of cards C is overlaid, making it difficult to be taken out.

The hole 109 of the present embodiment is formed such that the central position of the hole 109 in the sub-scanning direction substantially coincides with the central position of the stacked cards in the sub-scanning direction, or that the central position of the hole 109 in the main-scanning direction along the card bottom surface substantially coincides with the central position of the stacked cards in the sub-scanning direction.

This arrangement allows the central part of the card C to be supported, thereby facilitating a user to take out the cards C placed (stacked) or to place new cards C. Here, an example in which the central positions in the sub-scanning direction coincide will be described with reference to FIG. 38.

As illustrated in FIG. 38, the central position of the hole 109 for accessing in the sub-scanning direction and the central position of the card C in the sub-scanning direction coincide with each other.

This arrangement allows a user to support the central part of the cards C in the vicinity of one end in the main-scanning direction, thereby facilitating the user to take out the cards C placed or to place new cards C.

Also, as illustrated in FIGS. 39A, 39B, and 40, in the document feeder assisting device 100 of the present embodiment, a stroke of the card conveying lever 111 is set as follows.

A value, obtained by subtracting the distance from the card trailing end position in the conveyance direction when the cards are stacked to the position of a nip portion N of rollers 204*a* of a pair of conveyance rollers of the second document conveying mechanism 204 closest to the card insertion slot 7 on the conveyance passage of the ADF 5 from the sum of the maximum stroke amount of the card conveying lever 111 and the length of the card C in the conveyance direction, is positive.

By the amount of this positive value, the card conveying lever 111 that gives the card C a force in the card conveyance direction and moving parts of the document conveying mechanism 160 can retract in the direction opposite to the card conveyance direction, and the amount of retraction is within an elastic region of a buffering spring 167 being an elastic body provided for buffering.

With this arrangement, while the leading end of the card C is in contact with the pair of conveyance rollers of the second document conveying mechanism 204 in the ADF 5, the extruding surface 163 can be released in the direction opposite to the card conveyance direction. Therefore, even if the user vigorously moves the card conveying lever 111 to the MAX position, no serious damage is caused to the rollers 204*a* of the pair of conveyance rollers of the second document conveying mechanism 204, which are manual feed rollers in the ADF 5, the card C, and parts included in the document feeder assisting device 100.

As illustrated in FIG. 39A, this card conveying mechanism mainly includes a total of three parts including two parts including a card trailing end extruding member 113 having the extruding surface 163 to extrude the card C and the card conveying lever 111, and the buffering spring 167 arranged between the two parts.

The reason for including the three parts in this manner without integrating the parts into a single part is that when the card C is conveyed to the rollers 204*a* of the second document conveying mechanism 204 in the ADF 5, in the case of a single part, the conveying lever and the card extruding surface are integrated. This allows no releasing after the leading end of the card collides with the nip portion N of the rollers 204*a* of the second document conveying mechanism 204, and thus when the user vigorously moves the conveying lever, the rollers 204*a* of the second document conveying mechanism 204, the card C, or the card extruding surface may be damaged.

Therefore, the card trailing end extruding member 113 including the extruding surface 163 as the card extruding surface and the card conveying lever 111 are made separate parts to allow the buffering spring 167 to be sandwiched between the two parts.

With this arrangement of the three parts, even if the leading end of the card collides with the nip portion N of the rollers of the pair of conveyance rollers of the second document conveying mechanism 204 as illustrated in FIGS. 41A and 41B, the card trailing end extruding member 113 is released in the direction opposite to the conveyance direction. By being released in this manner, the rollers of the pair of conveyance rollers of the second document conveying mechanism 204, the card C, and the extruding surface 163 can be prevented from being damaged. Moreover, depending on design values of the buffering spring 167 and the returning compression spring 161, the strength of pressing the card C against the rollers of the pair of conveyance rollers of the second document conveying mechanism 204 can be kept constant.

In the structure of the present embodiment, as the design values, the amount of released stroke (=amount of shrinkage of the spring) of the card trailing end extruding member 113 having the extruding surface 163 at the position where the card conveying lever 111 is moved to the MAX is set to 4 [mm], and the elastic force at that time is set to 3 [N].

The height of the extruding surface 163 included in the card trailing end extruding member 113 is defined as 0.48 [mm] at the maximum in the structure of the present embodiment.

By adopting the buffering spring 167, which is a compression spring, as the elastic body provided for buffering, both effects of low cost and space-saving can be achieved by the simple structure.

In Embodiment 4, as illustrated in FIGS. 42A and 42B, the inner walls surrounding the space of the card stacker 112 where the cards C are stacked are structured such that a distance between inner walls 112*w* parallel to each other in at least one of the main-scanning direction and the sub-scanning direction and facing each other increases as the inner walls 112*w* rises higher in the thickness direction of the card C.

With this arrangement, by tapering the inner walls 112*w* of the card stacker 112, the stacked cards C can be prevented from being clogged and not supplied to the position (conveyance position) where the card C comes into contact with the placement surface 105 (conveyance surface) of the bottom surface. At the same time, since the entrance of the space in which the cards C are placed is expanded, the cards C can be easily placed and taken out.

Although in FIGS. 42A and 42B used in the above description and in FIG. 43 used in description to be described later, the example of the inner walls 112*w* parallel to each other in the sub-scanning direction is illustrated, tapering the inner wall surfaces parallel to each other in the main-scanning direction can also achieve similar effects.

In the case where opposed inner wall surfaces are not tapered as described above, there are cases where a failure occurs that cards C are clogged as illustrated in FIG. 43 and not supplied to the position (conveyance position) contacting the placement surface 105 on the bottom surface.

In addition, in the document feeder assisting device 100 of the present embodiment, the distance between the two inner walls 112*w* surrounding the space, of the card stacker 112 where the cards C are stacked, in the main-scanning direction may be set to substantially coincide with the length of the cards C in the main-scanning direction.

With this arrangement, the position of the document can be previously regulated by the outer walls at the time of conveyance to some extent. Thus, when the document feeder assisting device 100 is used for the reading device 6, the skew amount of an image scanned by the reading device 6 can be also reduced.

In addition, in the document feeder assisting device 100 of the present embodiment, a portion of the card stacker 112 near the end of the card stacker 112 on the downstream side in the card conveyance direction than the portion of the card stacker 112 where the cards C are stacked is positioned by engagement of a recessed shape and a projecting shape with respect to a portion near the card insertion slot 7 of the ADF 5, and is further attached to the ADF 5 with screws.

With this arrangement, the document feeder assisting device 100 can be attached to the ADF 5 with high accuracy. This is because the card C is to contact the nip portion N of the rollers 204*a* serving as entrance rollers into the ADF 5, and thus a certain level of accuracy is required for the attachment position.

Next, an example in which a small extruding surface 163*b* which contacts a part of the trailing end of a card C is provided as the extruding surface to extrude a card of the card trailing end extruding member 113 will be described with reference to drawings.

Figure 44A:
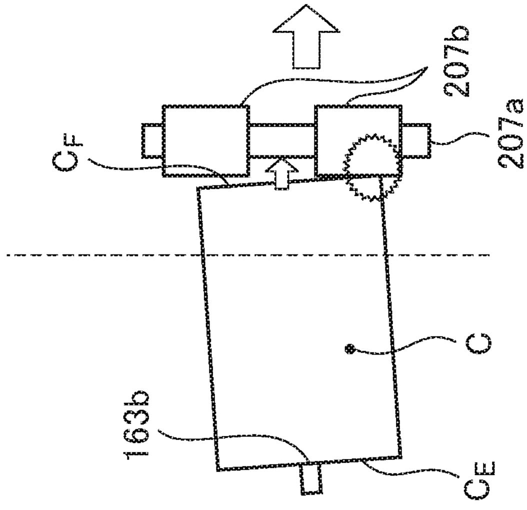
FIGS. 44A to 44C are explanatory views of a structure using a small extruding surface.
Figure 44B:
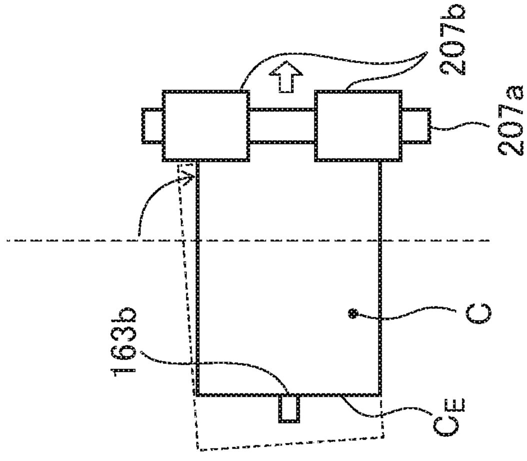
Figure 44C:
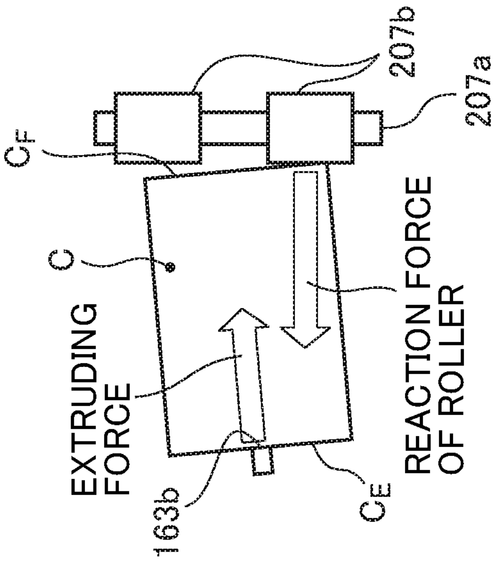

FIGS. 44A to 44C are explanatory views of a structure using the small extruding surface 163*b*. FIG. 44A is a view illustrating a state in which the skewed card C contacts one of conveyance rollers 207*b* in the ADF 5. FIG. 44B is a view illustrating a state in which the skew-corrected card C contacts both of the conveyance rollers 207*b* in the ADF 5, and FIG. 44C is an explanatory view of force applied to the card C when the skewed card C contacts one of the conveyance rollers 207*b* in the ADF 5.

Figure 45B:
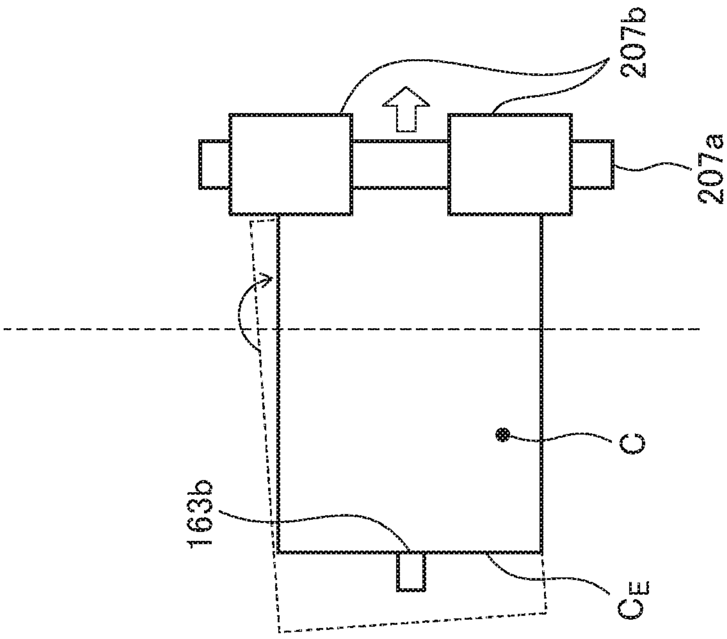
FIGS. 45A and 45B are explanatory views of a structure in which the central position of the small extruding surface and the central position of the trailing end of a card are allowed to coincide with each other.
Figure 45A:
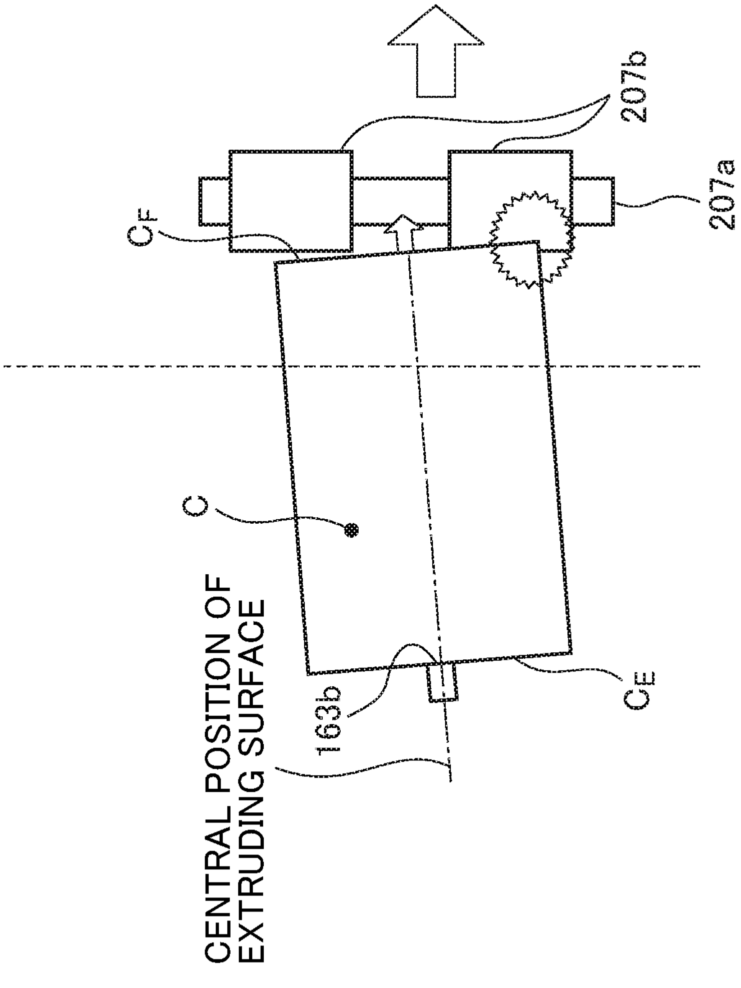
Figure 46B:
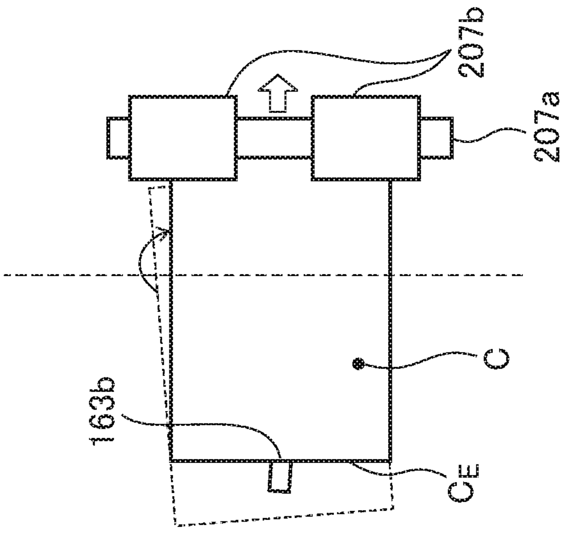
FIGS. 46A and 46B are explanatory views of the positional relationship between, when a card extruded by the small extruding surface contacts against one of conveyance rollers in the ADF, the central position of the small extruding surface and a position in the roller where the card is brought into contact with the conveyance rollers first in the main-scanning direction.
Figure 46A:
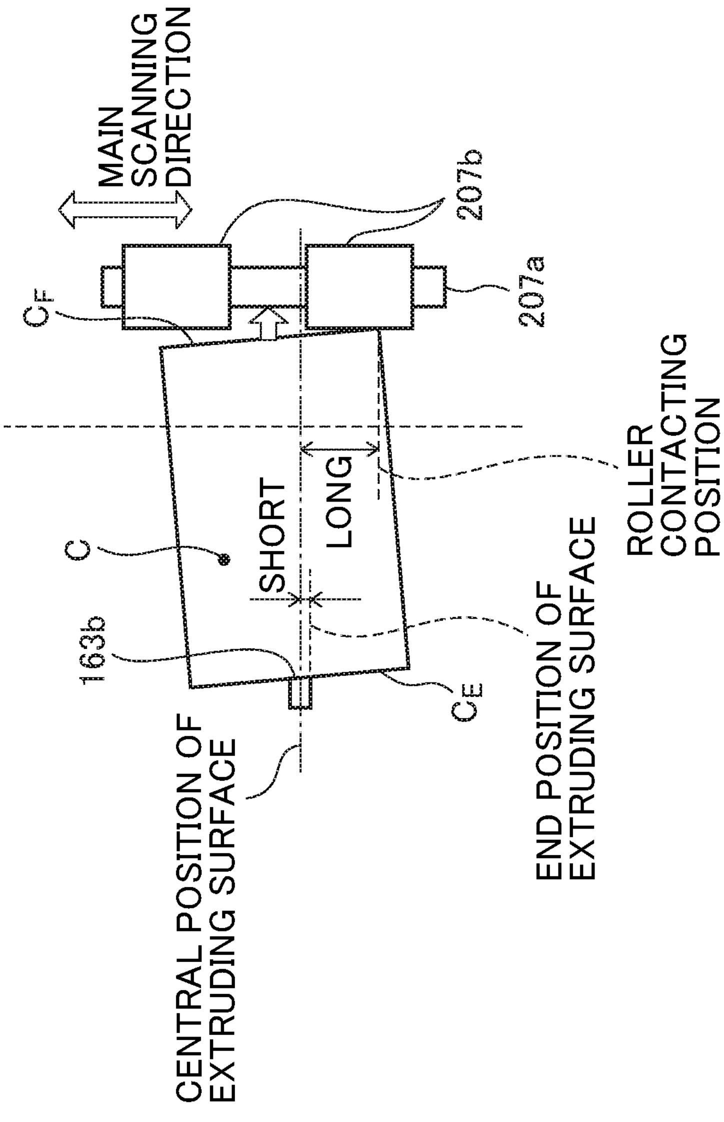

FIGS. 45A and 45B are explanatory views of a structure in which the central position of the small extruding surface 163*b* and the central position of the trailing end of the card C are allowed to coincide with each other. FIG. 45A is a view illustrating a state where the skewed card C contacts one of the conveyance rollers 207*b* in the ADF 5. FIG. 45B is a view illustrating a state in which the skew-corrected card C contacts both of the conveyance rollers 207*b* in the ADF 5. FIGS. 46A and 46B are explanatory views of the positional relationship of, when the card C pushed out by the small extruding surface 163*b* contacts one of conveyance rollers 207*b* in the ADF 5, the central position of the small extruding surface 163*b* and the position in the roller where the card C is brought into contact with the conveyance rollers 207*b* first in the main-scanning direction. FIG. 46A is an explanatory view of the positional relationship when the card C is first brought into contact, and FIG. 46B is a view illustrating a state after skew feeding has been corrected.

The document feeder assisting device 100 illustrated in FIGS. 12A to 12C may be employed as the basic structure of the document feeder assisting device 100 that can suitably include the small extruding surface 163*b* illustrated in FIGS. 44A to 44C.

Specifically, the document feeder assisting device 100 includes an ejection port 115 to eject the card C to be delivered to the card insertion slot 7 of the ADF 5, the document conveying mechanism 160 to convey the card C to be delivered toward the feed port, and the card stacker 112 where the card C to be delivered can be placed. The document feeder assisting device 100 assists card conveyance by the ADF 5.

Further included is the gate 120 to open and close the ejection port 115 depending on the delivery of the card C. The document conveying mechanism 160 includes the card trailing end extruding part to extrude and to convey the card C to deliver the card C to the card insertion slot 7 (feed port).

The gate 120 contacts the card stacker 112 to close the ejection port 115. The card trailing end extruding part is formed with the small extruding surface 163*b* to extrude a card trailing end CE which is the trailing end of the card C in the card conveyance direction.

In order to correct the skew of the card C, the small extruding surface 163*b* is used as illustrated in FIGS. 44A to 44C.

With this arrangement, unlike the case of using the large extruding surface 163*a* having a large contact surface contacting a card C as described above, when a skewed card C comes into contact with the conveyance rollers 207*b*, the skew can be corrected.

Specifically, in the case where the extruding surface is sufficiently small as illustrated in FIG. 44A, the right-turning (clockwise) moment is generated as illustrated in FIG. 44C. Therefore, the card C rotates by the right-turning moment and is straightened as illustrated in FIG. 44B, which allows the leading end CF which is the leading end of the card C in the card conveyance direction to be brought into contact with both of the conveyance rollers 207*b*. That is, skew feeding of the card C can be corrected.

However, there are cases where merely downsizing the extruding surface cannot sufficiently correct the skew of the card C although the skew of the card C can be corrected more than in the case of using the large extruding surface 163*a* as described above.

Therefore, the positional relationship with the card C and the positional relationship with a conveyance roller 207*b* to contact first have been examined.

(Positional Relationship with Card C)

First, the positional relationship between the card C to be extruded and the small extruding surface 163*b* will be described with reference to FIGS. 45A and 45B.

As the positional relationship with the card C, as illustrated in FIG. 45A, the central position of the trailing end CE of the card C (document) to be extruded in the card conveyance direction (sub-scanning direction) is allowed to coincide with the central position of the small extruding surface 163*b* in the main-scanning direction.

With this arrangement, the skew of the card C can be preferably corrected as illustrated in FIG. 45B as compared to a case structured otherwise.

(Positional Relationship with Conveyance Rollers 207*b*)

Next, the positional relationship with a conveyance roller 207*b* to contact first will be described with reference to FIGS. 46A and 46B.

It is desirable that the positional relationship with a conveyance roller 207*b* to contact first is as follows.

As illustrated in FIG. 46A, the distance from the central position of the small extruding surface 163*b* in the main-scanning direction to the small extruding surface 163*b* contacting the card C (document) is shorter than the distance from the central position of the small extruding surface 163*b* in the main-scanning direction to the main-scanning direction of the conveyance roller 207*b* to which the card C contacts.

With this arrangement, the skew of the card C can be preferably corrected as illustrated in FIG. 46B as compared to a case structured otherwise.

However, with the above-described structure alone, there is a possibility that the card C may be more prone to rotate depending on the skewed state of the card C when the skew of the card C to be extruded is corrected.

Therefore, after further examination on a preferable structure of the extruding surface to extrude the card C, a plurality of preferable structures has been found such as a structure in which the extruding surface to extrude the card C is curved and a structure in which an elastic member is provided to cause the small extruding surface to rotate in alignment with the trailing end surface of the card.

(Structure with Curved Surface Shape)

First, the structure in which the extruding surface to extrude the card C is curved will be described with reference to drawings.

Figure 47:
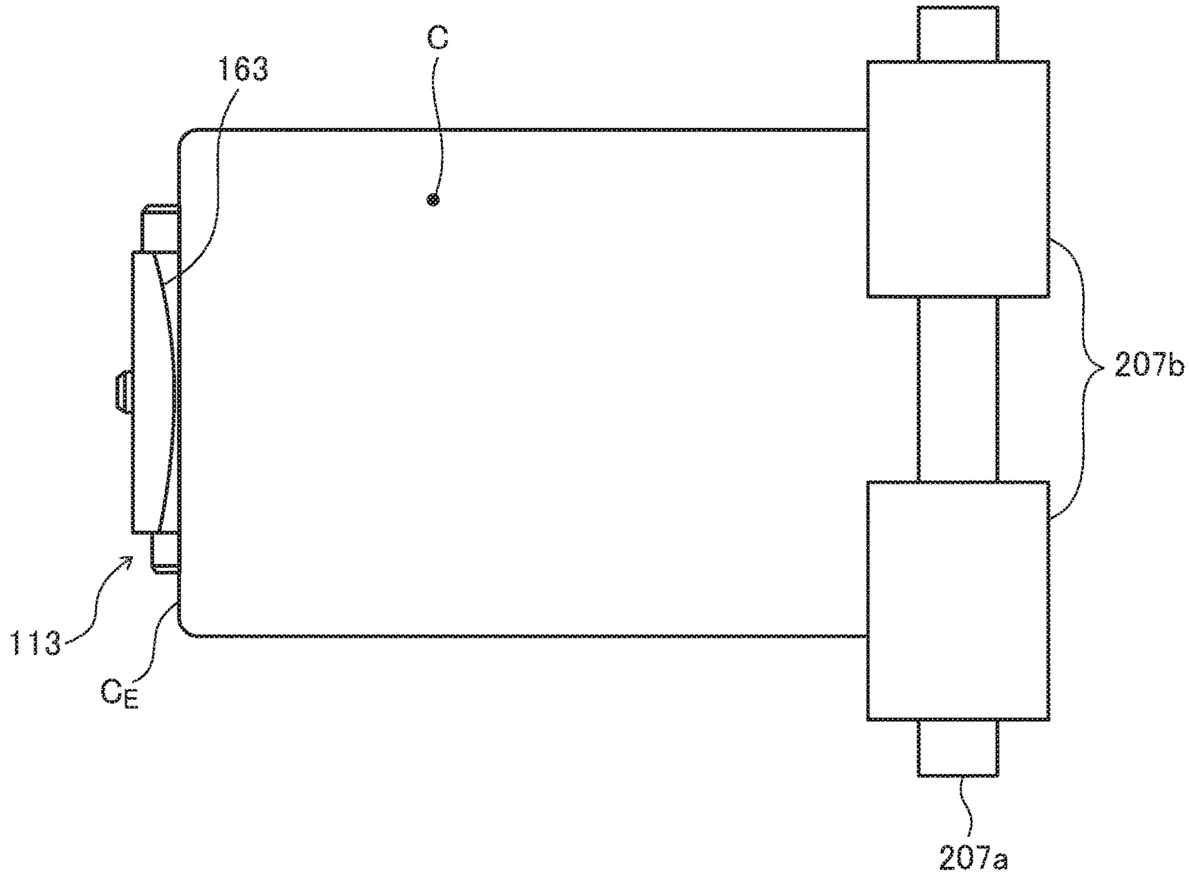
FIG. 47 is an explanatory view of a structure in which the extruding surface to extrude a card is curved.

FIG. 47 is an explanatory view of a structure in which an extruding surface to extrude a card C is curved.

As illustrated in FIG. 47, with a curved extruding surface 163 having a curved extruding surface to extrude the card C, the above-mentioned inconvenience can be solved.

Specifically, with the curved extruding surface 163 having a curved surface as an extruding surface to extrude the card C, the trailing end CE of the card C can easily rotate along the curved surface, which facilitates the leading end CF of the card C to contact all the conveyance rollers 207*b*.

(Structure with Elastic Member Included)

Next, a structure in which an elastic member is provided to cause the small extruding surface 163*b* to extrude the card C to rotate in alignment with the trailing end surface of the card will be described with reference to drawings.

Figure 48A:
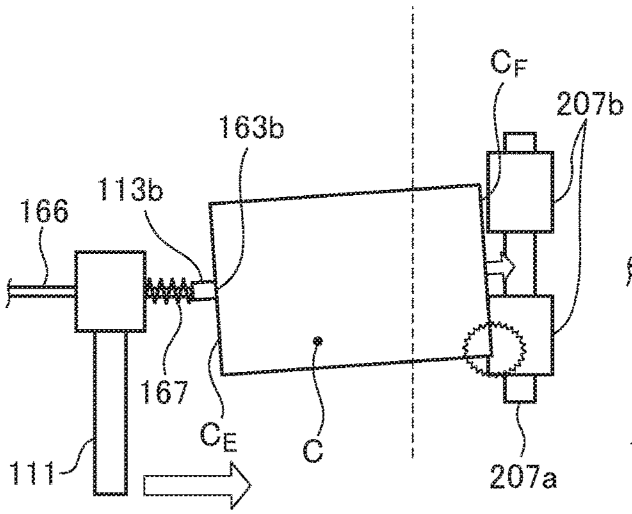
FIGS. 48A to 48C are explanatory views of a structure in which an elastic member is provided to pivot the small extruding surface in alignment with the trailing end surface of a card.
Figure 48B:
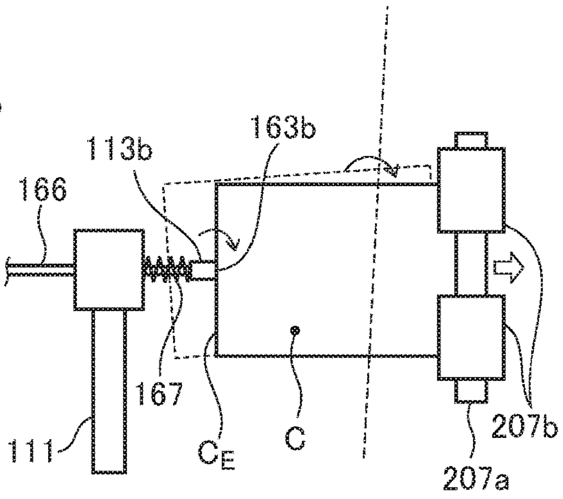
Figure 48C:
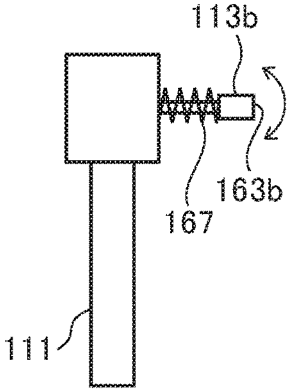

FIGS. 48A to 48C are explanatory views of a structure in which an elastic member is provided to cause a small extruding surface 163*b* to rotate in alignment with the trailing end surface of a card. FIG. 48A is a view illustrating a state in which the skewed card C contacts one of the conveyance rollers 207*b* in the ADF 5. FIG. 48B is a view illustrating the skew-corrected card C contacting both of the conveyance rollers 207*b* in the ADF 5, and FIG. 48C is an explanatory view illustrating a structure to rotatably support the small extruding surface 163*b*.

As illustrated in FIG. 48C, a card trailing end extruding member 113*b* on which the small extruding surface 163*b* is formed is rotatably supported by an elastic member 167, and movement of the card trailing end extruding member 113*b* is restricted to the card conveyance direction (sub-scanning direction) by a guide 166.

The document feeder assisting device 100 is structured as follows to allow the displacement as described above.

A first part including a card conveying lever 111 operated and moved by a user to apply force for extruding the card C in the card conveyance direction and a second part including the card trailing end extruding member 113 which moves when the card C is extruded are separate parts. The second part is arranged so as to contact the first part and other parts via the elastic member 167 provided substantially in the center of the card trailing end extruding member 113 in the main-scanning direction, and the moving direction of the first part and the second part is regulated to the card conveyance direction by the guide member.

In addition, a gap from the guide member is formed in the second part. The gap has a size that allows the second part to rotate.

With this arrangement, the following effects can be obtained.

Since the small extruding surface **163*b* to extrude the trailing end CE of the card C is flexible to some extent, even when the stacked card C is skewed, the entire small extruding surface 163*b*** can be pressed against the trailing end CE of the card C, and thus the conveying force can be easily transferred to the trailing end CE of the card C.

Here, the above-described structure is applicable not only to the card trailing end extruding member 113 formed with the small extruding surface **163*b*, but also to the card trailing end extruding member 113 formed with the curved extruding surface 163**.

Note that what can be pressed against the trailing end CE of the card C is a part of the curved extruding surface 163.

As the elastic member 167 used in the above-described structure, a compression spring is preferable.

The above arrangement enables provision of the document feeder assisting device 100 having a simple structure of low costs and is space-saving.

Further, in the document feeder assisting device 100 of the present embodiment, the card C is a resin card.

Accordingly, a resin card is a material of a general card-type document, and therefore many card-type documents are preferably transferred to an automatic document feeder (ADF).

Further, in the document feeder assisting device 100 of the present embodiment, it is preferable that the thickness of the card C is within a range from 0.48 [mm] to 0.78 [mm].

According to this arrangement, cards C having various thicknesses within a range from 0.48 [mm] to 0.78 [mm] can be reliably conveyed.

More specifically, documents having a thickness of about 0.5 [mm], which is often the size of registration cards in hospitals, along with cards having a thickness of 0.48 [mm] or 0.78 [mm] conforming to the JIS II standards can be dealt with.

Furthermore, in the document feeder assisting device 100, it is preferable that the vertical and horizontal dimensions of a card C to be conveyed are 53.98 [mm] and 85.60 [mm], respectively.

According to the above, the following effects can be obtained.

The above dimensions of the card C conform to the JIS II standards, which are often conveyed to the card insertion slot 7 included in the vicinity of the intermediate portion of the document conveyance passage 55 of the ADF 5.

Therefore, many of registration cards in hospitals, credit cards, cash cards, driver's licenses, individual number cards, and the like can be conveyed in a preferable manner.

Moreover, in the document feeder assisting device 100, it is preferable that a document to be conveyed is at least one of a "carrier sheet," a "plastic card," a "postcard," an "envelope," a "form," a "clear file holder," and a "business card."

According to this, even a document having a thickness thicker than the thickness of a general sheet document S can be preferably conveyed toward the card insertion slot 7 included in the vicinity of the intermediate portion of the document conveyance passage 55 of the ADF 5.

Furthermore, it is preferable that the document feeder assisting device 100 is attachable to and detachable from the ADF 5.

According to the above, the document feeder assisting device 100 can be detached from the ADF 5 when not in use, which can downsize the ADF 5, the reading device 6, and the image forming apparatus 1 to which the document feeder assisting device 100 is to be attached.

Furthermore, the ADF 5 of the present embodiment includes any one of the document feeder assisting devices 100 described above as a document conveyance assisting unit to convey a card C toward the card insertion slot 7 included in the vicinity of the intermediate portion of the document conveyance passage 55.

This arrangement enables provision of the ADF 5 that can achieve similar effects to the effects of any of the document feeder assisting devices 100 described above.

Furthermore, the reading device 6 of the present embodiment includes the ADF 5 including any one of the document feeder assisting devices 100 described above as a document conveyance assisting unit to convey a card C toward the card insertion slot 7 included in the vicinity of the intermediate portion of the document conveyance passage 55.

This arrangement enables provision of the reading device 6 that can achieve similar effects to the effects of the ADF 5 including any of the document feeder assisting devices 100 described above.

Furthermore, the image forming apparatus 1 of the present embodiment includes the ADF 5 including any one of the document feeder assisting devices 100 described above as a document conveyance assisting unit to convey a card C toward the card insertion slot 7 included in the vicinity of the intermediate portion of the document conveyance passage 55.

This arrangement enables provision of the image forming apparatus 1 that can achieve similar effects to the effects of the ADF 5 including any of the document feeder assisting devices 100 described above.

Embodiment 5

Next, Embodiment 5 of a document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 according to the present embodiment has a similar basic structure to the structure of Embodiment 1 described above. However, the structure of Embodiment 5 is different from the structure Embodiment 1 in which a more preferable exemplary structure for the extruding surface to extrude a card C is described regarding failed conveyance of the card C.

Therefore, structures and effects similar to structures and effects of Embodiment 1 will be omitted from description as appropriate, and the same members will be denoted by the same symbol in the description unless it is particularly required to distinguish the members.

The characteristic structure of the present embodiment is also applicable to the large extruding surface **163*a* and the small extruding surface 163*b* without being limited to the curved extruding surface 163. However in the following description, an example of application to the curved extruding surface 163** will be described.

Figure 49:
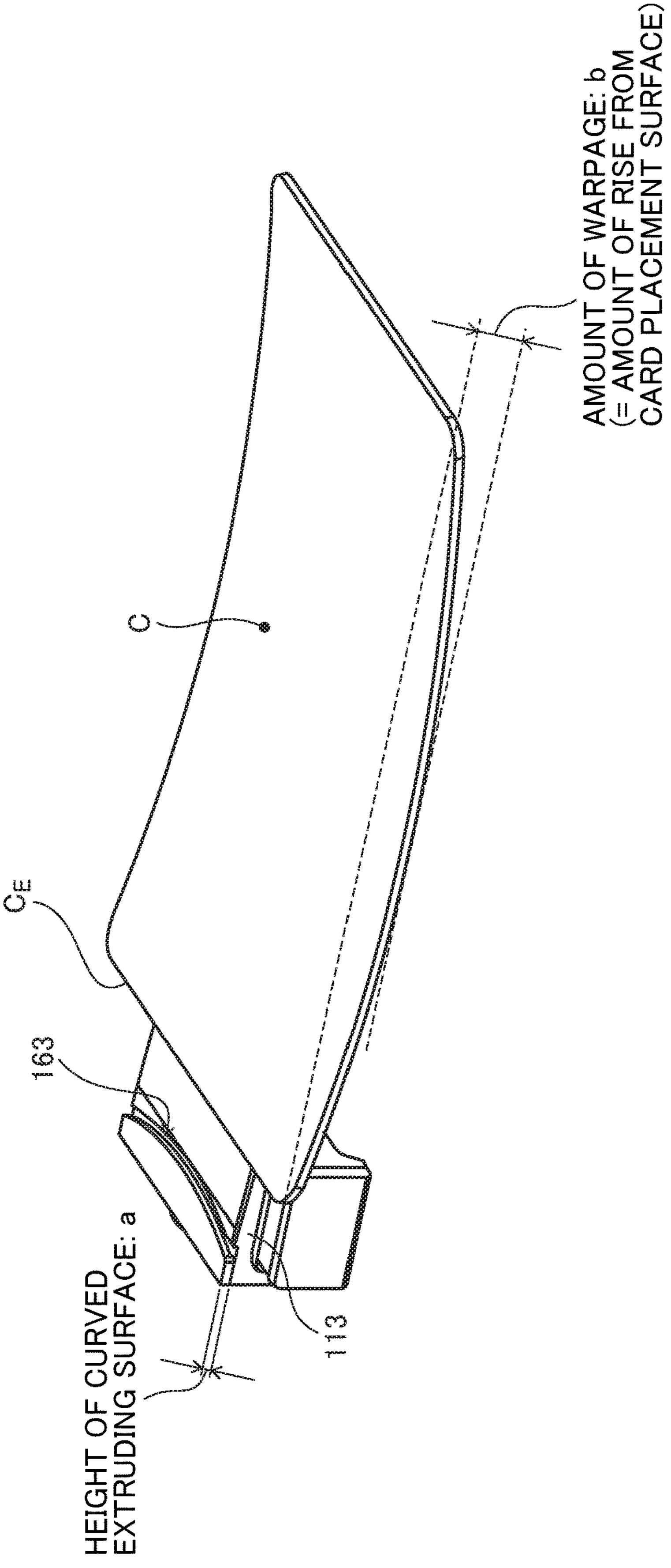
FIG. 49 is an explanatory view of the relationship between a height a of an extruding surface to extrude a card and an amount of warpage b at the trailing end of the card according to Embodiment 5 of this disclosure.
Figure 50A:
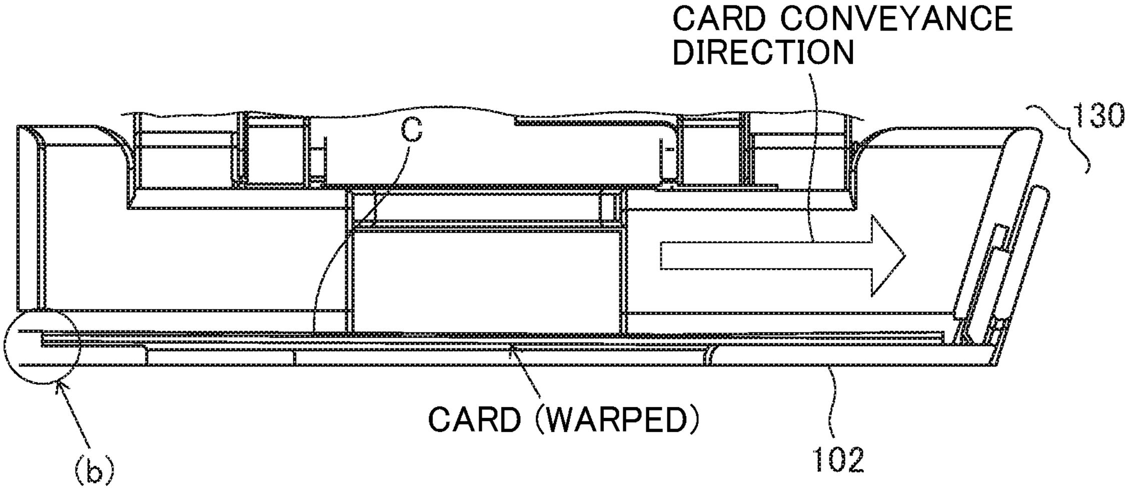
FIGS. 50A and 50B are explanatory views of a comparative structure in which a placement surface on which cards C are placed serves as the height reference for a curved extruding surface and the curved extruding surface is orthogonal to the placement surface.
Figure 50B:
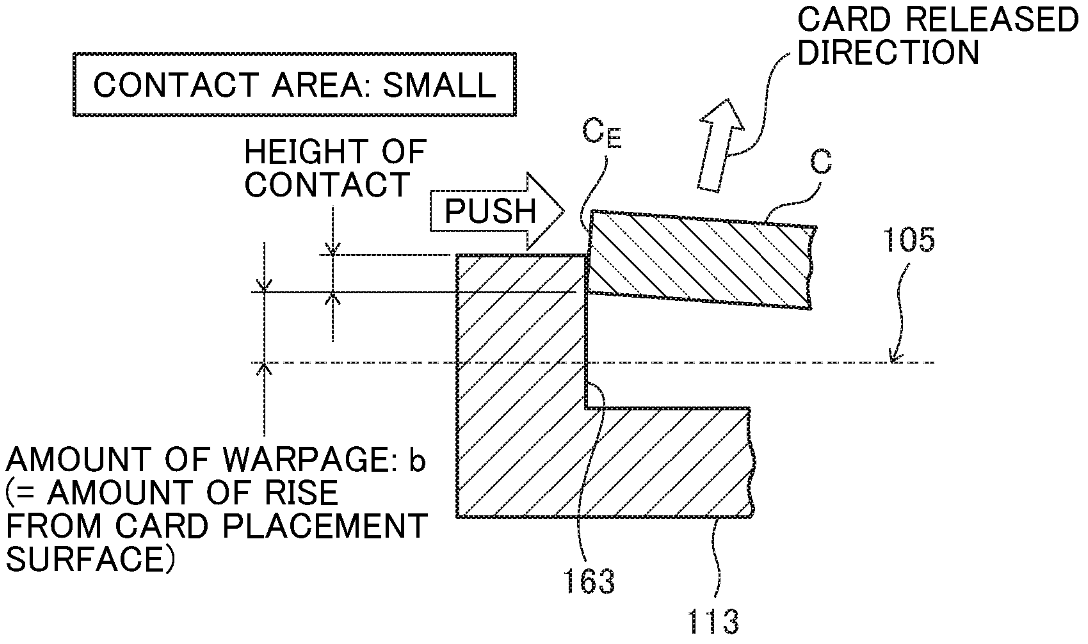
Figure 51:
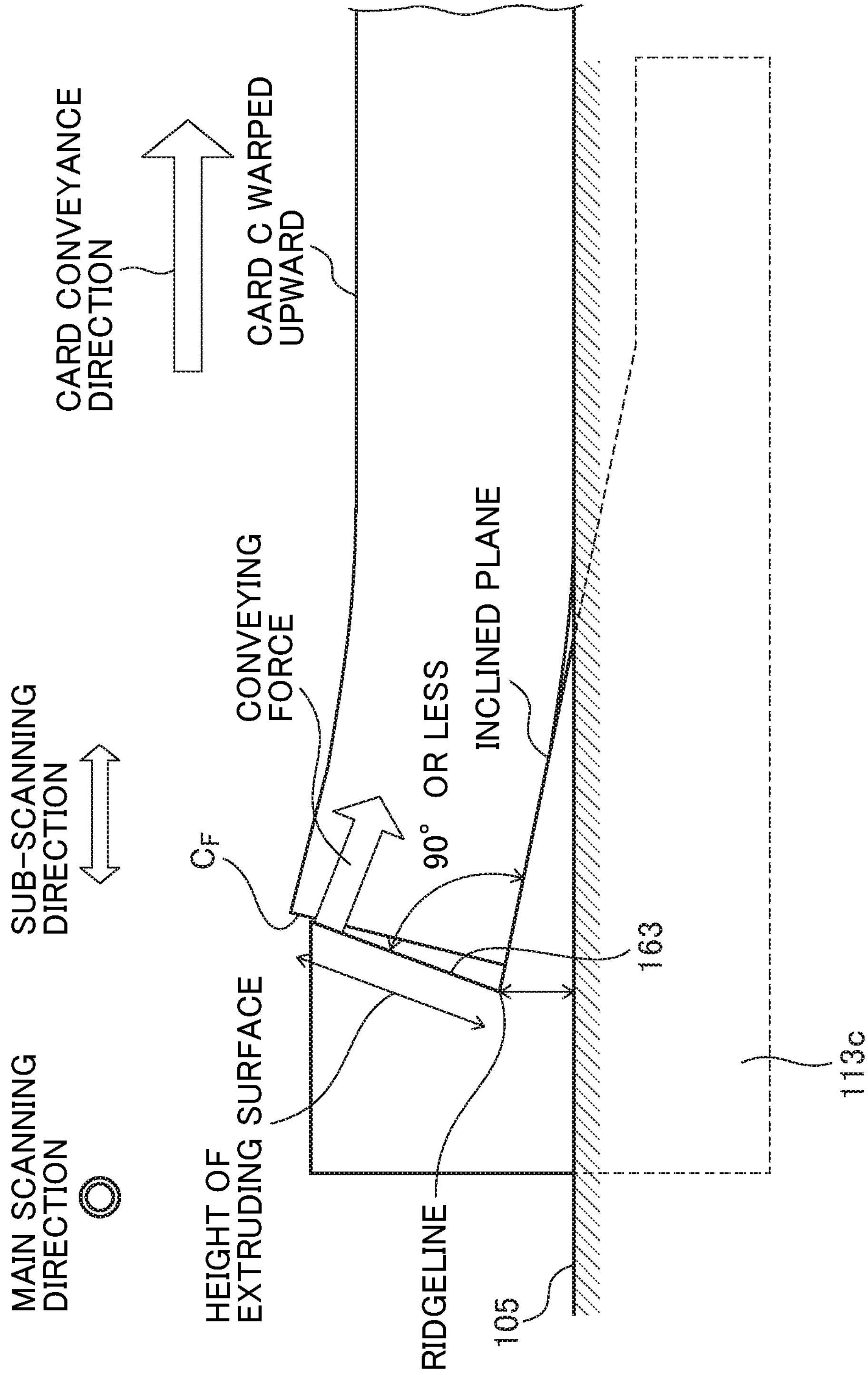
FIG. 51 is an explanatory cross-sectional view of a structure in which a card placement surface serves as the reference for an inclined surface and a curved extruding surface forms 90 degrees or less with respect to the card placement surface according to Embodiment 5 of this disclosure.

FIG. 49 is an explanatory view of the relationship between a height a of the curved extruding surface 163 to extrude the card C and an amount of warpage b at the leading end CF and the trailing end CE of the card C according to the present embodiment. FIGS. 50A and 50B are explanatory views of a comparative structure in which a placement surface 105 on which cards C are placed serves as the height reference for a curved extruding surface 163 and the curved extruding surface 163 is orthogonal to the placement surface 105. FIG. 50A is a cross-sectional view of the stacker case 102, and FIG. 50B is an enlarged cross-section around the curved extruding surface 163. FIG. 51 is an explanatory cross-sectional view of a structure in which a placement surface 105 of a card C serves as the reference for an inclined surface and a curved extruding surface 163 forms 90° or less with respect to the placement surface 105 of the card C according to Embodiment 5.

Figure 52A:
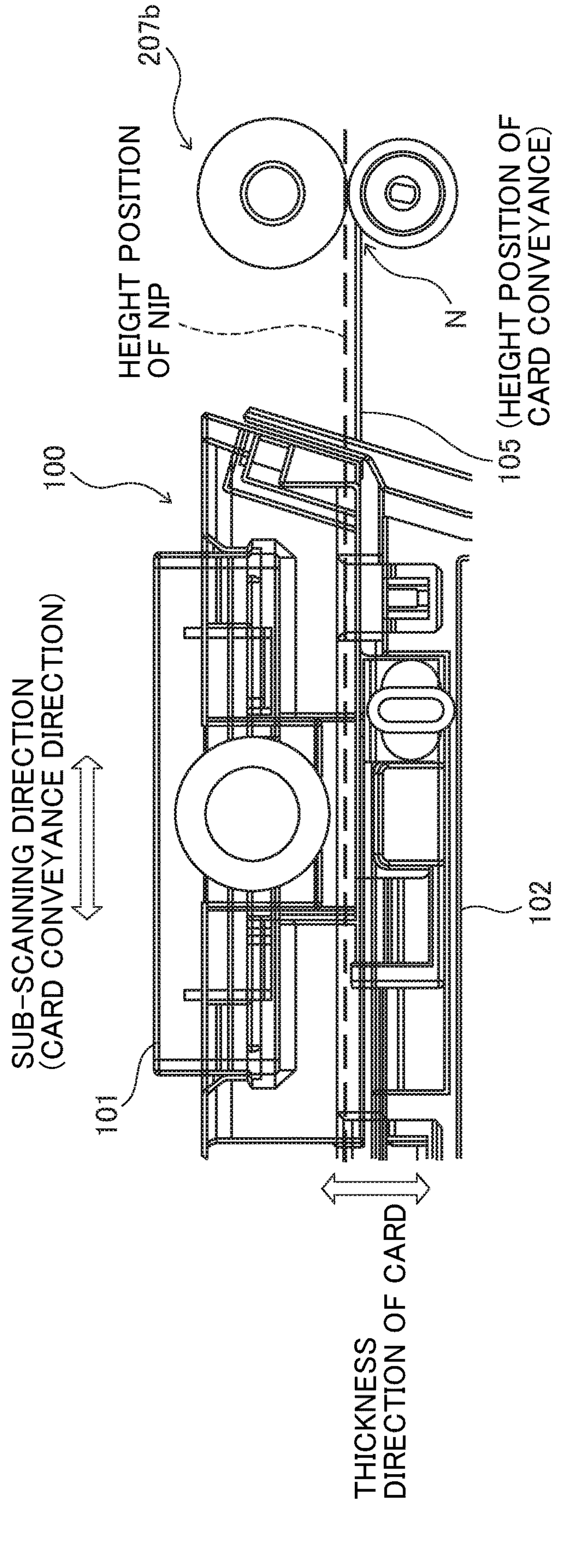
FIGS. 52A to 52C are explanatory views of a height position of card (document) conveyance on the curved extruding surface side and a height position of a nip portion when a card is conveyed to the nip portion of the conveyance rollers of the ADF.
Figure 52B:
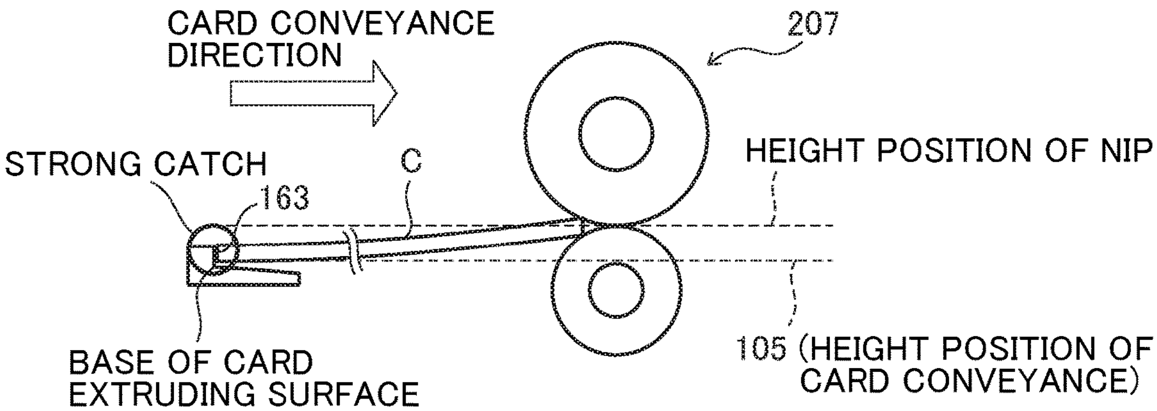
Figure 52C:
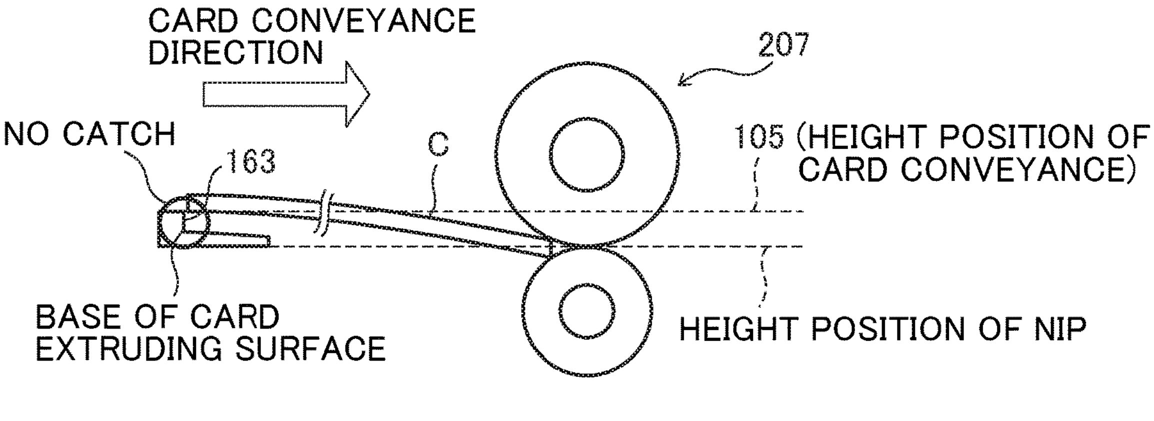

FIGS. 52A to 52C are explanatory views of a height position of card (document) conveyance on the curved extruding surface 163 side and a height position of a nip portion N when a card C is conveyed to the nip portion of the conveyance rollers 207 of the ADF 5. FIG. 52A is a cross-sectional explanatory view when the height position of card conveyance is lower than the height position of the nip portion N. FIG. 52B is a simplified explanatory view of FIG. 52A, and FIG. 52C is a simplified explanatory view in the case where the height position of card conveyance is higher than the height position of the nip portion N.

There are cases in which failure occurs upon card conveyance.

A contributing factor to the above is that in the case where a card an end of which is warped upward in the card thickness direction is conveyed, when a height "a" of the curved extruding surface 163 from the placement surface 105 and an amount of warpage "b" satisfy $a<b$, the curved extruding surface 163 is not caught by the trailing end CE of the card C as illustrated in FIG. 49. As a result, the curved extruding surface 163 is positioned under the card C, thus significantly causing conveyance failure of the card C.

Moreover, as illustrated in FIG. 50B, as the amount of upward warpage of the card C becomes larger, the contact area in the height direction of the curved extruding surface 163 in contact with the trailing end CE of the card C becomes smaller, thus allowing the card C to be more likely to be released.

In the related art as illustrated in FIGS. 50A and 50B, the placement surface 105 on which cards C are stacked serves as the height reference of the curved extruding surface 163 (extruding surface), and the curved extruding surface 163 (extruding surface) is orthogonal to the placement surface 105 on which the cards C are placed.

As result of examination on the structure for restraining the occurrence of this card conveyance failure, the following points to be enhanced have been found.

(1) With an inclined surface to allow an angle formed by the curved extruding surface 163 and the inclined surface to be 90° or less, the curved extruding surface 163 to extrude the card C can easily catch the trailing end CE of the card C, and the conveying force is transferred to the card C in a direction to press down the trailing end CE of the card C from above. This makes it difficult for the card C to be released above the curved extruding surface 163.

(2) In the comparative structure in the figure, the placement surface 105 of the card C serves as the reference position of the height of the curved extruding surface 163, and since a part of the placement surface 105 of the card C and a part of the curved extruding surface 163 are not integrated into the same part, the accuracy of the heights is not good.

Therefore, by integrating the reference of the height of the curved extruding surface 163 and the curved extruding surface 163 into the same part, the accuracy of the height of the curved extruding surface 163 can be enhanced. Therefore, by setting the ridgeline between the curved extruding surface 163 and the inclined surface higher than the card placement position, the inclined surface can serve as the height reference of the curved extruding surface 163, thus allowing the height reference of the curved extruding surface 163 and the curved extruding surface 163 to be integrated into the same part.

Here, in the structure in which the trailing end CE of the card C is extruded one by one, the height accuracy of the curved extruding surface 163 is to be concerned. This is because, in order to prevent double feeding in which two or more cards are conveyed at a time, the height of the curved extruding surface cannot exceed 0.76 [mm] in order to convey a card having a card thickness (for example, of 0.76 [mm] which is a typical thickness) one by one, whereas if the height of the curved extruding surface 163 is too low, the catch of the trailing end CE of the card C is reduced, and conveyance failure is more likely to occur.

Therefore, it is ideal that the height of the curved extruding surface 163 be as high as possible while not exceeding the card thickness.

As for a card C warped downward in the thickness direction, since the trailing end CE of the card C is on the placement surface 105 of the card C(=amount of warpage at the trailing end CE being 0), no conveyance failure may occur.

Therefore, in the present embodiment, the structure as illustrated in FIG. 51 is employed.

Specifically, the curved extruding surface 163 provided to the card trailing end extruding member 113 is set to form an orthogonal angle or an angle less than 90° with respect to the inclined surface inclined downward from the curved extruding surface 163 in the card conveyance direction. The height position of at least a part of the ridgeline between the inclined surface and the curved extruding surface 163 with respect to the card conveyance surface to convey the card C in the document feeder assisting device 100 is set so as to be higher than the placement surface 105 of the card C.

With this arrangement, when the warped card C is conveyed, conveyance failure of the card C can be prevented.

Furthermore, in the document feeder assisting device 100 of the present embodiment, the structure of the card trailing end extruding member 113 formed with the curved extruding surface 163 is as follows.

The height position of conveyance of the card C with respect to the card conveyance surface to convey the card C in the document feeder assisting device 100 is positioned between the height position of the nip portion N of the conveyance rollers 207*b* arranged in the vicinity of the feed port of the ADF 5 and the height position of the base of the curved extruding surface 163 formed on the card trailing end extruding member 113.

With this arrangement, as illustrated in FIG. 52A, in the case where the height position of the nip portion N is higher than the height position of card conveyance, when the leading end CF of the card C comes into contact with the nip portion N, the trailing end CE is pressed against the base of the curved extruding surface 163. Therefore, this structure can reduce the amount of rise of the trailing end CE of the card C, thus further preventing occurrence of a conveyance failure.

Embodiment 6

First, Embodiment 6 of the document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 according to the present embodiment is different from Embodiment 1 described above, except that a second surface 122 formed on a gate 120 is orthogonal to the energizing direction in Embodiment 6.

Therefore, a similar structure to a structure described in Embodiment 1, and the operation and effects of the structure will be omitted as appropriate. Similar members are denoted by the same symbol for description unless there is a particular need to distinguish the members.

First, before explaining the document feeder assisting device 100 of the present embodiment, an evaluation result of a prototype of a document feeder assisting device to which the structure of Embodiment 1 is applied as well as new challenges obtained from the evaluation result will be explained.

Figure 54A:
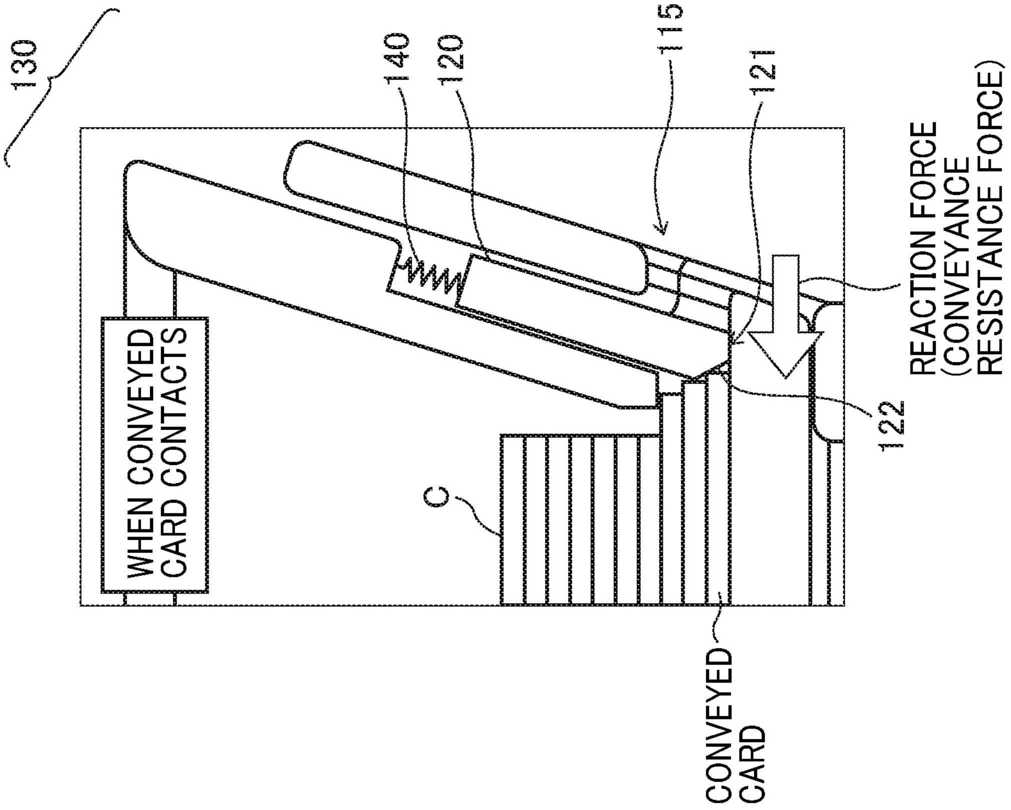
FIGS. 54A and 54B are explanatory views of a reaction force from the gate.
Figure 54B:
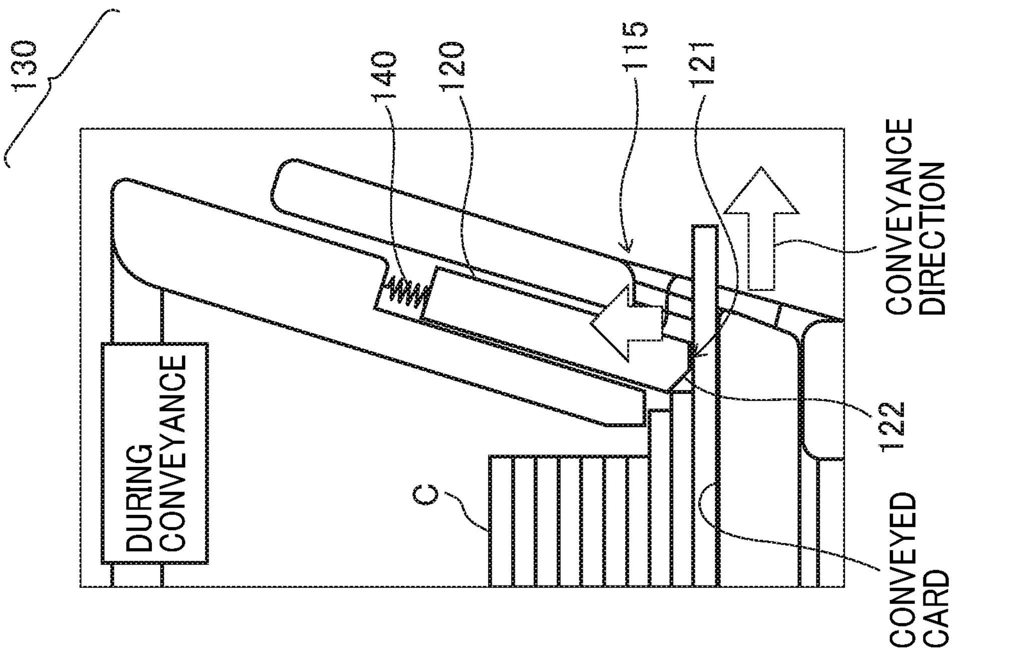

FIG. 53 is a table illustrating an evaluation result of a prototype of a document feeder assisting device to which the structure of Embodiment 1 is applied, and FIGS. 54A and 54B are explanatory views of reaction force from a gate 120.

As illustrated in the evaluation result of FIG. 53, in the conveyance to an ADF using the prototype of the document feeder assisting device, the conveyance resistance force as the evaluation item (5) was evaluated as being fair.

There was an inconvenience that the conveyance resistance force was 7.2 [N], whereas a target value is 6 [N]. That is, the conveyance resistance force was too large to apply appropriate conveyance resistance force, thus still leaving room for enhancement in operability. Also, as a comment for the evaluation, a card conveying lever 111 was slightly not smooth.

One of the main factors of this conveyance resistance force is reaction force from the gate 120 when a card is being conveyed as illustrated in FIG. 54B and contacts the gate 120 during the card conveyance as illustrated in FIG. 54A.

The reason for this is that in evaluation, the conveyance resistance force was 7.2 [N], which is the maximum value, when the leading end of the card contacted the gate during the card conveyance.

Therefore, examination was made repeatedly with a focus on the angle of the second surface 122 of the gate 120 with which the leading end of the card C contacts during the card conveyance, and it was found that the conveyance resistance force can be suitably mitigated by setting the second surface 122 of the gate 120 to be orthogonal to the energizing direction of a compression spring 140.

Next, the contents of the examination will be briefly described with reference to drawings.

Figure 55A:
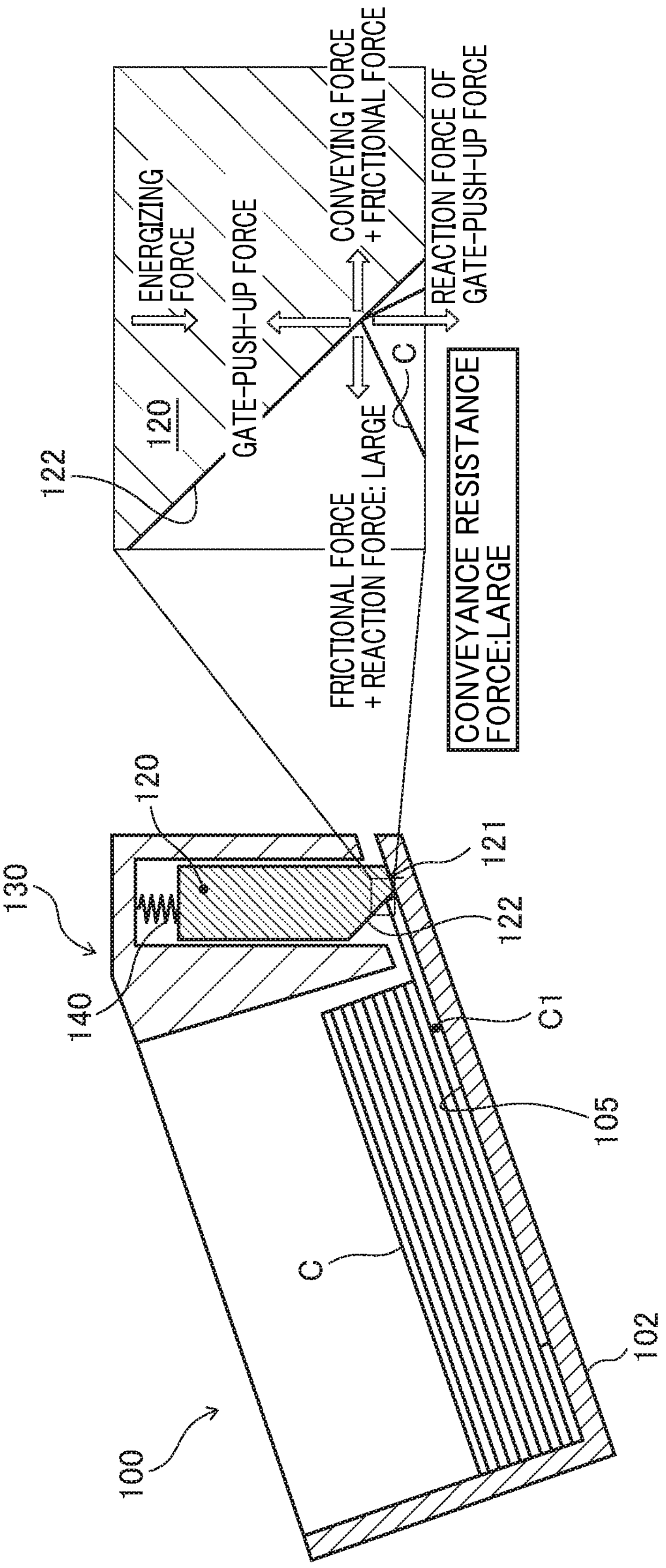
FIGS. 55A and 55B are explanatory views of conveyance resistance force in the case where the angle of a second surface of a gate has two variations.
Figure 55B:
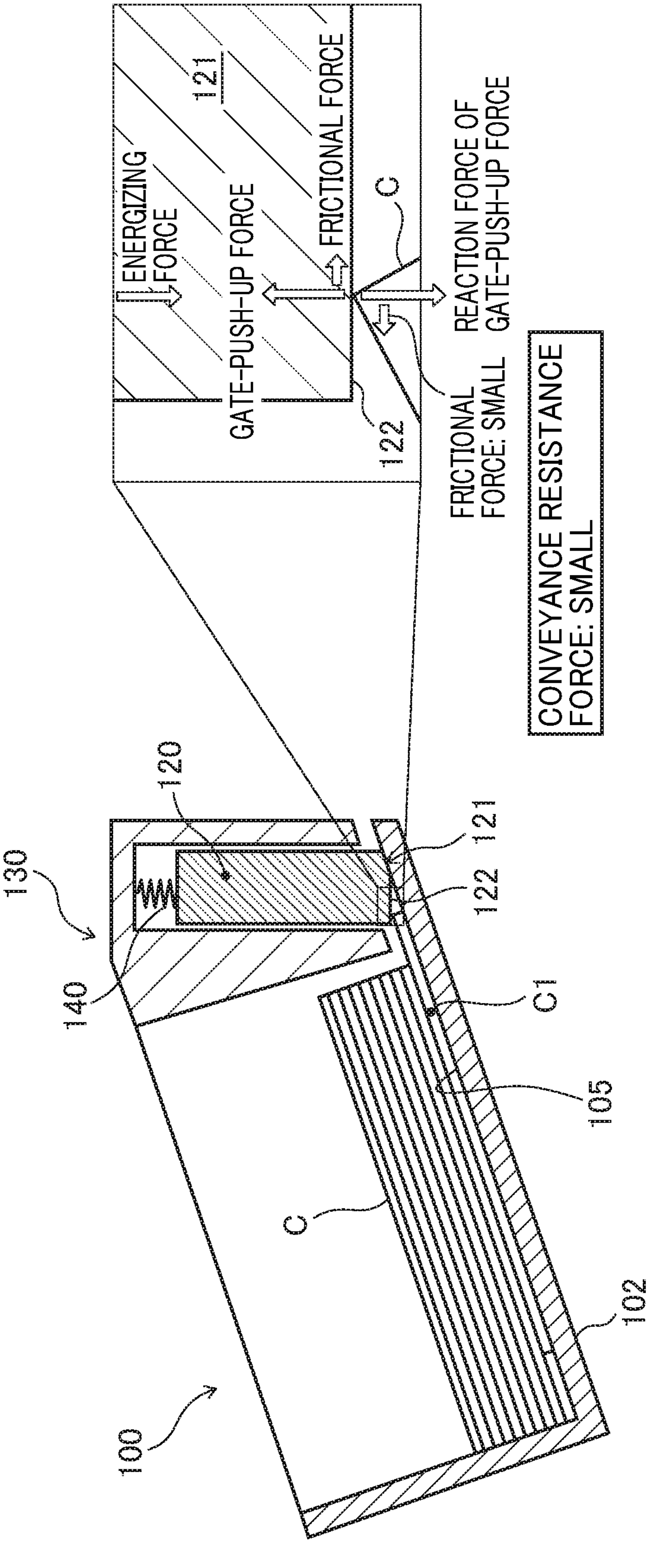

FIGS. 55A and 55B are explanatory views of conveyance resistance force in the case where the angle of the second surface 122 of the gate 120 has two variations. FIGS. 55A and 55B are explanatory views of an example where the document contact surface is not orthogonal to the direction of action of the energizing force, and FIG. 55B are explanatory views of a case where the document contact surface is orthogonal to the direction of action of the energizing force.

In the structure in which the second surface 122 of the gate 120 is not orthogonal to the energizing direction of the compression spring 140 as illustrated in FIG. 55A as in the structure of Embodiment 1 described above, the conveyance resistance of the card document is as follows.

Since the document contact surface of the gate is not orthogonal to the direction of action of the energizing force, a component force of the reaction force to the gate-push-up force is generated as illustrated in FIG. 55A, and resultant force of the generated component force of the reaction force to the gate-push-up force and the frictional force acts as the conveyance resistance of the card document. Therefore, the conveyance resistance force is larger than in the structure in which the second surface 122 of the gate 120 is orthogonal to the energizing direction by the compression spring 140, which will be described later. On the contrary, in the structure in which the second surface 122 of the gate 120 is orthogonal to the energizing direction by the compression spring 140 as illustrated in FIG. 55B, no component force of the reaction force to the gate-push-up force is generated as illustrated in FIG. 55B, and resultant force with the frictional force acts as the conveyance resistance of the card document, which is smaller.

For this reason, in order to generate the same amount of gate-push-up force as the amount of gate-push-up force in the structure illustrated in FIG. 55B in the structure illustrated in FIG. 55A, a larger conveying force is required than in the case of FIG. 55B. Therefore, the conveyance resistance force is also larger than in the case of FIG. 55B.

Simply describing, the same amount of gate-push-up force can be generated with less conveying force in the case of FIG. 55B since the reaction force to the conveying force is smaller than in the case of FIG. 55A.

Therefore, the conveyance resistance force is smaller in the case of FIG. 55B.

Next, a specific structure of the document feeder assisting device 100 of the present embodiment will be described with reference to drawings.

Figure 56:
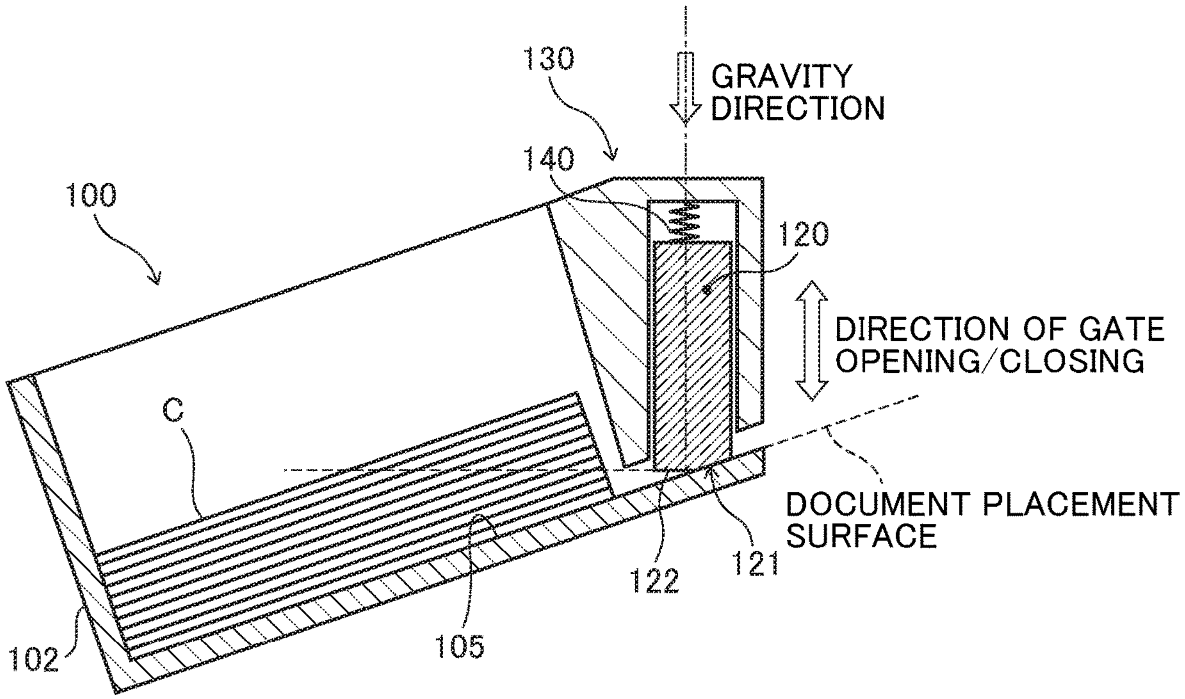
FIG. 56 is a schematic explanatory view of a document feeder assisting device according to Embodiment 6 of this disclosure.
Figure 57:
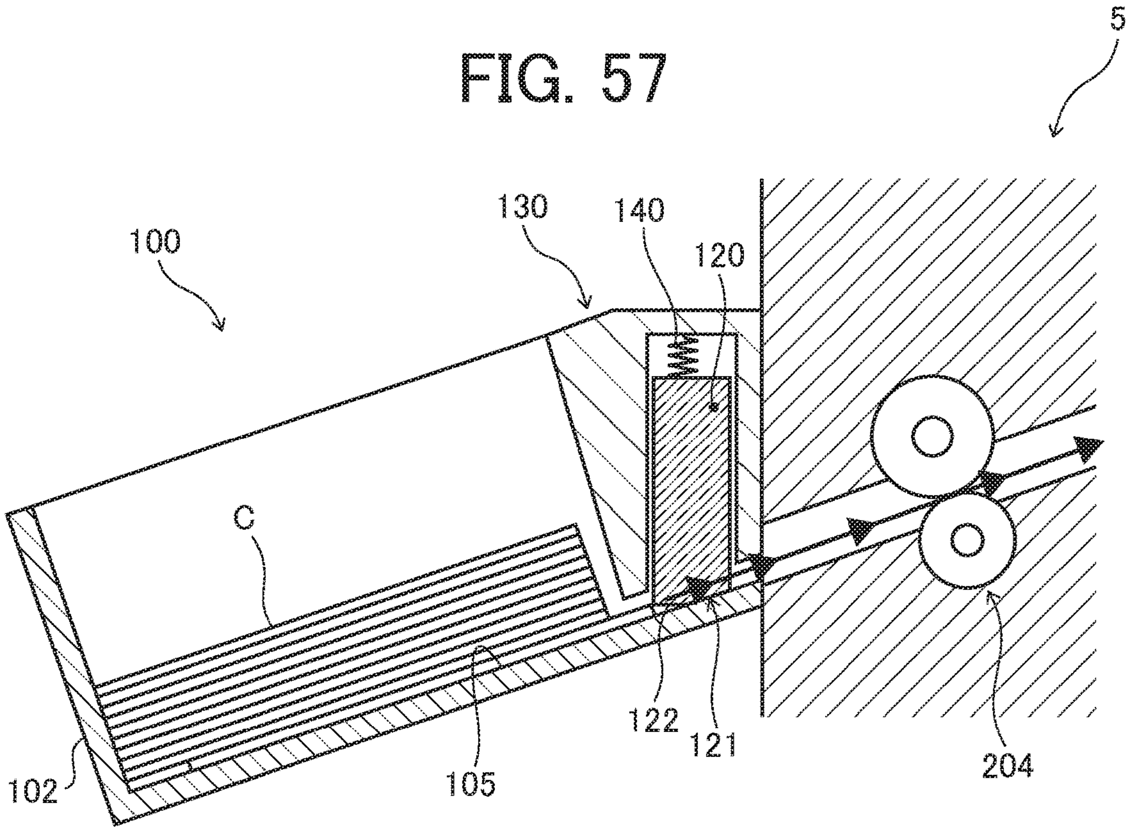
FIG. 57 is an explanatory view of a card conveyance direction in the document feeder assisting device.
Figure 58A:
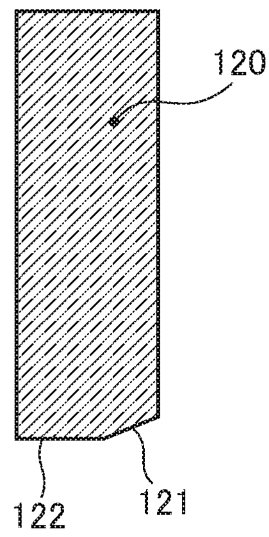
FIGS. 58A and 58B are explanatory views of a gate.
Figure 58B:
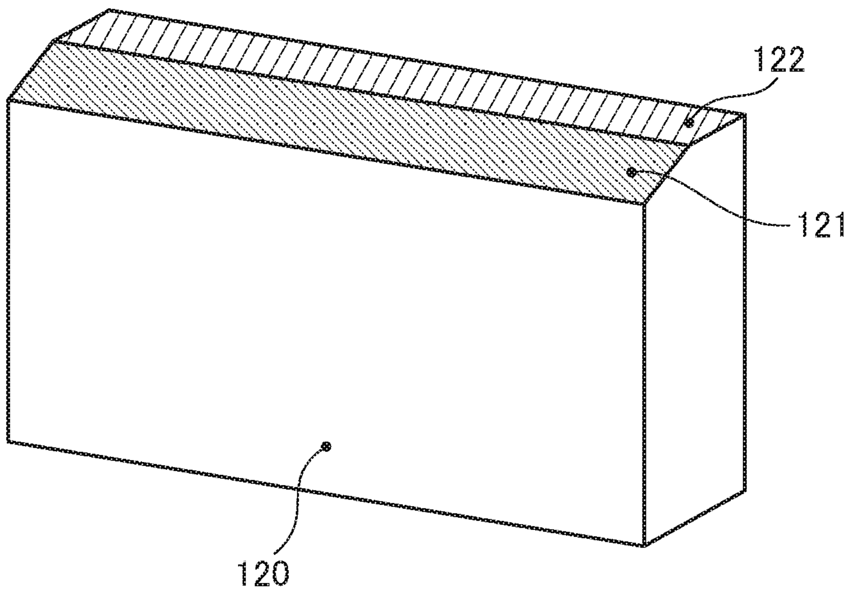

FIG. 56 is a schematic explanatory view of the document feeder assisting device 100 according to the present embodiment, and FIG. 57 is an explanatory view of the conveyance direction of a card C in the document feeder assisting device 100. FIGS. 58A and 58B are explanatory views of the gate 120. FIG. 58A is an explanatory cross-sectional view of the gate 120, and FIG. 58B is an explanatory perspective view of the gate 120.

As illustrated in FIG. 56, in the document feeder assisting device 100 of the present embodiment, the second surface 122, which is a document contact surface of the gate 120 against which the document contacts during document conveyance, is orthogonal to the energizing direction of the gate 120 by the compression spring 140. That is, an angle formed by the energizing direction of the gate 120 by the compression spring 140 and the second surface 122 of the gate 120 is 90°.

Here, since the energizing direction of the gate 120 by the compression spring 140 is set so as to be substantially parallel to the gravity direction, the second surface 122 of the gate 120 is substantially orthogonal.

When the card C is conveyed along the placement surface 105, the card C hits the gate 120, and then opens the gate 120 while pushing up the gate 120. The gate opening and closing direction, which is the opening and closing direction of the gate 120 here, is also substantially parallel to the gravity direction, that is, substantially vertical to the second surface 122.

The card C having pushed up (opened) the gate 120 and passed under the gate 120 is delivered to the second document conveying mechanism 204 of the ADF 5.

As illustrated in FIGS. 58A and 58B, the gate 120 has the second surface 122 which is the document contact surface against which the card C contacts first during conveyance and a first surface 121 that is a surface that is in contact with the placement surface 105 of the card stacker 112 at times other than document conveyance.

Next, the operation of the gate 120 when the card C is conveyed will be described with reference to drawings.

Figure 59B:
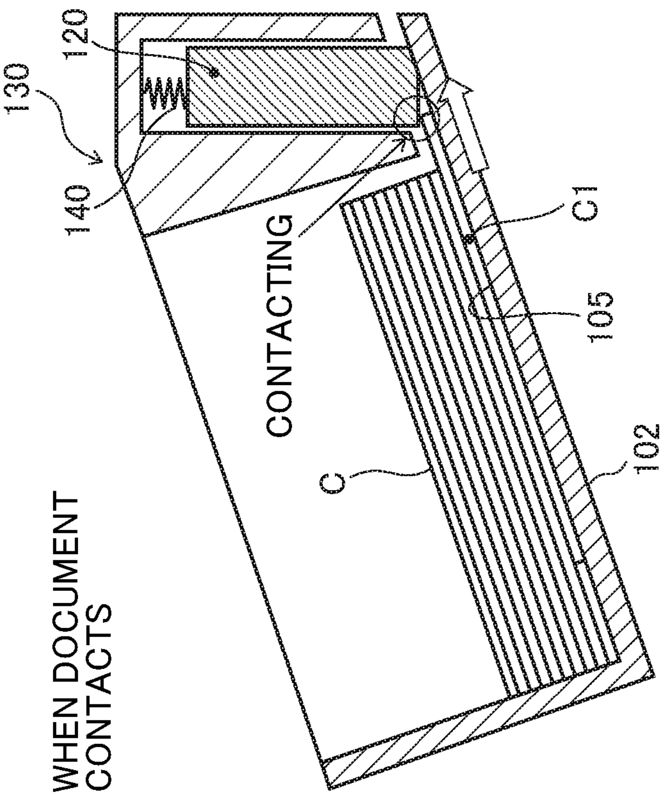
FIGS. 59A to 59D are explanatory views of the operation of the gate when a card is conveyed.
Figure 59A:
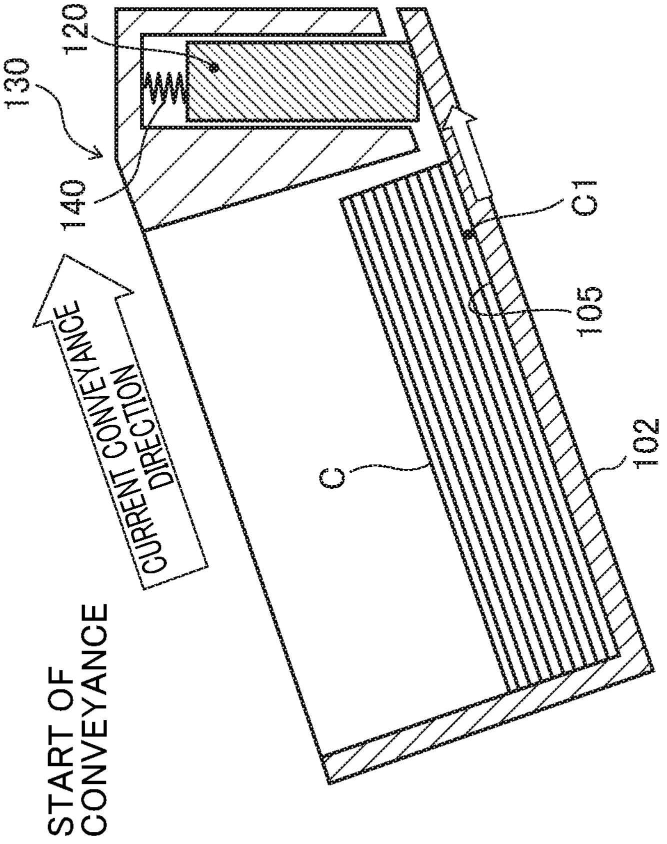
Figure 59D:
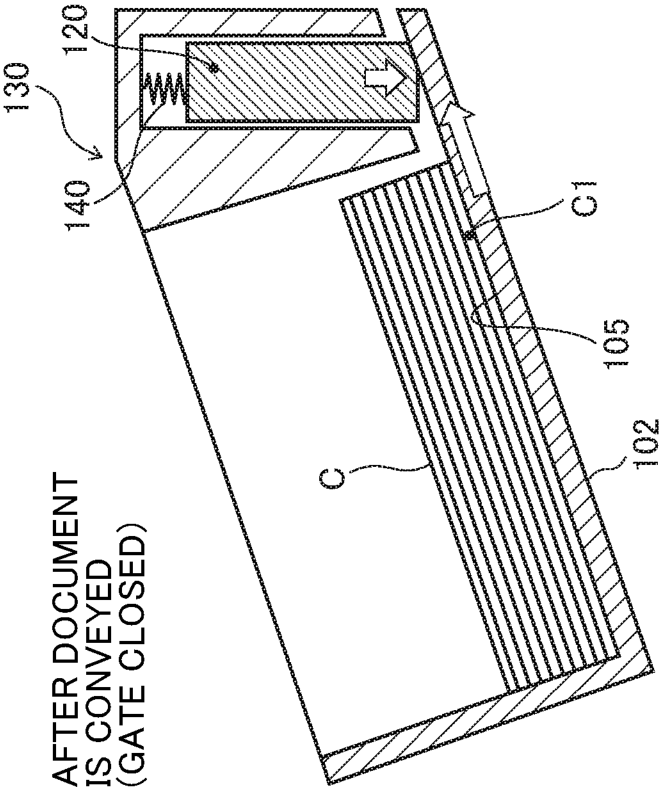
Figure 59C:
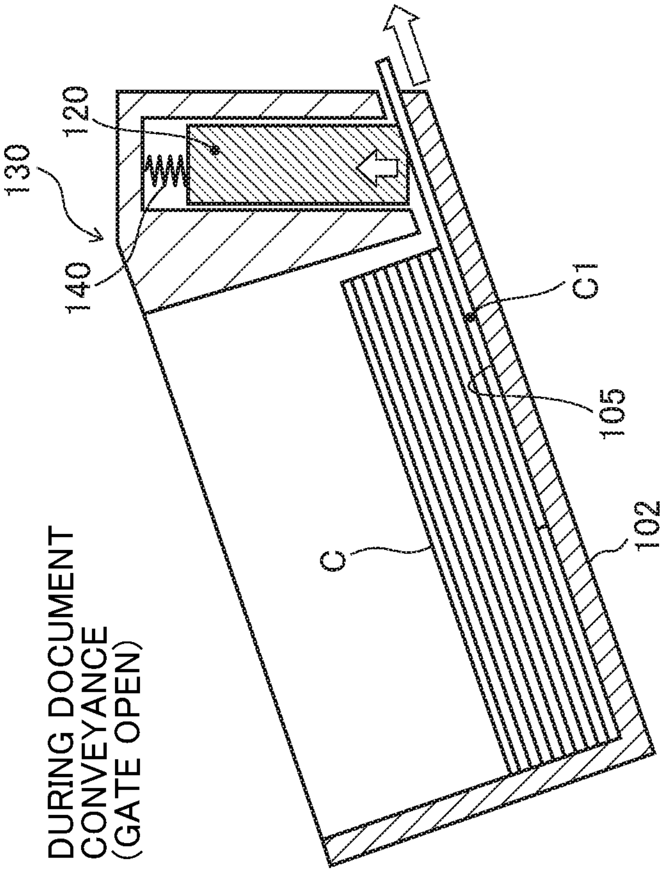

FIGS. 59A, 59B, 59C, and 59D are explanatory views of the operation of the gate 120 when the card C is conveyed. FIG. 59A is an explanatory view of a first card C1 (document) at the start of conveyance, and FIG. 59B is an explanatory view of the first card C1 first contacting the second surface 122 of the gate 120. FIG. 59C is an explanatory view of the first card C1 having pushed up and opened the gate 120 and being conveyed under the gate 120, and FIG. 59D is an explanatory view after the conveyance of the first card C1 by the document feeder assisting device 100.

As illustrated in FIG. 59A, when a plurality of cards C (documents) starts to be conveyed, all the cards C including a first card C1 are positioned on the upstream side in the card conveyance direction by the action of the gravity. In this state, the first surface 121 of the gate 120 is in contact with the placement surface 105, which is a closed state. Then, as illustrated in FIG. 59B, the leading end of the first card C1 in the card conveyance direction (hereinafter referred to as the leading end of a document as appropriate) comes into contact with the second surface 122 of the gate 120. After the contact in this manner, as illustrated in FIG. 59C, with the conveying force to convey the first card C1, the leading end of the document pushes up the gate 120 to cause the gate 120 to be displaced upward to be in an open state and passes while sliding on the first surface of the gate 120.

When the conveyance of the first card C1 from the document feeder assisting device 100 is completed as illustrated in FIG. 59D, the gate 120 which has been displaced upward returns to the closed state, in which the first surface 121 contacts the placement surface 105, by the energizing force of the compression spring 140 and the weight of the gate 120 itself.

By repeating the operation as described above, the plurality of cards C accommodated in the document feeder assisting device 100 can be consecutively conveyed (ejected) from the stacker case 102.

With the above arrangement, the document feeder assisting device 100 of the present embodiment is capable of conveying the card C with less conveying force than in the structure of Embodiment 1 in which the second surface 122 of the gate 120 is not orthogonal to the energizing direction since the reaction force upon conveyance (conveyance reaction force) can be reduced.

Embodiment 7

First, Embodiment 7 of a document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 according to the present embodiment is different from Embodiments 1 and 6 described above, except the arrangement of a line of action of the energizing force acting on a gate 120 and a line of action of the weight of the gate 120 itself in Embodiment 7.

Therefore, a similar structure to a structure described in Embodiments 1 and 6, and the operation and effects of the structure will be omitted as appropriate. Similar members are denoted by the same symbol for description unless there is a particular need to distinguish the members. In the following description, the case where the characteristic structure of this embodiment is applied to Embodiment 6 will be described.

Figure 60A:
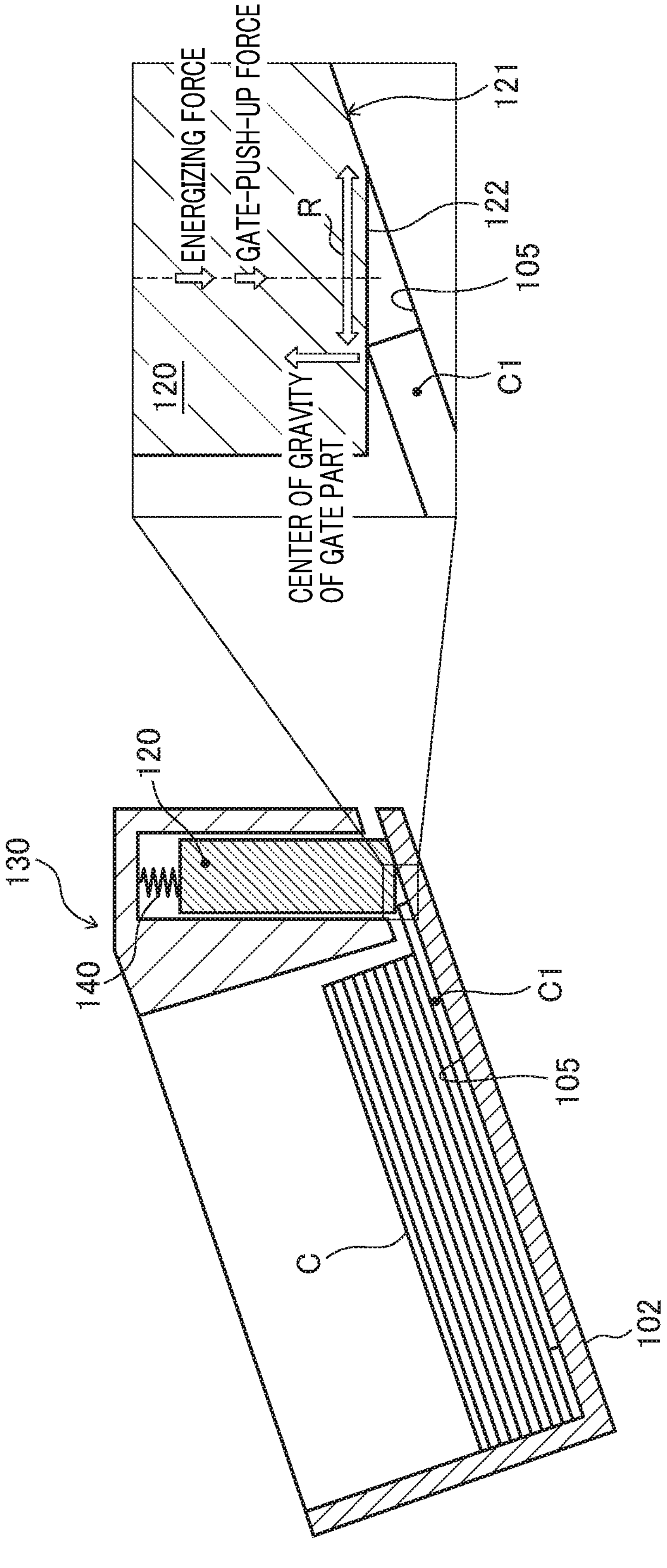
FIGS. 60A and 60B are explanatory views of a line of action of the energizing force acting on the gate, a line of action of the weight of the gate itself, and a region where the two lines of action exist according to Embodiment 7 of this disclosure.
Figure 60B:
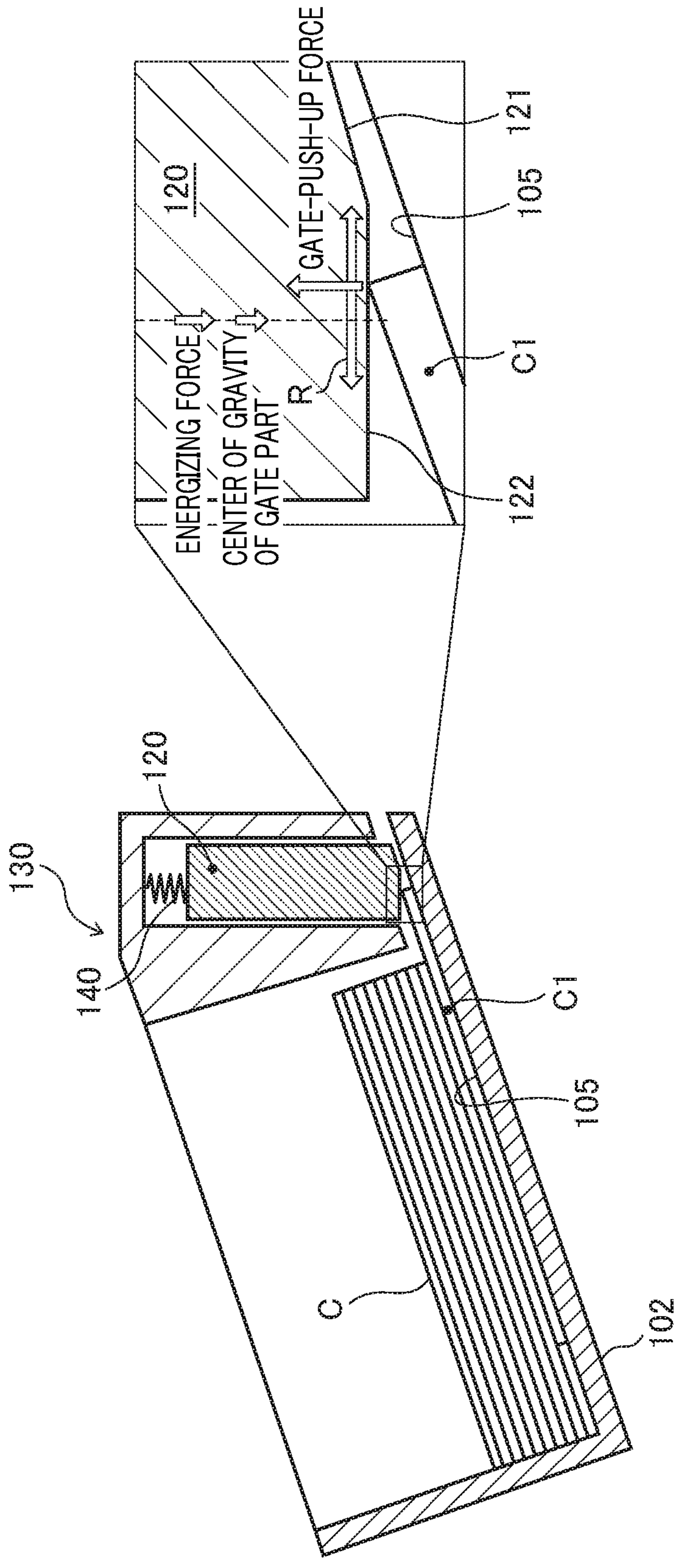

FIGS. 60A and 60B are explanatory views of a line of action of the energizing force acting on the gate 120, a line of action of the weight of the gate 120 itself, and a region where the two lines of action exist according to the present embodiment. FIG. 60A is an explanatory view illustrating two lines of action when the first card C1 first contacts a second surface 122, that is, when the gate 120 is closed, and a region where the two lines of action exist. The right side view of FIG. 60A illustrates two lines of action when the first card C1 is pushing up the second surface 122 (gate 120) and a region where the two lines of action exist.

In the document feeder assisting device 100 according to the present embodiment, a position where the compression spring 140 energizes the gate 120 and the shape of the gate 120 are set such that the line of action of the compression spring 140 and the line of action of the weight of the gate 120 itself satisfy the relationship illustrated in FIG. 60A.

Specifically, as illustrated in FIG. 60A, in the structure according to the present embodiment, the line of action of the energizing force by the compression spring 140 and the line of action of the position of the center of gravity of the gate 120 substantially coincide in the cross-section in the main-scanning direction.

The two substantially coincident lines of action exist in a region extending from a contact position, where the leading end of the card C1 being conveyed begins to contact the second surface 122 of the gate 120, to the end position of the second surface 122 in contact with the placement surface 105 of the card stacker 112 when the gate 120 is closed. That is, the two substantially coincident lines of action are within a range where the gate 120 moves while pushing up the gate 120 with the leading end of the card C1 being conveyed being in contact with the second surface 122 of the gate 120, that is, within the region indicated by R in FIG. 60A.

With the above arrangement, the document feeder assisting device 100 according to the present embodiment can support (lift) the gate 120 more effectively by the gate-push-up force, and thus the gate 120 can be supported with less conveying force. Therefore, the card C1 can be conveyed with less conveying force.

Conversely, as illustrated in FIG. 60A, in the case where either the line of action by the compression spring 140 or the line of action by the weight of the gate 120 itself is positioned outside the region indicated by R in the right side view of FIG. 60A, the gate-push-up force, the energizing force by the compression spring 140, and the position of the center of gravity of the gate are shifted from each other.

Such a shift generates larger rotational moment than in the case illustrated in FIG. 60A, and frictional force when the gate 120 contacts the guide 130, which guides the gate 120, acts as the conveyance resistance force, which may ultimately increase the conveyance resistance force.

Embodiment 8

Next, Embodiment 8 of a document feeder assisting device 100 to convey a card C toward the card insertion slot 7 included in the vicinity of the intermediate portion of the document conveyance passage 55 of the ADF 5 (reading device 6) of the present embodiment will be described with a plurality of exemplary structures with reference to FIGS. 58A and 58B and FIGS. 60A and 60B used in the description of Embodiment 1.

The document feeder assisting device 100 of the present embodiment is different from Embodiments 1, 6, and 7 described above, except the structure of a first surface 121 and a second surface of a gate 120 and a structure of a gate slider 125 of the gate 120 and a guide slider 135 of the guide 130 which slide with each other.

Therefore, a similar structure to a structure described in Embodiments 1, 6, and 7, and the operation and effects of the structure will be omitted as appropriate. Similar members are denoted by the same symbol for description unless there is a particular need to distinguish the members. In the following description, the case where the characteristic structure of this embodiment is applied to Embodiment 6 will be described.

Figure 61:
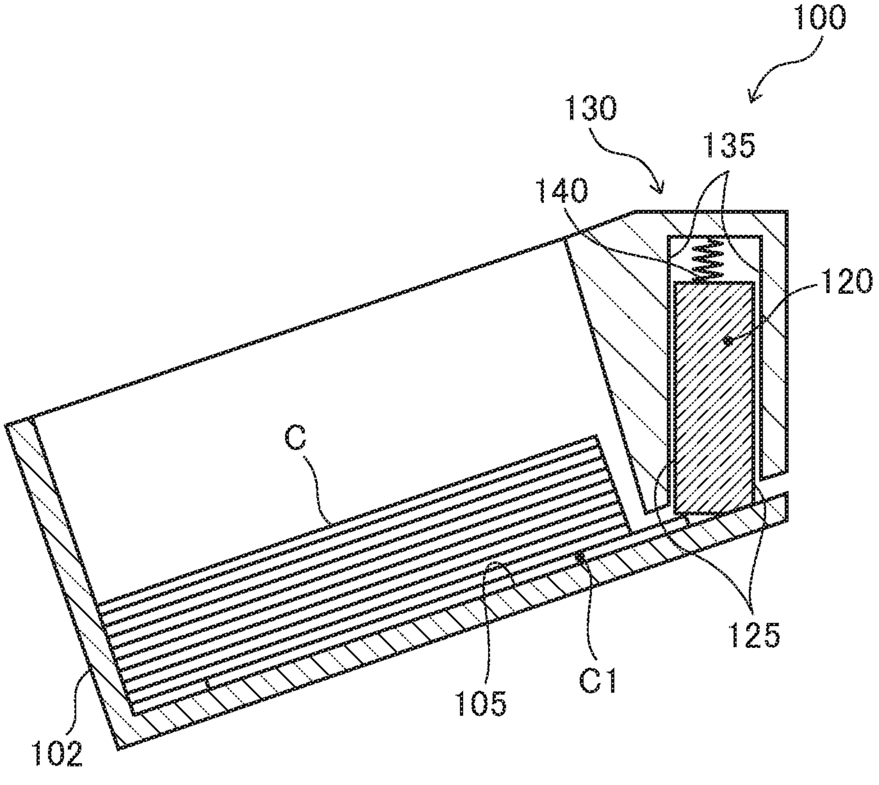
FIG. 61 is an explanatory view of a gate slider of a gate and a guide slider of a guide that slide with each other when the gate is displaced according to Exemplary Structure 5 of Embodiment 8 of this disclosure.

FIG. 61 is an explanatory view of a gate slider 125 of a gate 120 and a guide slider 135 of a guide 130 that slide with each other when the gate 120 is displaced.

First, an exemplary structure of the gate 120 that can be suitably used in the document feeder assisting device 100 according to the present embodiment will be described with reference to FIGS. 58A and 58B.

Exemplary Structure 1

At least a part of the second surface 122 of the gate 120 illustrated in FIGS. 58A and 58B on which the card C contacts when the card C is conveyed is made of a rubber material.

With this arrangement, the following effects can be obtained.

Causing a damage in the card C by contact to the second surface 122 of the gate 120 can be prevented. In addition, since the frictional force generated between the second surface 122 of the gate 120 and the card C can be increased, the effect of separating the first card C1 from the plurality of cards C can be enhanced.

Exemplary Structure 2

At least a part of the first surface 121 of the gate 120 that contacts on the placement surface 105 of the card stacker 112 illustrated in FIGS. 58A and 58B is made of a rubber material.

With this arrangement, causing a damage in the placement surface 105 of the card stacker 112 or the gate 120 can be prevented when the gate 120 contacts on the placement surface 105 of the card stacker 112.

Exemplary Structure 3

At least a part of the second surface 122 of the gate 120 illustrated in FIGS. 57A and 57B on which the card C contacts upon conveyance is made of a POM material.

With this arrangement, the sliding performance of the card C with respect to the second surface 122 of the gate 120 can be enhanced (in other words, the higher sliding performance of the card C can be achieved).

Exemplary Structure 4

At least a part of the second surface 122 of the gate 120 illustrated in FIGS. 58A and 58B on which the card C contacts upon conveyance is made of a POM material.

With this arrangement, the sliding performance of the card C with respect to the first surface 121 of the gate 120 can be enhanced.

Exemplary Structure 5

Next, Exemplary Structure 5 of the gate slider 125 of the gate 120 and the guide slider 135 of the guide 130 which slide with each other when the gate 120 is displaced, which can be suitably used in the document feeder assisting device 100 of the present embodiment, will be described with reference to FIG. 61.

In Exemplary Structure 5, the gate slider 125 of the gate 120 and the guide slider 135 of the guide 130, which slide with each other when the gate 120 is displaced, are structured as follows.

At least a part of the gate slider 125 of the gate 120 and the guide slider 135 of the guide 130 illustrated in FIG. 61 is made of a POM material.

With this arrangement, the sliding performance of the gate slider 125 of the gate 120 with respect to the guide slider 135 of the guide 130 can be enhanced.

Embodiment 9

Next, Embodiment 9 of a document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 according to the present embodiment is different from Embodiments 1, 6, 7, and 8 described above, except that a gap having the maximum thickness of a specifications-confirming card C to be conveyed is formed in the energizing direction between a guide 130 to guide the gate 120 in the energizing direction and the gate 120.

Therefore, a similar structure to a structure described in Embodiments 1, 6, 7, and 8, and the operation and effects of the structure will be omitted as appropriate. Similar members are denoted by the same symbol for description unless there is a particular need to distinguish the members. In the following description, the case where the characteristic structure of this embodiment is applied to Embodiment 6 will be described.

Figure 62B:
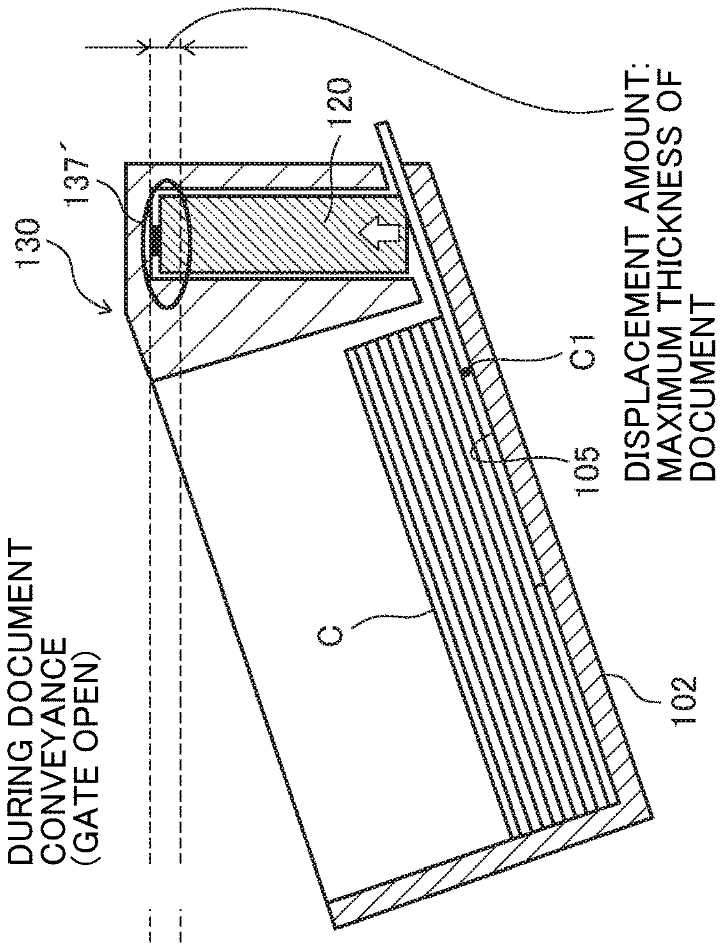
FIGS. 62A and 62B are explanatory views of a displacement amount in the energizing direction of a gate according to Embodiment 9 of this disclosure.
Figure 62A:
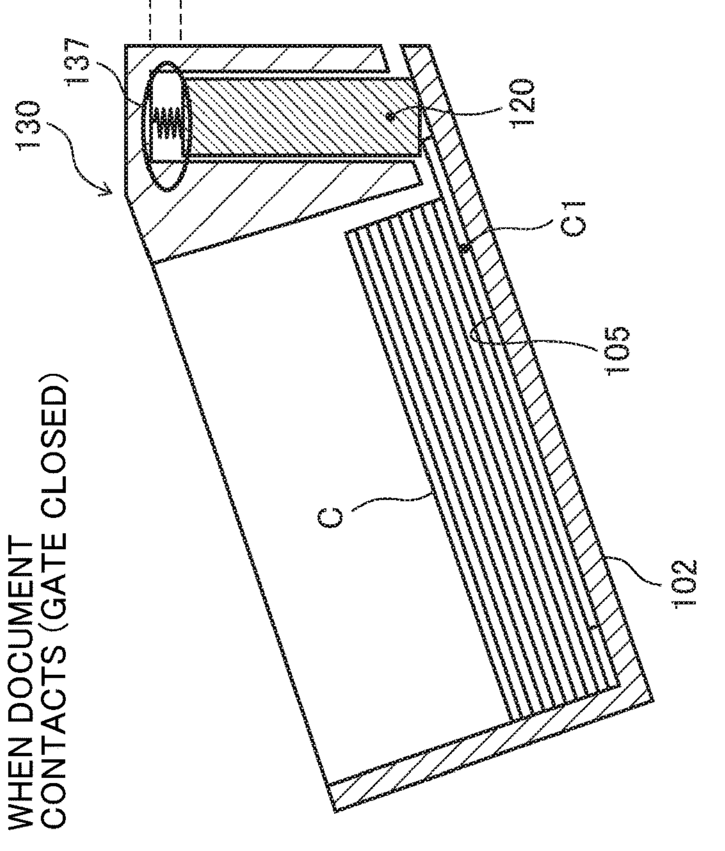

FIGS. 62A and 62B are explanatory views of a displacement amount in the energizing direction of a gate 120 according to the present embodiment. FIG. 62A is an explanatory view illustrating the first card C1 first contacting the second surface 122 of the gate 120, that is, when the gate 120 is in the closed state. FIG. 59C is an explanatory view of the first card C1 having pushed up and opened the gate 120 and being conveyed under the gate 120, that is, when the gate 120 is in the open state.

According to the separation method using the gate 120 of Embodiments 1, 6, 7, and 8, the gate 120 is displaced by the thickness of the card C to open or close. Therefore, by including the gate 120 and the energizing member enables stable conveyance of cards of various types of thicknesses.

However, when a wrong card that is thicker than the maximum thickness of the specifications-confirming document conveyed by the document feeder assisting device 100 is placed on a placement surface 105 of a card stacker 112, the wrong card is conveyed to the ADF 5 and may cause clogging in the manually-fed document conveyance passage 64 of the ADF 5.

Therefore, in the document feeder assisting device 100 of the present embodiment, a gap having the maximum thickness of a specifications-confirming document (card) to be originally conveyed by the document feeder assisting device 100 is formed in the energizing direction between the guide 130 to guide the gate 120 in the energizing direction and the gate 120.

Specifically, a gap 137 between the end of the gate 120 and the guide 130 in the energizing direction when the gate 120 is closed as illustrated in FIG. 62A is set to have the maximum thickness of a specifications-confirming document to be conveyed, and the gate 120 is allowed to contacts in the closed state as illustrated in FIG. 62B such that a gap 137' is eliminated.

With this arrangement, by setting a portion that contacts the gate 120 such that the maximum displacement amount of the gate 120 is equal to the thickness of the thickest document (card), conveyance of a document having a thickness not conforming to specifications can be prevented.

Embodiment 10

Next, Embodiment 10 of a document feeder assisting device 100 to convey a card C toward the card insertion slot 7 included in the vicinity of the intermediate portion of the document conveyance passage 55 of the ADF 5 (reading device 6) of the present embodiment will be described with reference to drawings.

The document feeder assisting device 100 of the present embodiment is different from the first to the fifth embodiments described above, except the point of the arrangement of a compression spring 140 in a gate 120 in the width direction of the card C orthogonal to the conveyance direction of the card C and the central position in the width direction of the card C to be conveyed. That is, the document feeder assisting device 100 according to the present embodiment is different from Embodiments 1, 6, 7, 8, and 9 described above in the point of the arrangement of the compression spring 140 in the gate 120 in the main-scanning direction and the central position in the width direction of the card C to be conveyed.

Therefore, a similar structure to a structure described in Embodiments 1, 6, 7, 8, and 9, and the operation and effects of the structure will be omitted as appropriate. Similar members are denoted by the same symbol for description unless there is a particular need to distinguish the members. In the following description, the case where the characteristic structure of Embodiment 10 is applied to Embodiment 6 will be described.

Figure 63A:
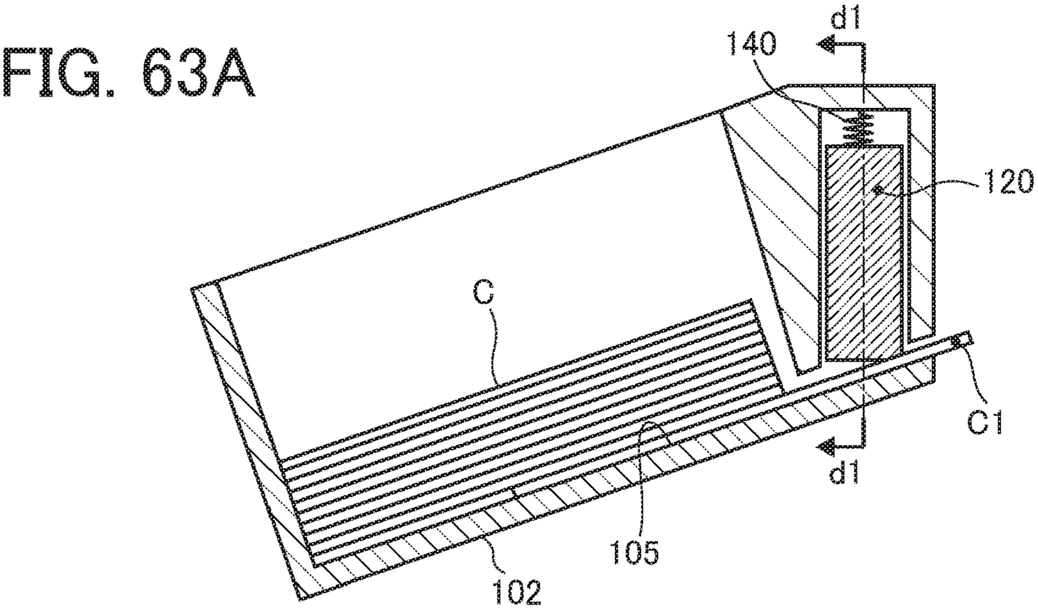
FIGS. 63A to 63C are explanatory views of the arrangement of compression springs in the main-scanning direction of a gate and the central position in the width direction of the card to be conveyed according to Embodiment 10 of this disclosure.
Figure 63B:
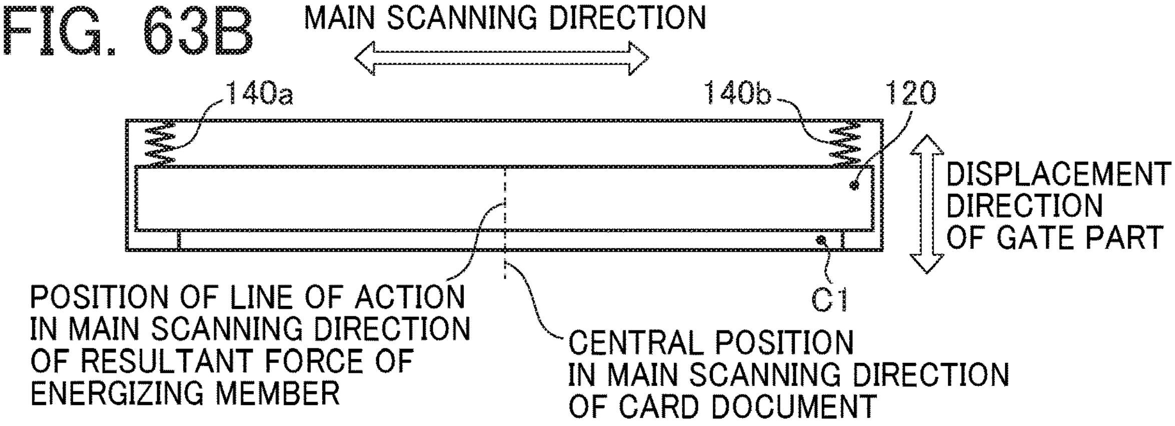
Figure 63C:
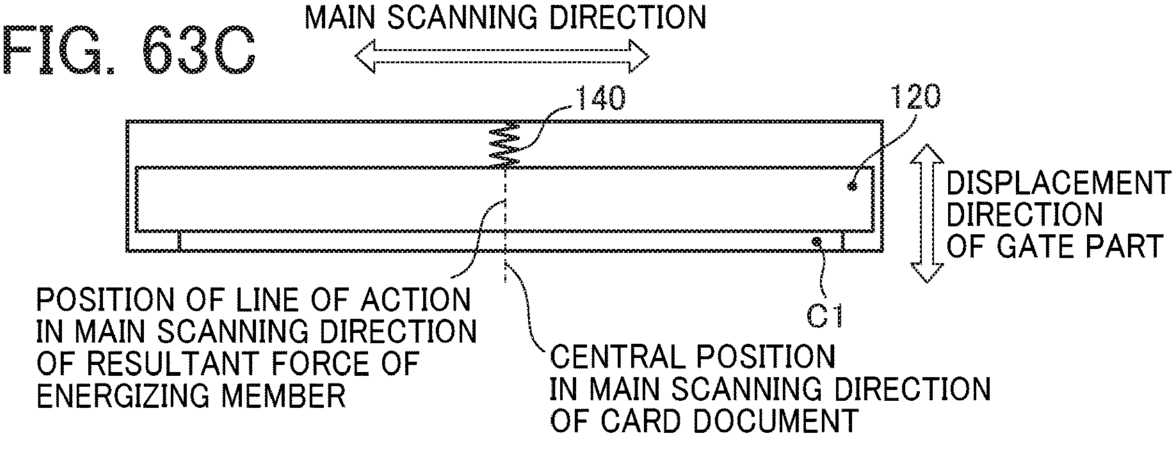

FIGS. 63A, 63B, and 63C are explanatory views of the arrangement of the compression spring 140 in the main-scanning direction of the gate 120 and the central position in the width direction of the card C to be conveyed according to the present embodiment. FIG. 63A is an explanatory view of the arrangement of the compression spring 140 and the position of cross-sections of FIGS. 63B and 63C used for explanation of the central position in the width direction of the card C to be conveyed. FIG. 63B is an explanatory view of a structure including two compression springs of a first compression spring 140*a* and a second compression spring 140*b*, and FIG. 63C is an explanatory view of a structure including one compression spring 140.

In the present embodiment, to explain the arrangement of the compression spring 140 and the central position in the width direction of the card C to be conveyed, FIGS. 63B and 63C of a cross-section dl-dl illustrated in FIG. 63A which are cross-sectional views orthogonal to the main-scanning direction of the document feeder assisting device 100 are used.

In the document feeder assisting device 100 of the present embodiment, in the main-scanning direction, the central position of the card C1 to be conveyed in the main-scanning direction coincides with the central position of the gate 120 in the main-scanning direction as illustrated in FIG. 63B. The gate 120 is energized by the first compression spring 140*a* and the second compression spring 140*b* arranged along the main-scanning direction, and the first compression spring 140*a* and the second compression spring 140*b* are each mounted in the vicinity of both ends of the gate 120 in the width direction (main-scanning direction) of the card C1. In addition, the central position of the card C1 to be conveyed in the width direction of the card C1 substantially coincides with the position of the line of action of the resultant force of the energizing force by the two compression springs of the first compression spring 140*a* and the second compression spring 140*b* in the width direction of the card C1. With this arrangement, the following effects can be obtained.

The card C1 conveyed by the document feeder assisting device 100 has a certain length in the width direction (about 54 [mm]). Therefore, rather than energizing the central part of the gate 120 with one compression spring 140, installing at least one compression spring at each of the both ends, a total of two compression springs, allows the card C1 to be stably conveyed despite catch of the end of the gate 120 or rotation of the gate 120 as illustrated in FIG. 63B.

Embodiment 11

Next, Embodiment 11 of a document feeder assisting device 100 to convey a card C toward the card insertion slot 7 included in the vicinity of the intermediate portion of the document conveyance passage 55 of the ADF 5 (reading device 6) of the present embodiment will be described with a plurality of exemplary structures with reference to drawings.

The document feeder assisting device 100 according to the present embodiment is different in that an exemplary structure of how to provide a compression spring 140 is specified in a structure in which a gap in the energizing direction having the maximum thickness of a specifications-confirming document is formed between the gate 120 and the guide 130 (for example, Embodiment 9).

Therefore, a similar structure to a structure described in Embodiments 1, 6, 7, 8, 9, and 11, and the operation and effects of the structure will be omitted as appropriate. Similar members are denoted by the same symbol for description unless there is a particular need to distinguish the members. In the following description, the case where the characteristic structure of Embodiment 11 is applied to Embodiment 6 will be described.

In the following description, a structure in which a first recess 128 and a projection 126 are formed on the gate 120 side where the compression spring 140 contacts (coupled) will be described; however, the principal of the present embodiment is not limited to such a structure. For example, this disclosure is also applicable to a structure in which a first recess 128 or a projection 126 are formed on the guide 130 side on which the compression spring 140 contacts or a structure in which a first recess 128 or a projection 126 are formed on both a gate 120 side and a guide 130 side on which the compression spring 140 contacts.

Figure 64A:
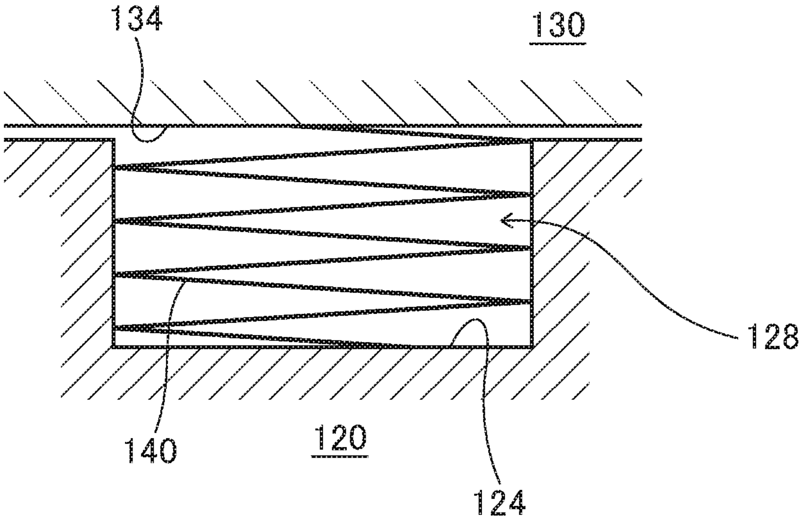
FIGS. 64A and 64B are explanatory views of two exemplary structures in which a first recess and other portions are formed in a gate according to Embodiment 11 of this disclosure.
Figure 64B:
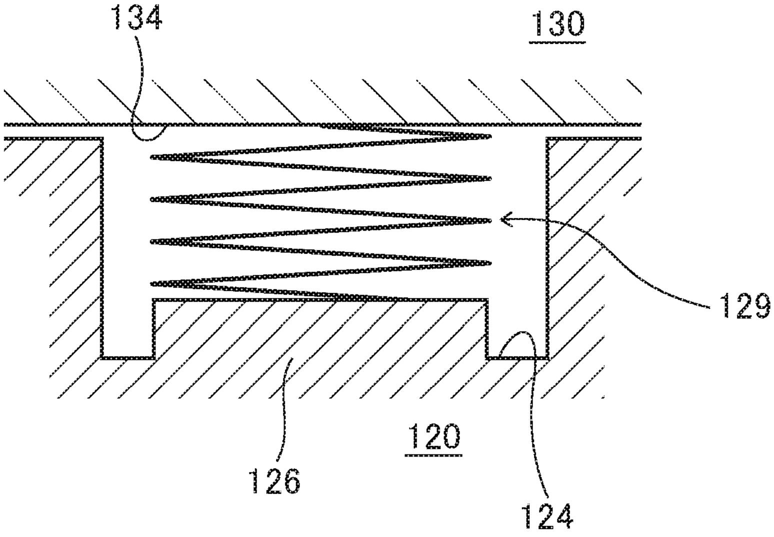

FIGS. 64A and 64B are explanatory views of two exemplary structures in which a first recess 128 and other parts are formed in a gate 120 alone according to the present embodiment. FIG. 64A is an explanatory view of Exemplary Structure 6 in which a first recess 128, which substantially coincides with the outer diameter of a compression spring 140, is the formed in the gate 120 alone. FIG. 64B is an explanatory view of Exemplary Structure 7 in which a second recess 129 having an inner diameter larger than the outer diameter of a compression spring 140 and a projection 126, which substantially coincides with the inner diameter of the compression spring 140 protruding from the bottom of the second recess 129, are formed in the gate 120 alone.

In the structure of Embodiment 9 described above, since the height of the compression spring 140 at the time of maximum compression is not considered, inevitability, it is necessary to form a recess to accommodate the compression spring 140 at least in one of the gate 120 and the guide 130.

Therefore, in Exemplary Structures 6 and 7, at least one of the projection 126, which substantially coincides with the inner diameter of the compression spring 140, and the first recess 128, which substantially coincides with the outer shape of the compression spring 140, to position the compression spring 140 is formed in a contact part 124 of the gate 120.

Exemplary Structure 6

In Exemplary Structure 6, as illustrated in FIG. 64A, the gate 120 alone is formed with the first recess 128 that is deeper (longer) than the height (length) at the time of maximum compression of the compression spring 140. The first recess 128 substantially coincides with the outer diameter of the compression spring 140.

Exemplary Structure 7

In Exemplary Structure 7, as illustrated in FIG. 64B at the time of contact, a second recess 129 having an inner diameter larger than the outer diameter of a compression spring 140 and a projection 126, which substantially coincides with the inner diameter of the compression spring 140 protruding from the bottom of the second recess 129, are formed in a gate 120 alone.

With the arrangement as in Exemplary Structure 6 or Exemplary Structure 7, the following effects can be obtained.

By forming the first recess 128, the outer shape of which substantially coincides with the outer shape of the compression spring 140, or, a projection, which substantially coincides with the inner diameter of the compression spring 140 inside the second recess 129, the recess positions the energizing member while at the same time serves as a guide for the energizing member, which enables reduction in the processing cost.

Furthermore, the ADF 5 of the present embodiment preferably includes a document conveyance assisting unit to convey a card C toward the card insertion slot 7 included in the vicinity of the intermediate portion of the document conveyance passage 55 and, as the document conveyance assisting unit, includes any one of the document feeder assisting devices 100 described above.

This enables provision of the ADF 5 that can achieve similar effects to the effects of any of the document feeder assisting devices 100 described above.

Furthermore, the reading device 6 of the present embodiment includes the ADF 5 including a document conveyance assisting unit to convey a card C toward the card insertion slot 7 included in the vicinity of the intermediate portion of the document conveyance passage 55 and, as the document conveyance assisting unit, includes the ADF 5 including any one of the document feeder assisting devices 100 described above.

This enables provision of the reading device 6 that can achieve similar effects to the effects of the ADF 5 including any of the document feeder assisting devices 100 described above.

Furthermore, the image forming apparatus 1 of the present embodiment includes the ADF 5 including a document conveyance assisting unit to convey a card C toward the card insertion slot 7 included in the vicinity of the intermediate portion of the document conveyance passage 55 and, as the document conveyance assisting unit, includes the ADF 5 including any one of the document feeder assisting devices 100 described above.

This enables provision of the image forming apparatus 1 that can achieve similar effects to the effects of the ADF 5 including any of the document feeder assisting devices 100 described above.

The present embodiment has been described with reference to the drawings; however, a specific structure is not limited to the structure including the document feeder assisting device 100 according to the present embodiment described above, and may incorporate modifications of design within a range that does not depart from the principles.

In the present embodiment, the example in which this disclosure is applied to the document feeder assisting device 100 attached to the ADF 5 (sheet feeding tray 61) included in the reading device 6 of the electrophotographic image forming apparatus 1 has been described; however, this disclosure is not limited to such a configuration. For example, this disclosure is also applicable to an inkjet-type (geljet-type) image forming apparatus.

Moreover, although the example in which this disclosure is applied to the document feeder assisting device 100 to assist document conveyance of the ADF 5 included in the reading device 6 has been described; however, this disclosure is not limited to such a configuration. For example, this disclosure is also applicable to a structure that assists sheet conveyance of a sheet conveying device to convey a sheet including a card.

The embodiments described above are merely examples, and unique effects are exerted for each of the following aspects.

Aspect 1.

In a document feeder assisting device such as a document feeder assisting device 100 to assist document conveyance by an automatic document feeder (ADF), the document feeder assisting device including a document stacker such as a card stacker 112 to stack documents such as cards C conveyed toward a feed port such as a card insertion slot 7 of the automatic document feeder such as the ADF 5, a pressing device such as a pressing mechanism 101 to press the documents toward a document placement surface such as a placement surface 105 of the document stacker, and a conveyance device such as the document conveying mechanism 160 to convey a document, the documents are stacked on the document placement surface exposed above with the pressing device moved.

According to the above, the following effects can be obtained.

In a document feeder assisting device applied with a structure of a comparative conveying and stacking device, since a new document is stacked after already-stacked documents are retracted in a direction away from the document conveyance surface, one document (that is, not multiple documents) can be placed in the document stacker at a time.

Moreover, due to the dual function as the feed port to stack on the document stacker and the ejection port to eject a document to the outside, each time a document is stacked on the document stacker, document feeder assisting device has to be detached from the automatic document feeder to stack a document in the document stacker.

For these reasons, a document feeder assisting device to which the comparative conveying and stacking device is applied has the poor the work efficiency for stacking documents on the document stacker.

Meanwhile, in the document feeder assisting device of this aspect, since the documents are stacked on the document placement surface exposed above with the pressing device moved, the number of sheets of documents that can be stacked on the document stacker can be stacked at a time, and the stacking work can be performed while the document feeder assisting device is kept attached to the automatic document feeder.

This enables provision of the document feeder assisting device capable of enhancing work efficiency for stacking documents on the document stacker.

Aspect 2.

In Aspect 1, the conveyance device transfers force in a document conveyance direction to at least a part of a trailing end CE of a document in the document conveyance direction.

According to the above, the following effects can be obtained.

Although the function to convey the document can be implemented by installing conveyance rollers on and under the document in the thickness direction, the size of the device itself is increased in the thickness direction depending on the diameter of the conveyance rollers. On the other hand, in the structure in which a force is applied to the trailing end of the document, the conveying function can be implemented without increasing the size of the device itself as in the structure in which the conveyance rollers are installed on and under the document in the thickness direction.

Aspect 3.

In Aspect 1 or Aspect 2, the conveyance device includes a document conveying body such as a card trailing end extruding member 113 to extrude the document and a document conveying lever such as a card conveying lever 111, and the movement of the document conveying body is interlocked with movement of the document conveying lever to apply force to the trailing end of the document in the document conveyance direction.

According to this, an operator such as a user can intuitively move the document conveying lever in the conveyance direction to convey the document in that direction.

Aspect 4.

In Aspect 3, the document conveying lever protrudes toward an operator who operates the document feeder assisting device at the time of conveying the document.

According to this, the operator can easily operate the document conveying lever.

Aspect 5.

In Aspect 3 or Aspect 4, the conveyance device includes an elastic member such as a returning compression spring 161 to automatically return the document conveying lever and the document conveying body to home positions.

According to this, it is ensured that the conveying lever returns to the home position immediately after the document is conveyed (the MAX stroke position of the lever) without the user's operation. That is, when the user returns the conveying lever to the home position, the lever does not stop midway (under the stacked documents in the thickness direction). Therefore, this can ensure to prevent conveyance failure of the stacked documents and also, at the same time, eliminate the burden of the operator to return the document conveying lever to the home position.

Aspect 6.

In Aspect 5, the elastic member is a compression spring such as the returning compression spring 161.

This arrangement implements a simple structure, reduces the cost, and enhances the layout property.

Aspect 7.

In Aspect 5 or Aspect 6, a position of the center of gravity of components of the conveyance device such as the card trailing end extruding member 113 and the card conveying lever 111 that moves at the time of conveying the document and a position of a line of action of elastic force by the elastic member substantially coincide with each other in a width direction of the document, such as a main-scanning direction, orthogonal to the document conveyance direction.

According to this, since the conveyance device of Aspect 5 can be positioned at the home position without being oblique, the extruding surface at the trailing end of the document can be pushed out orthogonally to the trailing end surface of the document.

Aspect 8.

Any one of Aspects 3 to 7, further includes a guide such as a slide guide 165 to restrict movement of the document conveying lever and the document conveying body in the document conveyance direction.

According to this, the document can be conveyed in a target direction.

Aspect 9.

In Aspect 8, the document conveying lever, the document conveying body, and a slider of the guide are made of a POM material.

According to this, by using a POM material having a good sliding property, the conveying resistance can be reduced, thus enhancing the operational feeling of the operator.

Aspect 10.

In any one of Aspect 1 or Aspect 9, the document feeder assisting device further includes an opening and closing device such as the opening and closing mechanism 150 including an opening and closing member such as the gate 120 to open and close an ejection port such as the ejection port 115 to eject the document the opening and closing member is energized toward the document placement surface by elastic force of an elastic member such as a compression spring 140.

According to this, after the opening and closing member opens at the time of conveying the document, it is ensured that the opening and closing member closes before a next document is conveyed. In the case where the opening and closing member is open before the document is conveyed, there is a possibility that double feeding occurs since there are times that the document to be conveyed and a document overlaid on that document cannot be separated.

Aspect 11.

In Aspect 10, in the opening and closing device, a plurality of elastic members to energize the opening and closing member is arranged substantially symmetrically with respect to the central position in the document width direction orthogonal to the document conveyance direction such as the main-scanning direction.

According to the above, the following effects can be obtained.

In the case where a single elastic member (i.e., not multiple elastic members) is arranged at the center in the document width direction, the elastic member is allowed to rotate about an installation position of the elastic member. Therefore, when some force such as catching is generated on one side of the conveyance device at the time of opening and closing, there is a possibility that, that side may remain open without being closed.

Therefore, by arranging two or more elastic members on both sides with respect to the center in the document width direction, the motion of the opening and closing member can be restricted to the opening and closing direction, which ensures closure.

Aspect 12.

In Aspect 10 or Aspect 11, the elastic member is a compression spring such as the compression spring 140.

The above enables provision of the document feeder assisting device which has a simple structure and low cost and is space-saving.

Aspect 13.

In any one of Aspects 10 to 12, the central position of the opening and closing device and the central position of the document substantially coincide with each other in the document width direction orthogonal to the document conveyance direction such as the main-scanning direction.

According to this, since the document passes under the opening and closing device at the time of conveying the document, in the case where the central position in the document width direction of the document and the center in the document width direction of the opening and closing device do not coincide with each other, an wasteful portion is included in the document width direction of the opening and closing device upon document conveyance, which significantly increases the size of the device accordingly.

Thus, by structuring such that the central position of the opening and closing device and the central position of the document substantially coincide with each other in the document width direction, unnecessary parts for conveyance of the document can be omitted in the main-scanning direction of the opening and closing device. This can prevent the device from becoming larger.

Aspect 14.

In the document feeder assisting device according to any one of Aspects 10 to 13, in the opening and closing device, at least a part of a slider of the opening and closing member and a slider of a guide member to guide the opening and closing member in an energizing direction by the elastic member is made of a POM material.

With this arrangement, by using a POM material having good sliding performance in the slider of the opening and closing member and the slider of the guide, the resistance at the time of opening and closing can be reduced, thus allowing opening and closing operation to be stably performed.

Aspect 15.

In any one of Aspects 10 to 14, a pressing surface such as a pressing plate 118 of the pressing device to press the documents is in contact with an uppermost surface of the stacked documents and is movable in a thickness direction of the documents depending on a thickness of the stacked documents.

According to this, even in the case where a document is conveyed or newly added and the thickness of the stacked documents changes, the pressing force can be applied.

Aspect 16.

In Aspect 15, the pressing device uses elastic force of a compression spring such as a pressing compression spring 172 as pressing force to press the documents.

This arrangement allows the pressing device to move and to press in the thickness direction depending on the stacked documents with a simple structure, which reduces the cost and enhances the layout property.

Aspect 17.

In Aspect 15 or Aspect 16, a line of action of resultant force of pressing force when the pressing surface of the pressing device presses the documents and a position of the center of gravity of the documents stacked on the document stacker substantially coincide with each other.

According to this, the surface to be pressed of the stacked documents can be pressed without bias.

Aspect 18.

In any one of Aspects 15 to 17, the pressing device includes at least one pressing part such as a pressing plate supporting member 171 having a pressing function and a guide such as a pressing guide 173 to regulate a displacement direction of the pressing part in the document thickness direction, and sliding parts of the pressing part and the guide are made of a POM material.

According to this, by using a POM material having good sliding performance, the resistance at the time of displacement can be reduced, thus allowing the pressing operation to be stably performed.

Aspect 19.

In any one of Aspects 15 to 18, the pressing device has two modes of a pressing mode in which the documents are pressed and a non-press mode in which the pressing device is positioned outside the space extending from the document placement surface in the thickness direction of the documents.

According to this, since the pressing device is pressing the documents at the time of press, there is little space for replacing the documents during the press, and thus great force is required to place or take out the documents. Therefore, not only the press mode but also a mode, in which the pressing device is arranged outside the space extending from the placement surface of the documents in the thickness direction of the documents for replacement of the documents, is provided to allow the documents to be easily placed and to be taken out.

Aspect 20.

In Aspect 19, an operator operating the document feeder assisting device rotates the pressing device about a rotating shaft such as a rotating shaft 175 of a rotation mechanism 170 arranged outside the space extending from the document placement surface in the thickness direction of the documents to switch the press mode to the non-press mode.

According to this, in the method of displacing the pressing device in the thickness direction of the documents upon switching to the non-press mode, the displacement amount to cause the pressing device to be at a height where the documents can be easily placed and taken out is large, which significantly increases the size of the whole document feeder assisting device.

On the other hand, in the method of rotating the pressing device about the rotating shaft, the pressing device can be easily displaced in the lateral direction of the document stacker, and the displacement amount of the pressing device to allow the documents to be easily placed and taken out can be smaller than in the above method. Therefore, the size of the whole document feeder assisting device is not as large as in the above method.

Aspect 21.

In Aspect 20, the pressing device is structured to switch from the press mode to the non-press mode by being rotated by reaction force of a torsion coil spring such as a torsion coil spring 178.

The above enables provision of the document feeder assisting device which has a simple structure and low cost and is space-saving.

Aspect 22.

In any one of Aspects 19 to 21, transition to the press mode is performed when a held unit such as a held unit 181, which is formed on the outer portion of the pressing device and is made of an elastic member, is deformed and held by a recess or a projection to secure the pressing device such as a recess 182 formed in the stacker case 102.

According to this, a low-cost structure can be implemented by adopting a so-called snap-fit system.

Aspect 23.

In any one of Aspects 19 to 22, a part of the held unit held by the recess or the projection to secure the pressing device is brought into contact with a releasing part such as a pressing device release button 114 to deform the held unit to cancel the press mode and to switch to the non-press mode.

According to this, by providing the push-type button to automatically switch from the press mode to the non-press mode, usability for an operator can be enhanced.

Aspect 24.

In Aspect 22 or Aspect 23, the held unit is made of ABS resin.

With this arrangement, since the ABS material is resistant against repeated bending stress, the number of times of durability increases.

Aspect 25.

In any one of Aspects 1 to 24, a hole for accessing such as a hole 109 is formed in the vicinity of the documents stacked on the document placement surface of the document stacker, and at least a part of the document bottom surface is exposed from the bottom surface side of the hole.

According to this, by forming the hole that allows an operator to access the bottom surface of the documents, to collectively take out the plurality of stacked documents and to place new documents are facilitated.

In the case where there is no access to the bottom surface, it is difficult to hold and to lift the documents. Furthermore, in the case where there is a plurality of documents rather than a single document, the plurality of documents is overlaid, making it difficult to be taken out.

Aspect 26.

In Aspect 25, the central position of the hole in the document conveyance direction substantially coincides with the central position of the position of the stacked documents in the document conveyance direction, or the central position of the hole in the document width direction orthogonal to the document conveyance direction along the document bottom surface substantially coincides with the central position of the position of the stacked documents in the document width direction.

This allows the central part of the document to be supported, thereby facilitating an operator to take out the stacked documents or to place new documents.

Aspect 27.

Any one of Aspects 5 to 26, further includes an elastic member to automatically return the document conveying lever and the document conveying body to home positions, in which: a value, obtained by subtracting the distance from a document trailing end position in the document conveyance direction when the documents are stacked to a position of a nip of conveyance rollers such as a pair of conveyance rollers of a second document conveying mechanism 204 closest to the feed port on a conveyance passage in the automatic document feeder from the sum of the maximum stroke amount of the document conveying lever and the length of the document in the document conveyance direction, is a positive value; a part, to apply force in the conveyance direction to the document by the amount of this value, is allowed to retract in the direction opposite to the conveyance direction; and the amount of retraction is within an elastic region of an elastic body provided for buffering.

According to this, the extruding surface can be released in the direction opposite to the document conveyance direction while the leading end of the document is in contact with the conveyance rollers in the automatic document feeder. Therefore, even when the operator vigorously moves the lever to the MAX position, no serious damage is caused in the conveyance rollers in the automatic document feeder, the document, or parts included in the document feeder assisting device.

Aspect 28.

In any one of Aspects 1 to 27, the inner walls surrounding the space in the document stacker where the documents are stacked are structured such that a distance between inner walls parallel to each other in at least one of the document width direction orthogonal to the document conveyance direction and the document conveyance direction and facing each other increases as the inner walls rise higher in the thickness direction of the document.

With this arrangement, by tapering the inner walls of the document stacker, the stacked documents can be prevented from being clogged and not supplied to the position where the document comes into contact with a conveyance surface on the bottom surface. At the same time, since the entrance of the space in which the documents are placed is widened, the documents can be easily placed and taken out.

Aspect 29.

In any one of Aspects 1 to 28, the distance between the inner walls such as inner walls 112*w* surrounding the space in the document stacker, where the documents are stacked, in the document width direction orthogonal to the document conveyance direction substantially coincides with the length of the document in the document width direction.

According to this, the position of the document can be previously regulated by the inner walls at the time of conveyance to some extent. Thus, when the document feeder assisting device 100 is used for a reading device such as the reading device 6, the skew amount of an image scanned by the reading device can be also reduced.

Aspect 30.

In any one of Aspects 1 to 29, a portion of the document stacker near the end of the document conveyor on the downstream side in the document conveyance direction with respect to the portion of the document stacker where the documents are stacked is positioned by engagement of a recessed shape and a projecting shape with respect to a portion near the feed port of the automatic document feeder, and is further attached to the automatic document feeder with screws.

With this arrangement, the document feeder assisting device can be attached to the automatic document feeder with high accuracy. This is because the document is to contact the nip portion of inlet rollers in the automatic document feeder, and thus a certain level of accuracy is required for the attachment position.

Aspect 31.

In the document feeder assisting device of any one of Aspects 1 to 30, the document feeder assisting device is detachable from and attachable to the automatic document feeder.

According to the above, the document feeder assisting device can be detached when not in use, which can downsize a device such as the automatic document feeder to which the document feeder assisting device is to be attached.

Aspect 32.

An automatic document feeder such as the automatic document feeder includes a document conveyance assisting unit to convey a document such as a card C toward a feed port such as a card insertion slot 7 included in the vicinity of an intermediate portion of a conveyance passage such as a document conveyance passage 55, the automatic document feeder including, as the document conveyance assisting unit, a document feeder assisting device such as the document feeder assisting device 100 according to any one of Aspects 1 to 31.

This enables provision of the automatic document feeder capable of achieving similar effects to the effects of the document feeder assisting device of any one of Aspects 1 to 31.

Aspect 33.

A document reading device such as a reading device 6 includes a document conveyance assisting unit to convey a document toward a feed port such as a card insertion slot 7 included in the vicinity of an intermediate portion of a conveyance passage such as a document conveyance passage 55, the document reading device including, as the document conveyance assisting unit, a document feeder assisting device such as the document feeder assisting device 100 according to any one of Aspects 1 to 31.

This enables provision of the document reading device capable of achieving similar effects to the effects of the automatic document feeder including the document feeder assisting device of any one of Aspects 1 to 31.

Aspect 34.

An image forming apparatus such as the image forming apparatus 1 includes a document conveyance assisting unit to convey a document toward a feed port such as a card insertion slot 7 included in the vicinity of an intermediate portion of a conveyance passage such as a document conveyance passage 55, the image forming apparatus including, as the document conveyance assisting unit, a document feeder assisting device such as the document feeder assisting device 100 according to any one of Aspects 1 to 31.

This enables provision of the image forming apparatus capable of achieving similar effects to the effects of the automatic document feeder including the document feeder assisting device of any one of Aspects 1 to 31.

Aspect 35.

In a document feeder assisting device such as a document feeder assisting device 100 to assist document conveyance by an automatic document feeder, the document feeder assisting device including: an ejection port such as an ejection port 115 to eject a document such as a card C to be delivered to a feed port such as a card insertion slot 7 in an automatic document feeder such as the automatic document feeder; a conveyance device such as a document conveying mechanism 160 to convey the target document toward the feed port; and a document stacker such as a card stacker 112 where the target document can be placed, the document feeder assisting device further includes an opening and closing member such as a gate 120 to open and close the ejection port in response to the delivery of the document, the conveyance device includes a document end extruder such as a card trailing end extruding member 113 to extrude to convey the document and to deliver the document to the feed port, the opening and closing member contacts the document stacker to close the ejection port, and the document end extruder is formed with a curved surface such as a curved extruding surface 163 to extrude a trailing end of a document such as a trailing end CE which is the trailing end of the document in the document conveyance direction.

According to the above, the following effects can be obtained.

In the document feeder assisting device to which the structure of the comparative conveying and stacking device is applied, two conveyance rollers, such as conveyance rollers 190*a*, are arranged between the ejection port and the vicinity of the ejection port side of the document placed on the document stacker, and the document stacker is arranged away from the ejection port to deliver the document to the feed port. Therefore, when the document is conveyed by the two conveyance rollers to the ejection port, the document is prone to be skew.

Also, when the document is delivered to the feed port, the document is sandwiched between at least a conveyance roller on the ejection port side and an opposing roller such as the opposing roller 191*b* opposed to the conveyance roller. Therefore, even when the document to be delivered comes into contact with the conveyance rollers of the automatic document feeder with which the delivered document first contacts, the skew of the document is unlikely to be corrected.

For these reasons, the document feeder assisting device applied with the structure of the comparative conveying and stacking device has an inconvenience that a document is prone to skew when conveyed and that skew correction of the document cannot be sufficiently performed upon delivery to the automatic document feeder.

On the other hand, in the document feeder assisting device of this aspect, the document stacker and the ejection port are arranged closer to each other in such a manner that the opening and closing member closes the ejection port by contacting the document stacker. The document feeder assisting device also includes the document end extruder to extrude to deliver the document to the feed port. Therefore, it is not necessary to separate the document stacker from the ejection port, or to provide two conveyance rollers or opposing rollers between the document stacker and the ejection port as in the comparative structure in which a document is prone to skew.

It is also possible to allow the central positions of each of the trailing end of the document and the curved surface in the length direction of a ridgeline of the trailing end of the document when the curved surface, which is brought into contact with the document to extrude the document, contacts the trailing end of the document. Moreover, since the contact part to contact the trailing end of a document is a curved surface, the trailing end of the document can easily rotate along the curved surface. Therefore, a leading end such as a leading end CF of the document to be delivered can be easily brought into contact with all of the conveyance rollers, provided in the vicinity of the feed port of the automatic document feeder, on which the document delivered from the document feeder assisting device first contacts.

For these reasons, when the document is conveyed from the document stacker to the conveyance rollers of the automatic document feeder, the document is unlikely to be skew, and when the to-be-conveyed document comes into contact with the conveyance rollers of the automatic document feeder, the skew of the document can also be corrected.

This ensures provision of the document feeder assisting device in which a document is unlikely to be skew when conveyed and skew correction of the document can be suitably performed upon delivery to the automatic document feeder.

Aspect 36.

In Aspect 35, in a state in which a part of the document is in contact with conveyance rollers provided in the vicinity of the feed port of the automatic document feeder which first contacts when the document is delivered, in the document width direction orthogonal to the document conveyance direction, the distance from a contact position on the curved surface being in contact with the trailing end of the document to the central position in the curved surface is shorter than the distance from a contact position between the conveyance rollers and the document to the central position in the curved surface.

This ensures provision of the document feeder assisting device in which a document is unlikely to be skew when conveyed and skew correction of the document can be suitably performed upon delivery to the automatic document feeder as compared with a comparative one.

Aspect 37.

In Aspect 35 or Aspect 36, the curved surface is structured such that substantially the center of the curved surface contacts substantially the center of the trailing end of the document of the documents stacked on the document stacker in the document width direction orthogonal to the document conveyance direction.

According to this, skew of the document that occurs when the document is extruded can be reduced.

Aspect 38.

In any one of Aspects 35 to 37, the feed port is included in the vicinity of an intermediate portion of the conveyance passage of the automatic document feeder, and the document feeder assisting device further includes a pressing device to press the documents toward a document conveyance surface of the document stacker.

According to the above, the following effects can be obtained.

The document conveyance of the automatic document feeder including the feed port in the vicinity of the intermediate portion of the conveyance passage can be assisted, and by correcting by pressing with the pressing device, even a document warped to some extent can be preferably delivered to the feed port of the automatic document feeder.

Aspect 39.

In any one of Aspects 35 to 38, a first part, including a document conveying lever that an operator operates and moves to apply force when extruding the document in the document conveyance direction, and a second part including the document end extruder which moves when extruding the document are separate parts, the second part is arranged so as to be in contact with the first part and other parts via an elastic member such as an elastic member 167 provided substantially at the center of the document end extruder in the document width direction orthogonal to the document conveyance direction, moving directions of the first part and the second part are restricted by a guide such as a guide 166 to the document conveyance direction, and in the second part, a gap is formed from the guide member, the gap having a size that allows the second part to rotate.

According to the above, the following effects can be obtained.

Since the curved surface to extrude the trailing end of the document in the document conveyance direction is flexible to some extent, even when the stacked document is skewed, a part of the curved surface can be pressed against the trailing end in the document conveyance direction, and thus the conveying force can be easily transferred to the trailing end of the document.

Aspect 40.

In Aspect 39, the elastic member is a compression spring.

The above enables provision of the document feeder assisting device which has a simple structure and low cost and is space-saving.

Aspect 41.

In any one of Aspects 35 to 40, the curved surface formed on the document end extruder is set to form an orthogonal angle or an angle less than 90° with respect to an inclined surface inclined downward from the curved surface in the document conveyance direction, and the height position of at least a part of a ridgeline between the inclined surface and the curved surface with respect to the document conveyance surface to convey the document in the document feeder assisting device is set so as to be higher than the document placement surface such as a placement surface 105.

This can prevent conveyance failure of a document when a warped document is conveyed.

Aspect 42.

In any one of Aspects 35 to 41, the height position of conveyance of the document with respect to the document conveyance surface to convey the document in the document feeder assisting device is positioned between the height position of a nip portion of the pair of conveyance rollers arranged in the vicinity of the feed port of the automatic document feeder and the height position of the base of the curved surface formed on the document end extruder.

According to the above, the following effects can be obtained.

In the case where the height position of the nip portion of the pair of conveyance rollers is higher than the height position of document conveyance, when any part of the leading end of the document comes into contact with the nip portion, the trailing end of the document is pressed against the base of any part of the curved surface.

Therefore, with the structure of the present embodiment, the amount of rise of the trailing end of the document can be reduced, thus further preventing occurrence of a conveyance failure.

Aspect 43.

In any one of Aspects 35 to 42, the document to be conveyed is a card made of resin.

According to this, with resin being a typical material for card documents, many card documents can be suitably delivered to the automatic document feeder.

Aspect 44.

In any one of Aspects 35 to 43, the thickness of the document to be conveyed is within a range of 0.48 [mm] to 0.78 [mm].

According to this arrangement, documents having various thicknesses within a range from 0.48 [mm] to 0.78 [mm] can be reliably conveyed. More specifically, documents having a thickness of about 0.5 [mm], which is often the size of registration cards in hospitals, along with cards having a thickness of 0.48 [mm] or 0.78 [mm] conforming to the JIS II standards can be dealt with.

Aspect 45.

In any one of Aspects 35 to 44, vertical and horizontal dimensions of the document to be conveyed are 53.98 [mm] and 85.60 [mm], respectively.

According to the above, the following effects can be obtained.

The above is a card size conforming to the JIS II standards which is often conveyed to the feed port included in the vicinity of the intermediate portion of the conveyance passage of the automatic document feeder, and thus many of registration cards in hospitals, credit cards, cash cards, driver's licenses, individual number cards, and the like can be conveyed in a preferable manner.

Aspect 46.

In any one of Aspects 35 to 45, a document to be conveyed is at least one of a "carrier sheet," a "plastic card," a "postcard," an "envelope," a "form," a "clear file holder," and a "business card."

According to this, even a document such as a card C which is thicker than a document such as a general sheet document S can be suitably conveyed toward the feed port included in the vicinity of an intermediate part of the conveyance passage in the automatic document feeder.

Aspect 47.

In the document feeder assisting device of any one of Aspects 35 to 46, the document feeder assisting device is detachable from and attachable to the automatic document feeder.

According to the above, the document feeder assisting device can be detached when not in use, which can downsize a device such as an automatic document feeder to which the document feeder assisting device is to be attached.

Aspect 48.

An automatic document feeder such as the automatic document feeder (ADF) 5 includes a document conveyance assisting unit to convey a document such as a card C toward a feed port such as a card insertion slot 7 included in the vicinity of an intermediate portion of a conveyance passage such as a document conveyance passage 55, the automatic document feeder including, as the document conveyance assisting unit, a document feeder assisting device such as the document feeder assisting device 100 according to any one of Aspects 35 to 47.

This enables provision of the automatic document feeder capable of achieving similar effects to the effects of the document feeder assisting device of any one of Aspects 35 to 47.

Aspect 49.

A document reading device such as a reading device 6 includes a document conveyance assisting unit to convey a document toward a feed port such as a card insertion slot 7 included in the vicinity of an intermediate portion of a conveyance passage such as a document conveyance passage 55, the document reading device including, as the document conveyance assisting unit, a document feeder assisting device such as the document feeder assisting device 100 according to any one of Aspects 35 to 47.

This enables provision of the document reading device capable of achieving similar effects to the effects of the automatic document feeder including the document feeder assisting device of any one of Aspects 35 to 47.

Aspect 50.

An image forming apparatus such as the image forming apparatus 1 includes a document conveyance assisting unit to convey a document toward a feed port such as a card insertion slot 7 included in the vicinity of an intermediate portion of a conveyance passage such as a document conveyance passage 55, the image forming apparatus including, as the document conveyance assisting unit, a document feeder assisting device such as the document feeder assisting device 100 according to any one of Aspects 35 to 47.

This enables provision of the image forming apparatus capable of achieving similar effects to the effects of the automatic document feeder including the document feeder assisting device of any one of Aspects 35 to 47.

Aspect 51.

In a document feeder assisting device such as a document feeder assisting device 100 to assist document conveyance by an automatic document feeder by restricting the number of documents such as cards C, which are conveyed toward a feed port such as a card insertion slot 7 in the automatic document feeder such as an automatic document feeder, to one when a plurality of documents is stacked in a document stacker such as a card stacker 112, the document feeder assisting device including: a conveyance device such as a card conveying lever 111 to convey the document stacked on a document placement surface such as a placement surface 105 of the document stacker toward the feed port such as the card insertion slot 7 included in the vicinity of an intermediate portion of a conveyance passage such as a document conveyance passage 55 in the automatic document feeder; and an opening and closing member such as a gate 120 which is energized in a direction toward the document placement surface by an energizing member such as a compression spring 140 and is capable of opening and closing an ejection port such as an ejection port 115 by being displaced in the energizing direction, the opening and closing member includes a first surface such as a first surface 121 to contact the document placement surface when closed and a second surface such as a second surface 122 to receive force displacing the opening and closing member in a direction opposite to the energizing direction when the opening and closing member opens with the document contacting during document conveyance.

According to the above, the following effects can be obtained.

The comparative document feeder assisting device has an inconvenience that when structured to convey a document toward a feed port included in the vicinity of an intermediate portion of a conveyance passage of an automatic document feeder, the device such as the automatic document feeder including the document feeder assisting device has a larger size or incurs a higher cost.

Specifically, since it is necessary to secure a predetermined length for a rotary rib to separate documents and the length (length of the arm) of a document table, and the distance from the line of action of the force applied to the document to the center of rotation, the horizontal size of the automatic document feeder or other devices including the document feeder assisting device is likely to be too large.

In addition, since the contacting part for the rotary rib to press the document is a point, in order to apply a predetermined conveyance resistance force to separate the document, a driving motor of a high torque to rotate the document table is necessary, thus increasing the cost of the automatic document feeder or the other devices.

On the other hand, in this aspect, the opening and closing member to separate the document includes a first surface which is energized by the energizing member in the direction toward the document placement surface and is brought into contact with the document placement surface when closed and a second surface to receive a force displacing in a direction opposite to the energizing direction when the opening and closing member opens with the document contacting during conveyance.

This arrangement can reduce the horizontal size as compared with the structure including a comparative rotary rib to separate a document or a document table and enables use of springs as the energizing member, and thus it is not necessary to include a driving motor of a high torque that increases the cost of the comparative structure.

This enables provision of the document feeder assisting device capable of preventing an increase in the size or increasing the cost of the automatic document feeder or other devices including the document feeder assisting device.

Aspect 52.

In the document feeder assisting device according to Aspect 51, an energizing direction of the energizing member is substantially vertical.

According to this, the energizing force and a weight of the energizing member can be in the same direction, thus allowing the opening and closing member to be opened and closed efficiently.

Aspect 53.

In the document feeder assisting device according to Aspect 51 or Aspect 52, the second surface of the opening and closing member is orthogonal to the energizing direction.

With the above arrangement, the document can be conveyed with less conveying force than in the structure in which the second surface of the opening and closing member is not orthogonal to the energizing direction since the reaction force upon conveyance (conveyance reaction force) can be reduced.

Aspect 54.

In the document feeder assisting device according to Aspect 52 or Aspect 53, a line of action of energizing force to energize the opening and closing member having a vertical plane parallel to the conveyance direction when the document is conveyed, such as a cross-section orthogonal to the main-scanning direction, and a line of action of force by the weight of the opening and closing member itself substantially coincide with each other, and the substantially coinciding two lines of action exist in a region extending from a contact position, where the document being conveyed begins to contact the second surface of the opening and closing member, to the end position of the second surface in contact with the document placement surface when the opening and closing member is closed.

According to this, the document can be conveyed with less conveying force.

Aspect 55.

In the document feeder assisting device according to any one of Aspects 51 to 54, at least a part of the second surface of the opening and closing member on which the document contacts during conveyance is made of a rubber material.

With this arrangement, causing a damage in the document by contact to the second surface of the opening and closing member can be prevented. Moreover, since the frictional force generated between the second surface of the opening and closing member and the document can be increased, the effect of separating the document can be enhanced.

Aspect 56.

In the document feeder assisting device according to any one of Aspects 51 to 54, at least a part of the first surface of the opening and closing member to contact the document placement surface is made of a rubber material.

With this arrangement, causing a damage in the document placement surface and the opening and closing member can be prevented when the opening and closing member contacts on the placement surface.

Aspect 57.

In the document feeder assisting device according to any one of Aspects 51 to 54, in which at least a part of the second surface of the opening and closing member on which the document contacts during conveyance is made of a POM material.

According to this, the sliding property of the document with respect to the second surface of the opening and closing member can be enhanced.

Aspect 58.

In the document feeder assisting device according to any one of Aspects 51 to 54, at least a part of the first surface of the opening and closing member to contact the document placement surface is made of a POM material.

According to this, the sliding property of the document with respect to the first surface of the opening and closing member can be enhanced.

Aspect 59.

In the document feeder assisting device according to any one of Aspects 51 to 58, at least a part of a slider such as a gate slider 125 of the opening and closing member and a slider such as a guide slider 135 of a guide member such as a guide 130 to guide the opening and closing member in the energizing direction is made of a POM material.

According to this, the sliding performance of the opening and closing member with respect to the guide member can be enhanced.

Aspect 60.

In the document feeder assisting device according to any one of Aspects 51 to 59, a gap having the maximum thickness of a specifications-confirming document to be conveyed by the document feeder assisting device is formed in the energizing direction between the guide member such as the guide 130 to guide the opening and closing member in the energizing direction and the opening and closing member.

With this arrangement, by setting a portion that contacts the opening and closing member such that the maximum displacement amount of the opening and closing member is equal to the thickness of the thickest document, conveyance of a document having a thickness not conforming to specifications can be prevented beforehand.

Aspect 61.

In the document feeder assisting device of any one of Aspects 51 to 60, the energizing member is a compression spring such as a compression spring 140.

This can contribute to cost reduction and space-saving of the document feeder assisting device.

Aspect 62.

In the document feeder assisting device according to any one of Aspects 51 to 61, the opening and closing member is energized by a plurality of energizing members such as a first compression spring 140*a* and a second compression spring 140*b* arranged along the document width direction orthogonal to the document conveyance direction such as the main-scanning direction, two energizing members out of the plurality of energizing members are each installed in the vicinity of both ends of the opening and closing member in the document width direction, and the central position of the document to be conveyed in the document width direction substantially coincides with the position of a line of action of resultant force of energizing force by the plurality of energizing members in the document width direction.

According to the above, the following effects can be obtained.

The document such as the card C conveyed by the document feeder assisting device has a certain length in the document width direction (about 54 [mm]). Therefore, rather than energizing the central part of the opening and closing member with one energizing member, installing at least one energizing member at each of the both ends, a total of two energizing members, allows the document to be stably conveyed despite catch of the end of the opening and closing member or rotation of the opening and closing member.

Aspect 63.

In the document feeder assisting device according to any one of Aspects 51 to 62, at least one of a projection such as a projection 126, which substantially coincides with the inner diameter of the energizing member and positions the energizing member, and a recess such as a first recess 128 substantially coinciding with the outer shape of the energizing member is formed in either a contact part such as a contact part 124 on which the energizing member of the opening and closing member contacts or a contact surface of the opening and closing member such as a contact surface 134 on which the guide member to guide the opening and closing member contacts in the energizing direction.

According to the above, the following effects can be obtained.

For example, in the structure of Aspect 60, since the height of the energizing member at the time of maximum compression is not considered, it is inevitability necessary to form a recess to accommodate the energizing member.

Therefore, in this aspect, by forming the recess the outer diameter of which substantially coincides with the outer shape of the energizing member or forming a projection, which substantially coincides with the inner diameter of the energizing member, inside the recess, the recess positions the energizing member while at the same time serves as a guide for the energizing member, which enables reduction in the processing cost.

Aspect 64.

In the document feeder assisting device of any one of Aspects 51 to 63, the thickness of the document to be conveyed is within a range of 0.48 [mm] to 0.78 [mm].

According to this arrangement, documents having various thicknesses within a range from 0.48 [mm] to 0.78 [mm] can be reliably conveyed. More specifically, documents having a thickness of about 0.5 [mm], which is often the size of registration cards in hospitals, along with cards having a thickness of 0.48 [mm] or 0.78 [mm] conforming to the JIS II standards can be dealt with.

Aspect 65.

In the document feeder assisting device of any one of Aspects 51 to 64, vertical and horizontal dimensions of the document to be conveyed are 53.98 [mm] and 85.60 [mm], respectively.

According to the above, the following effects can be obtained.

The above is a card size conforming to the JIS II standards which is often conveyed to the feed port included in the vicinity of the intermediate portion of the conveyance passage of the automatic document feeder, and thus many of registration cards in hospitals, credit cards, cash cards, driver's licenses, individual number cards, and the like can be conveyed in a preferable manner.

Aspect 66.

In the document feeder assisting device of any one of Aspects 51 to 65, the document to be conveyed is at least one of a "carrier sheet," a "plastic card," a "postcard," an "envelope," a "form," a "clear file holder," and a "business card."

According to this, even a document such as a card C which is thicker than a document such as a general sheet document S can be suitably conveyed toward the feed port included in the vicinity of an intermediate part of the conveyance passage in the automatic document feeder.

Aspect 67.

In the document feeder assisting device of any one of Aspects 51 to 66, the document feeder assisting device is detachable from and attachable to the automatic document feeder.

According to the above, the document feeder assisting device can be detached from the document feeder assisting device when not in use, which can downsize a device such as an automatic document feeder to which the document feeder assisting device is to be attached.

Aspect 68.

An automatic document feeder such as includes a document conveyance assisting unit to convey a document such as a card C toward a feed port such as a card insertion slot 7 included in the vicinity of an intermediate portion of a conveyance passage such as a document conveyance passage 55, the automatic document feeder including, as the document conveyance assisting unit, a document feeder assisting device such as the document feeder assisting device 100 according to any one of Aspects 51 to 67.

This enables provision of the automatic document feeder capable of achieving similar effects to the effects of the document feeder assisting device of any one of Aspects 51 to 67.

Aspect 69.

A document reading device such as a reading device 6 includes an automatic document feeder such as the automatic document feeder 5 including a document conveyance assisting unit to convey a document such as a card C toward a feed port such as a card insertion slot 7 included in the vicinity of an intermediate portion of a conveyance passage such as a document conveyance passage 55, the document reading device including, as the document conveyance assisting unit, a document feeder assisting device such as the document feeder assisting device 100 according to any one of Aspects 51 to 67.

This enables provision of the document reading device capable of achieving similar effects to the effects of the automatic document feeder including the document feeder assisting device of any one of Aspects 51 to 67.

Aspect 70.

An image forming apparatus such as the image forming apparatus 1 includes an automatic document feeder such as the automatic document feeder including a document conveyance assisting unit to convey a document such as a card C toward a feed port such as a card insertion slot 7 included in the vicinity of an intermediate portion of a conveyance passage such as a document conveyance passage 55, the image forming apparatus including, as the document conveyance assisting unit, a document feeder assisting device such as the document feeder assisting device 100 according to any one of Aspects 51 to 67.

This enables provision of the image forming apparatus capable of achieving similar effects to the effects of the automatic document feeder including the document feeder assisting device of any one of Aspects 51 to 67.

Numerous additional modifications and variations are possible in light of the above teachings. It is therefore to be understood that, within the scope of the above teachings, this disclosure may be practiced otherwise than as specifically described herein. With some embodiments having thus been described, it will be obvious that the same may be varied in many ways. Such variations are not to be regarded as a departure from the scope of this disclosure and appended claims, and all such modifications are intended to be included within the scope of this disclosure and appended claims.

What is claimed is:

1. A document feeder assisting device attachable to an automatic document feeder of an image forming device, comprising:

a document stacker to stack documents, creating a stack of documents, to be conveyed toward a feed port of the automatic document feeder;

a pressing device to press the stack of documents toward a document placement surface of the document stacker;

a conveyance device to convey a document, of the stack of documents, along a linear conveyance path, inclined relative to a conveyance path of the automatic document feeder, through an ejection port to a feed port of the automatic document feeder; and an opening and closing device including an opening and closing member to open and close an ejection port to eject the document, the opening and closing member being energizable by an elastic force of an elastic member toward the document placement surface.

2. The document feeder assisting device of claim 1, wherein the conveyance device is configured to transfer a force in a document conveyance direction to at least a part of a trailing end of the document to be conveyed, in the document conveyance direction, to convey the document toward the automatic document feeder.

3. The document feeder assisting device according to claim 1, wherein the conveyance device includes a document conveying body to extrude the document from the stack of documents and a document conveying lever, and movement of the document conveying body is interlocked with movement of the document conveying lever to apply a force to a trailing end of the document to be conveyed in a document conveyance direction.

4. The document feeder assisting device of claim 3, wherein the document conveying lever protrudes toward an operator to operate the document feeder assisting device to convey the document to be conveyed in the document conveyance direction.

5. The document feeder assisting device of claim 3, wherein the conveyance device includes an elastic member to automatically return the document conveying lever and the document conveying body to respective home positions.

6. The document feeder assisting device of claim 5, wherein a position of a center of gravity of components of the conveyance device, configured to move in conveyance of the document to be conveyed, and a position of a line of action of an elastic force by the elastic member substantially coincide with each other in a document width direction, orthogonal to the document conveyance direction.

7. The document feeder assisting device of claim 5, further comprising:

an elastic member to automatically return the document conveying lever and the document conveying body to respective home positions; and an elastic body including an elastic region, to buffer an impact of the document to be conveyed, wherein a value, obtained by subtracting a distance from a document trailing end position in the document conveyance direction, when the documents are stacked, to a position of a nip of conveyance rollers closest to a feed port on a conveyance passage in the automatic document feeder from a sum of a maximum stroke amount of the document conveying lever and a length of the document in the document conveyance direction, is a positive value, wherein a component to apply force in the conveyance direction to the document is retractable in a direction opposite to the conveyance direction by an amount of the value, and wherein the amount by which the component is retractable, is within the elastic region of the elastic body.

8. The document feeder assisting device of claim 3, further comprising:

a guide, to restrict movement of the document conveying lever and the document conveying body in the document conveyance direction.

9. The document feeder assisting device of claim 1, wherein a central position of the opening and closing member and a central position of the document substantially coincide in the document width direction, orthogonal to the document conveyance direction.

10. The document feeder assisting device of claim 1, wherein a pressing surface of the pressing device, to press the documents, is in contact with an uppermost surface of the stack of documents stacked on the document stacker and is movable in a thickness direction of the stack of documents in response to a thickness of the stack of documents.

11. The document feeder assisting device of claim 10, wherein a line of action of resultant force of a pressing force, when the pressing surface of the pressing device presses the stack of documents, and a position of a center of gravity of the stack of documents on the document stacker, substantially coincide.

12. The document feeder assisting device of claim 1, wherein inner walls, surrounding a space in the document stacker where the documents are stacked, are structured such that a distance, between inner walls facing each other and being parallel to each other in at least one of a document width direction and a document conveyance direction, relatively increases toward an upper end of the inner walls in a thickness direction of the document.

13. An image forming apparatus comprising:

an automatic document feeder, including the document feeder assisting device of claim 1 to convey the document toward the feed port of the automatic document feeder, in a vicinity of an intermediate portion of a conveyance passage.

14. A document feeder assisting device attachable to an automatic document feeder of an image forming device, comprising:

an ejection port to eject a target document to be delivered to a feed port in the automatic document feeder;

a conveyance device to convey the target document toward the feed port of the automatic document feeder, the conveyance device including a document end extruder to extrude and deliver the document to the feed port;

a document stacker to receive the target document and a plurality of documents; and an opening and closing member to open and close the ejection port in response to delivery of the target document, the opening and closing member contacting the document stacker to close the ejection port, the document end extruder being formed with a curved surface to extrude a trailing end of a document in a document conveyance direction and to deliver the document to the feed port.

15. The document feeder assisting device of claim 14, wherein, in a state in which a part of the document is in contact with conveyance rollers provided in a vicinity of the feed port of the automatic document feeder contacting when the document is delivered, in a document width direction orthogonal to the document conveyance direction, a distance, from a contact position on the curved surface being in contact with the trailing end of the document to a central position in the curved surface, is relatively shorter than a distance from a contact position between the conveyance rollers and the document to a central position in the curved surface.

16. The document feeder assisting device of claim 14, wherein the curved surface formed on the document end extruder is set to form an orthogonal angle, or an angle less than 90 degrees, with respect to an inclined surface inclined downward from the curved surface in the document conveyance direction, and a height position of at least a part of a ridgeline between the inclined surface and the curved surface with respect to a document conveyance surface to convey the document in the document feeder assisting device, is set so as to be relatively higher than a document placement surface.

17. The document feeder assisting device of claim 14, wherein a height position of conveyance of the document, with respect to a document conveyance surface to convey the document in the document feeder assisting device, is positioned between a height position of a nip portion of a pair of conveyance rollers arranged in a vicinity of the feed port of the automatic document feeder and a height position of a base of the curved surface formed on the document end extruder.

18. A document feeder assisting device attachable to an automatic document feeder of an image forming device, comprising:

a conveyance device to convey a stack of documents stacked on a document placement surface, toward a feed port in the automatic document feeder, the conveyance being configured to feed one document of the plurality of documents and to restrict remaining ones of the plurality of documents stacked on the document placement surface, the feed port being disposed in the vicinity of an intermediate portion of a conveyance passage in the automatic document feeder; and an opening and closing member, energizable in a direction toward the document placement surface by an energizing member and displaceable in the energizing direction to open and close an ejection port, the opening and closing member including a first surface to contact the document placement surface when the opening and closing member closes the ejection port and a second surface to receive force, displacing the opening and closing member in a direction opposite to the energizing direction, when the opening and closing member opens the ejection port during document conveyance toward a feed port in the automatic document feeder.

19. The document feeder assisting device of claim 18, wherein the second surface of the opening and closing member is orthogonal to the energizing direction.

20. An image forming apparatus comprising an automatic document feeder including the document feeder assisting device of claim 14, to convey the document toward the feed port in vicinity of an intermediate portion of a conveyance passage.

21. An image forming apparatus comprising an automatic document feeder including the document feeder assisting device of claim 18, to convey the document toward the feed port in vicinity of an intermediate portion of a conveyance passage.

* * * * *